(12) United States Patent
Voth et al.

(10) Patent No.: US 8,046,298 B1
(45) Date of Patent: Oct. 25, 2011

(54) SYSTEMS AND METHODS FOR FACILITATING THE FLOW OF CAPITAL THROUGH THE HOUSING FINANCE INDUSTRY

(75) Inventors: David N. Voth, Oakton, VA (US); Richard N. Plotnick, Fairfax, VA (US); Peter G. Kopperman, Bethesda, MD (US); Caroline R. Herron, Washington, DC (US); John A. Derwin, Washington, DC (US); Sheilah A. Goodman, Kearneysville, WV (US); Michelle Y. Watson, Arlington, VA (US); Laura L. McDonald, Arlington, VA (US); Elizabeth H. Schamber, Heathsville, VA (US); Richard J. McGhee, Reston, VA (US)

(73) Assignee: Fannie Mae, Washington, DC (US)

( * ) Notice: Subject to any disclaimer, the term of this patent is extended or adjusted under 35 U.S.C. 154(b) by 1600 days.

(21) Appl. No.: 10/736,478

(22) Filed: Dec. 15, 2003

Related U.S. Application Data

(60) Provisional application No. 60/488,785, filed on Jul. 21, 2003.

(51) Int. Cl.
*G06Q 40/00* (2006.01)
(52) U.S. Cl. .......................... 705/38; 705/35
(58) Field of Classification Search .......... None
See application file for complete search history.

(56) References Cited

U.S. PATENT DOCUMENTS

| | | | |
|---|---|---|---|
| 3,316,395 A | 4/1967 | Lavin | |
| 4,876,648 A | 10/1989 | Lloyd | |
| 5,239,462 A | 8/1993 | Jones et al. | |
| 5,262,941 A | 11/1993 | Saladin et al. | |
| 5,274,547 A | 12/1993 | Zoffel et al. | |
| 5,323,315 A | 6/1994 | Highbloom | |
| 5,361,201 A | 11/1994 | Jost et al. | |
| 5,414,621 A | 5/1995 | Hough | |
| 5,537,315 A | 7/1996 | Mitcham | |
| 5,611,052 A | 3/1997 | Dykstra et al. | |
| 5,615,268 A | 3/1997 | Bisbee et al. | |
| 5,689,649 A | 11/1997 | Altman et al. | |

(Continued)

FOREIGN PATENT DOCUMENTS

WO  WO 9948036 A1  9/1999

(Continued)

OTHER PUBLICATIONS

Website at http://www2.chass.ncsu.edu/garson.pa765/index.htm; document "Multiple Regression" found under "Statenotes" tab Oct. 15, 2002.*

(Continued)

*Primary Examiner* — James Kramer
*Assistant Examiner* — Carol See
(74) *Attorney, Agent, or Firm* — Foley & Lardner LLP

(57) ABSTRACT

A computerized mortgage loan data processing system comprises a loan cost analysis engine which compares data pertaining to loan pricing for a mortgage loan with loan pricing standards to evaluate whether the loan pricing is in compliance with the loan pricing standards. An interface is configured to provide an indication regarding whether the loan pricing is in compliance with the loan pricing standards prior to closing of the loan or prior to sale of the mortgage loan in the secondary mortgage market. The indication may be provided to a mortgage loan advisor or to a secondary mortgage market purchaser.

26 Claims, 69 Drawing Sheets

U.S. PATENT DOCUMENTS

| | | | |
|---|---|---|---|
| 5,689,650 A | 11/1997 | McClelland et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,848,393 A | 12/1998 | Goodridge et al. | |
| 5,870,721 A | 2/1999 | Norris | |
| 5,878,403 A | 3/1999 | DeFrancesco et al. | |
| 5,878,404 A | 3/1999 | Stout, Jr. et al. | |
| 5,930,775 A | 7/1999 | McCauley et al. | |
| 5,930,776 A | 7/1999 | Dykstra et al. | |
| 5,940,811 A | 8/1999 | Norris | |
| 5,940,812 A | 8/1999 | Tengel et al. | |
| 5,966,699 A | 10/1999 | Zandi | |
| 5,970,464 A | 10/1999 | Apte et al. | |
| 5,974,372 A | 10/1999 | Barnes et al. | |
| 5,983,206 A | 11/1999 | Oppenheimer | |
| 5,995,947 A | 11/1999 | Fraser et al. | |
| 6,014,645 A | 1/2000 | Cunningham | |
| 6,021,202 A | 2/2000 | Anderson et al. | |
| 6,029,149 A | 2/2000 | Dystra et al. | |
| 6,035,288 A | 3/2000 | Solomon | |
| 6,044,362 A | 3/2000 | Neely | |
| 6,076,070 A | 6/2000 | Stack | |
| 6,088,686 A | 7/2000 | Walker et al. | |
| 6,105,007 A | 8/2000 | Norris | |
| 6,112,190 A | 8/2000 | Fletcher et al. | |
| 6,119,103 A | 9/2000 | Basch et al. | |
| 6,125,349 A | 9/2000 | Maher | |
| 6,144,948 A | 11/2000 | Walker et al. | |
| 6,202,053 B1 | 3/2001 | Christiansen et al. | |
| 6,226,624 B1 | 5/2001 | Watson et al. | |
| 6,233,566 B1 | 5/2001 | Levine et al. | |
| 6,289,319 B1 | 9/2001 | Lockwood | |
| 6,311,169 B2 | 10/2001 | Duhon | |
| 6,324,526 B1 | 11/2001 | D'Agostino | |
| 6,367,013 B1 | 4/2002 | Bisbee et al. | |
| 6,385,594 B1 | 5/2002 | Lebda et al. | |
| 6,401,070 B1 | 6/2002 | McManus et al. | |
| 6,405,181 B2 | 6/2002 | Lent et al. | |
| 6,430,539 B1 | 8/2002 | Lazarus et al. | |
| 6,438,526 B1 | 8/2002 | Dykes et al. | |
| 6,505,176 B2 | 1/2003 | DeFrancesco, Jr. et al. | |
| 6,513,018 B1 | 1/2003 | Culhane | |
| 6,532,450 B1 | 3/2003 | Brown et al. | |
| 6,584,467 B1 | 6/2003 | Haught et al. | |
| 6,594,635 B1 | 7/2003 | Erlanger | |
| 6,609,109 B1 | 8/2003 | Bradley et al. | |
| 6,611,816 B2 | 8/2003 | Lebda et al. | |
| 6,651,884 B2 | 11/2003 | Prendergast et al. | |
| 6,671,673 B1 | 12/2003 | Baseman et al. | |
| 6,823,319 B1 | 11/2004 | Lynch et al. | |
| 6,985,886 B1 | 1/2006 | Broadbent et al. | |
| 6,988,082 B1 | 1/2006 | Williams et al. | |
| 7,089,503 B1 | 8/2006 | Bloomquist et al. | |
| 7,107,241 B1 | 9/2006 | Pinto | |
| 7,146,337 B1 | 12/2006 | Ward et al. | |
| 7,289,965 B1 | 10/2007 | Bradley et al. | |
| 7,299,408 B1 | 11/2007 | Daconta et al. | |
| 7,593,893 B1 | 9/2009 | Ladd et al. | |
| 2001/0005829 A1 | 6/2001 | Raveis, Jr. | |
| 2001/0029482 A1* | 10/2001 | Tealdi et al. | 705/38 |
| 2001/0032178 A1 | 10/2001 | Adams et al. | |
| 2001/0037287 A1 | 11/2001 | Broadbent et al. | |
| 2001/0042035 A1 | 11/2001 | Kelly et al. | |
| 2001/0047326 A1* | 11/2001 | Broadbent et al. | 705/38 |
| 2002/0029154 A1 | 3/2002 | Majoor | |
| 2002/0029194 A1 | 3/2002 | Lewis et al. | |
| 2002/0032635 A1 | 3/2002 | Harris et al. | |
| 2002/0035520 A1 | 3/2002 | Weiss | |
| 2002/0038318 A1 | 3/2002 | Cochran et al. | |
| 2002/0040339 A1 | 4/2002 | Dhar et al. | |
| 2002/0052815 A1 | 5/2002 | Johnson et al. | |
| 2002/0052835 A1 | 5/2002 | Toscano | |
| 2002/0059137 A1 | 5/2002 | Freeman et al. | |
| 2002/0077968 A1 | 6/2002 | Kaniwa et al. | |
| 2002/0087364 A1 | 7/2002 | Lerner et al. | |
| 2002/0087389 A1 | 7/2002 | Sklarz et al. | |
| 2002/0091550 A1 | 7/2002 | White et al. | |
| 2002/0091630 A1 | 7/2002 | Inoue | |
| 2002/0099650 A1 | 7/2002 | Cole | |
| 2002/0111835 A1 | 8/2002 | Hele et al. | |
| 2002/0111901 A1 | 8/2002 | Whitney | |
| 2002/0133371 A1 | 9/2002 | Cole | |
| 2002/0138414 A1 | 9/2002 | Baker, IV | |
| 2002/0152155 A1 | 10/2002 | Greenwood et al. | |
| 2002/0152165 A1 | 10/2002 | Dutta et al. | |
| 2002/0152170 A1 | 10/2002 | Dutta et al. | |
| 2003/0018558 A1 | 1/2003 | Heffner et al. | |
| 2003/0023610 A1 | 1/2003 | Bove et al. | |
| 2003/0028478 A1 | 2/2003 | Kinney et al. | |
| 2003/0033241 A1 | 2/2003 | Harari | |
| 2003/0033242 A1* | 2/2003 | Lynch et al. | 705/38 |
| 2003/0036994 A1 | 2/2003 | Witzig et al. | |
| 2003/0036995 A1 | 2/2003 | Lazerson | |
| 2003/0036996 A1 | 2/2003 | Lazerson | |
| 2003/0046223 A1 | 3/2003 | Crawford et al. | |
| 2003/0055778 A1* | 3/2003 | Erlanger | 705/38 |
| 2003/0065614 A1 | 4/2003 | Sweeney | |
| 2003/0093365 A1* | 5/2003 | Halper et al. | 705/38 |
| 2003/0093366 A1 | 5/2003 | Halper et al. | |
| 2003/0101086 A1 | 5/2003 | San Miguel | |
| 2003/0110249 A1 | 6/2003 | Buus et al. | |
| 2003/0144949 A1 | 7/2003 | Blanch | |
| 2003/0149658 A1 | 8/2003 | Rossbach et al. | |
| 2003/0167191 A1 | 9/2003 | Slabonik et al. | |
| 2003/0172025 A1 | 9/2003 | Gallina | |
| 2003/0177032 A1 | 9/2003 | Bonissone et al. | |
| 2003/0182159 A1 | 9/2003 | Bonissone et al. | |
| 2003/0187696 A1 | 10/2003 | Bonissone et al. | |
| 2003/0187697 A1 | 10/2003 | Bonissone et al. | |
| 2003/0187698 A1 | 10/2003 | Bonissone et al. | |
| 2003/0187699 A1 | 10/2003 | Bonissone et al. | |
| 2003/0187700 A1 | 10/2003 | Bonissone et al. | |
| 2003/0187701 A1 | 10/2003 | Bonissone et al. | |
| 2003/0187702 A1 | 10/2003 | Bonissone et al. | |
| 2003/0187849 A1 | 10/2003 | Ruby et al. | |
| 2003/0208385 A1 | 11/2003 | Zander et al. | |
| 2003/0212654 A1 | 11/2003 | Harper et al. | |
| 2003/0217034 A1 | 11/2003 | Shutt | |
| 2003/0220879 A1 | 11/2003 | Gaughan et al. | |
| 2003/0225662 A1 | 12/2003 | Horan et al. | |
| 2003/0229553 A1 | 12/2003 | Kongyingyong et al. | |
| 2003/0229581 A1 | 12/2003 | Green et al. | |
| 2003/0233260 A1 | 12/2003 | Snell et al. | |
| 2003/0233316 A1 | 12/2003 | Hu et al. | |
| 2004/0002915 A1 | 1/2004 | McDonald et al. | |
| 2004/0019517 A1 | 1/2004 | Sennott | |
| 2004/0030616 A1 | 2/2004 | Florance et al. | |
| 2004/0030649 A1 | 2/2004 | Nelson et al. | |
| 2004/0034592 A1 | 2/2004 | Hu et al. | |
| 2004/0049439 A1 | 3/2004 | Johnston et al. | |
| 2004/0049445 A1 | 3/2004 | Kishore | |
| 2004/0059653 A1 | 3/2004 | Verkuylen et al. | |
| 2004/0059670 A1 | 3/2004 | Mills | |
| 2004/0064402 A1 | 4/2004 | Dreyer et al. | |
| 2004/0107161 A1 | 6/2004 | Tanaka et al. | |
| 2004/0122717 A1 | 6/2004 | Hancock | |
| 2004/0138996 A1* | 7/2004 | Bettenburg et al. | 705/38 |
| 2004/0143450 A1* | 7/2004 | Vidali | 705/1 |
| 2004/0193534 A1 | 9/2004 | Reis | |
| 2004/0199458 A1 | 10/2004 | Ho | |
| 2004/0243509 A1 | 12/2004 | Schulkins | |
| 2005/0080722 A1 | 4/2005 | Kemper et al. | |
| 2005/0102229 A1 | 5/2005 | Kemper et al. | |
| 2005/0108028 A1 | 5/2005 | Arehart | |
| 2005/0125349 A1 | 6/2005 | Bressard | |
| 2005/0289046 A1 | 12/2005 | Conyack, Jr. | |
| 2007/0179828 A1 | 8/2007 | Elkin et al. | |

FOREIGN PATENT DOCUMENTS

| | | |
|---|---|---|
| WO | WO 0021011 A2 | 4/2000 |
| WO | WO 0062209 A1 | 10/2000 |
| WO | WO 0075833 A2 | 12/2000 |
| WO | WO 0116845 A1 | 3/2001 |
| WO | WO 0118718 A1 | 3/2001 |

| | | | |
|---|---|---|---|
| WO | WO 01/27832 A1 | 4/2001 |
| WO | WO 0133461 A1 | 5/2001 |
| WO | WO 0139079 A1 | 5/2001 |
| WO | WO 01/41019 A2 | 6/2001 |
| WO | WO 0150318 A2 | 7/2001 |
| WO | WO 0163445 A2 | 8/2001 |
| WO | WO 0163446 A2 | 8/2001 |
| WO | WO 0163534 A2 | 8/2001 |
| WO | WO 0180123 A1 | 10/2001 |
| WO | WO 0198999 A2 | 12/2001 |
| WO | WO 02/06989 A1 | 1/2002 |
| WO | WO 0208855 A2 | 1/2002 |
| WO | WO 0223443 A1 | 3/2002 |
| WO | WO 02/084925 A2 | 10/2002 |
| WO | WO 02093286 A2 | 11/2002 |
| WO | WO 03009152 A1 | 1/2003 |
| WO | WO 03/071380 A2 | 8/2003 |
| WO | WO 03/071388 A2 | 8/2003 |

OTHER PUBLICATIONS

Wayback machine page for compliancetech website 2002.*
Introduction page at http://www.compliancetech.com website, 2002.*
Intro to Compliance Newsletter and Shamus Q&A at http://www.compliancetech.com website, 2002.*
Shamus Q&A at http://www.compliancetech.com website, 2002.*
Compliance Newsletter at http://www.compliancetech.com website, 2002.*
Shamus, The Compliance Risk Management System 1995 at http://www.compliancetech.com/files/Shamus.pdf.*
Intro to Compliance Newsletter and Shamus Q&A at http://www.compliancetech.com website, 2002.*
Shamus Q&A at http://www.compliancetech.com website, 2002.*
Fannie Mae, "Delivering Loans for MBS", 1996, 138 pages, Fannie Mae, Washington, DC, USA.
Fannie Mae, "Guide to Underwriting with Desktop Underwriter", Oct. 1997, 152 pages, Verison 4.0, Fannie Mae, Washington, DC, USA.
Fannie Mae, "MORNET MBS Pool Submission System User's Guide", Sep. 1998, 259 pages, Version 5.3, Fannie Mae, Washington, DC, USA.
Fannie Mae, "Making Good Delivery a Guide to Delivering Loans for Cash and MBS", 1994, 121 pages, Fannie Mae, Washington, DC, USA.
Fannie Mae, "MORNET Cash Delivery System User's Guide", Nov. 1997, 177 pages, Version 2.6, Fannie Mae, Washington, DC, USA.
Fannie Mae, "Delivering Loans for Cash", 1997, 96 pages, Fannie Mae, Washington, DC, USA.
Fannie Mae, "MORNET Manager User's Guide", Nov. 1998, 187 pages, Version 3.0, Fannie Mae, Washington, DC, USA.
Fannie Mae, "MORNET Servicing Support System User's Guide", Dec. 1998, 370 pages, Fannie Mae, Washington, DC, USA.
Fannie Mae, "Selling", Jun. 30, 2002, 168 pgs, Fannie Mae, USA.
Fannie Mae, "Investor Accounting: Cash", 1996, 132 pages, Fannie Mae, Washington, DC, USA.
Fannie Mae, "Secondary Marketing: Cash", 1997, 81 pages, Fannie Mae, USA.
Fannie Mae, "General Servicing Fundamentals", 1996, 188 pages, Fannie Mae, USA.
Laser Overview, May 1993, chapters 1-18.
Fannie Mae, "Servicing Guide", 1995-2002 et al, 319 pages, Forward, Table of Contents, Sections III, IX, X, and XI, Fannie Mae, USA.
Fannie Mae, "Selling", 1995-2002 et al, 1119 pgs, Fannie Mae, USA.
Fannie Mae, "Guide to Underwriting with Desktop Underwriter®", Sep. 2002; 63 pgs.
EDOCS, "edocs Teams with Fannie Mae to Offer Lenders Online Account Management Solution," Press Release, Mar. 12, 2001, 2 pgs., edocs, Inc., USA.
Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.
Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.
Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.
Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.
Object Management Group, "Fannie Mae", COBRA Banking/Finance, Sep. 17, 2001, 2 pgs, Object Management Group, Needham, MA, USA.
Smith Tom, "E-Commerce Holds Keys to Home Ownership: Fannie Mae drives hug volumes of mortgage business to its e-marketplace," Internetweek.com, Undated, 5 pgs., Internetweek.com, USA.
Smith Tom, "Fannie Mae Ramps up Web Apps: Q&A with Julie St. John, Executive Vice President and Chief Technology Office and Michael Williams President of Fannie Mae e-Business," Internetweek.com, Undated, 11 pgs., Internetweek.com, USA.
Sun, "Success on Sun: Software Development Case Study Federal National Mortgage Association (Fannie Mae)," Mar. 1995, 10 pgs, Sun, USA.
Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.
Williams Michael, "Technology and Other Keys to the Boom in Refinancing," American Banker, Apr. 20, 2003, 3 pgs, vol. 168, Issue 63, p. 8., American Banker USA.
Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.
REASA Real Estate Automated Service Associates, LLC website materials (www.reasa.com).
U.S. Appl. No. 09/593,106, filed Jun. 13, 2000, Williams et al.
U.S. Appl. No. 10/736,291, filed Dec. 15, 2003, Voth et al.
U.S. Appl. No. 10/736,399, filed Dec. 15, 2003, Voth et al.
U.S. Appl. No. 10/736,400, filed Dec. 15, 2003, Voth et al.
U.S. Appl. No. 10/736,484, filed Dec. 15, 2003, Voth et al.
U.S. Appl. No. 10/743,484, filed Dec. 22, 2003 Williams, et. al.
U.S. Appl. No. 10/743,506, filed Dec. 22, 2003, Williams et. al.
U.S. Appl. No. 10/744,166, filed Dec. 23, 2003, Williams et. al.
U.S. Appl. No. 10/744,552, filed Dec. 23, 2003, Williams et. al.
U.S. Appl. No. 10/745,103, filed Dec. 23, 2003, Williams et. al.
U.S. Appl. No. 10/745,105, filed Dec. 23, 2003, Williams et. al.
U.S. Appl. No. 11/490,614, filed Jul. 21, 2006, Williams et. al.
U.S. Appl. No. 11/491,000, filed Jul. 21, 2006, Voth et al.
U.S. Appl. No. 11/805,410, filed May 23, 2007, Williams et. al.
Alcorn Lowell, "Killing the Paper," Mortgage Banking, Aug. 2005, 3 pgs, Mortgage Bankers Association, Washington, DC, USA.
Allen Rob and Zur Muehlen Michael, "Workflow Classification Embedded & Autonomous Workflow Mangement Systems," Workflow Management Coalition, Mar. 10, 2000, 8 pgs, Workflow Management Coalition, Hingham, MA, USA.
Allen Rob, "Workflow: An Introduction," Workflow Handbook, 2001, 24 pgs, Workflow management Coalition, Hingham, MA, USA.
Anderson Mike and Allen Rob, "Workflow Interoperability—Enabling E-Commerce," WfMC White Paper, Apr. 1, 1999, 12 pgs, Workflow Management Coalition, Hingham, MA, USA.
Detwiler Michael, "Getting a Grip on Workflow," Mortgage Banking, Aug. 2004, 4 pgs, Mortgage Bankers Association, Washington, DC, USA.
Focardi Craig, "Mortgage Technology: The Next Big Thing(s)," FinanceTech, Apr. 27, 2004, 14 pgs, InformationWeek Media Network, Manhasset, NY, USA.
Harris Jeanne G., and Brooks Jeffrey D., "In the Mortgage Industry, IT Matters," Mortgage Banking, Dec. 2004, 4 pgs, Mortgage Bankers Association, Washington, DC, USA.

Hollingsworth David, "The Workflow Reference Model 10 Years on," Workflow Handbook, 2004, 18 pgs, Workflow Management Coalition, Hingham, MA, USA.
ICL Enterprises, "A Common Object Model," The Workflow Management Coalition, 1994, 16 pgs, Workflow Management Coalition, Winchester, United Kingdom.
Johnston Judy, "Paperless is More," Mortgage Banking, Dec. 2004, 4 pgs, Mortgage Bankers Association, Washington, DC, USA.
Kelvie Bill and Kraft Michael, "Technology in the Mortgage Industry: The Fannie Mae Experience," IT Pro, May-Jun. 2002, vol. 2, Issue 3, 9 pgs, IT Professional, Washington, DC, USA.
Laurie Michael, "Challenge in Automating eMortgages," Mortgage Banking, Dec. 2004, 6 pgs, Mortgage Bankers Association, Washington, DC, USA.
Notice of Allowance for U.S. Appl. No. 11/322,576, mail date May 19, 2009, 4 pages.
Office Action for U.S. Appl. No. 10/736,291, mail date Apr. 13, 2009, 22 pages.
Office Action for U.S. Appl. No. 10/736,291, mail date Dec. 13, 2007, 18 pages.
Office Action for U.S. Appl. No. 10/736,291, mail date Oct. 20, 2008, 22 pages.
Office Action for U.S. Appl. No. 10/736,399, mail date Jan. 9, 2009, 20 pages.
Office Action for U.S. Appl. No. 10/736,399, mail date Jul. 1, 2008, 13 pages.
Office Action for U.S. Appl. No. 10/736,400, mail date Feb. 2, 2009, 25 pages.
Office Action for U.S. Appl. No. 10/736,400, mail date Jul. 25, 2008, 21 pages.
Office Action for U.S. Appl. No. 10/736,400, mail date May 20, 2009, 26 pages.
Office Action for U.S. Appl. No. 10/736,484, mail date Aug. 25, 2008, 30 pages.
Office Action for U.S. Appl. No. 10/736,484, mail date Mar. 12, 2009, 18 pages.
Office Action for U.S. Appl. No. 10/736,484, mail date Nov. 26, 2007, 24 pages.
Office Action for U.S. Appl. No. 11/322,576, mail date Oct. 1, 2008, 16 pages.
Office Action for U.S. Appl. No. 11/490,614, mail date Feb. 9, 2009, 18 pages.
Office Action for U.S. Appl. No. 11/491,000, mail date Aug. 5, 2008, 21 pages.
Office Action for U.S. Appl. No. 11/491,000, mail date Jan. 26, 2009, 26 pages.
Plesums Charles, "Introduction to Workflow," Workflow Handbook, 2002, 20 pgs, Workflow Management Coalition, Hingham, MA, USA.
Prior Carol, "Workflow and Process Management," Workflow Handbook, 2003, 9 pgs, Workflow Management Coalition, Hingham, MA, USA.
Pyke Jon and Whitehead Roger, "Does Better Math Lead to Better Business Processes?" Nov. 14, 2003, 7 pgs, Workflow Management Coalition, Hingham, MA, USA.
Response to Office Action for U.S. Appl. No. 10/736,291, mail date Jan. 21, 2009, 18 pages.
Response to Office Action for U.S. Appl. No. 10/736,291, mail date Jun. 12, 2008, 17 pages.
Response to Office Action for U.S. Appl. No. 10/736,399, mail date Oct. 10, 2008, 16 pages.
Response to Office Action for U.S. Appl. No. 10/736,400, mail date May 4, 2009, 23 pages.
Response to Office Action for U.S. Appl. No. 10/736,400, mail date Oct. 27, 2008, 21 pages.
Response to Office Action for U.S. Appl. No. 10/736,484, mail date May 23, 2008, 18 pages.
Response to Office Action for U.S. Appl. No. 10/736,484, mail date Nov. 25, 2008, 12 pages.
Response to Office Action for U.S. Appl. No. 11/322,576, mail date Feb. 2, 2009, 11 pages.
Response to Office Action for U.S. Appl. No. 11/491,000, mail date Apr. 27, 2009, 29 pages.
Response to Office Action for U.S. Appl. No. 11/491,000, mail date Nov. 5, 2008, 20 pages.
Taglia Pete and Williams Bill, "Managing Fallout in a Volatile World," MBA National Secondary Marketing Conference, Apr. 8, 2003, 41 pgs, Mortgage Bankers Association, Washington, DC USA.
Tenuta John R., "The LOS Meets the e-Mortgage," Mortgage Banking, Oct. 2003, 5 pgs, Mortgage Bankers Association, Washington, DC, USA.
The Japanese Standards Association, "Interworkflow Application Model: The Design of Cross-Organizational Workflow Processes and Distributed Operations Management," The Workflow Management Coalition Specification, Feb. 1997, 31 pgs, Workflow Management Coalition.
Van Valkenburg Paul T., "Pipeline Risk Management: Recent Trends, Strategies and Accounting Implications," MBA Accounting and Tax Conference 2002, Dec. 12, 2002, 21 pgs, Mortgage Bankers Association, Washington, DC, USA.
Williams Michael, "Tools for Emerging Markets, Mortgage Banking," Feb. 2004, 4 pgs, Mortgage Bankers Association, Washington, DC, USA.
Workflow Management Coalition, "Workflow Security Consideration- White Paper," The Workflow Management Coalition Specification, Feb. 1998, 15 pgs, Workflow Management Coalition, Winchester, United Kingdom.

* cited by examiner

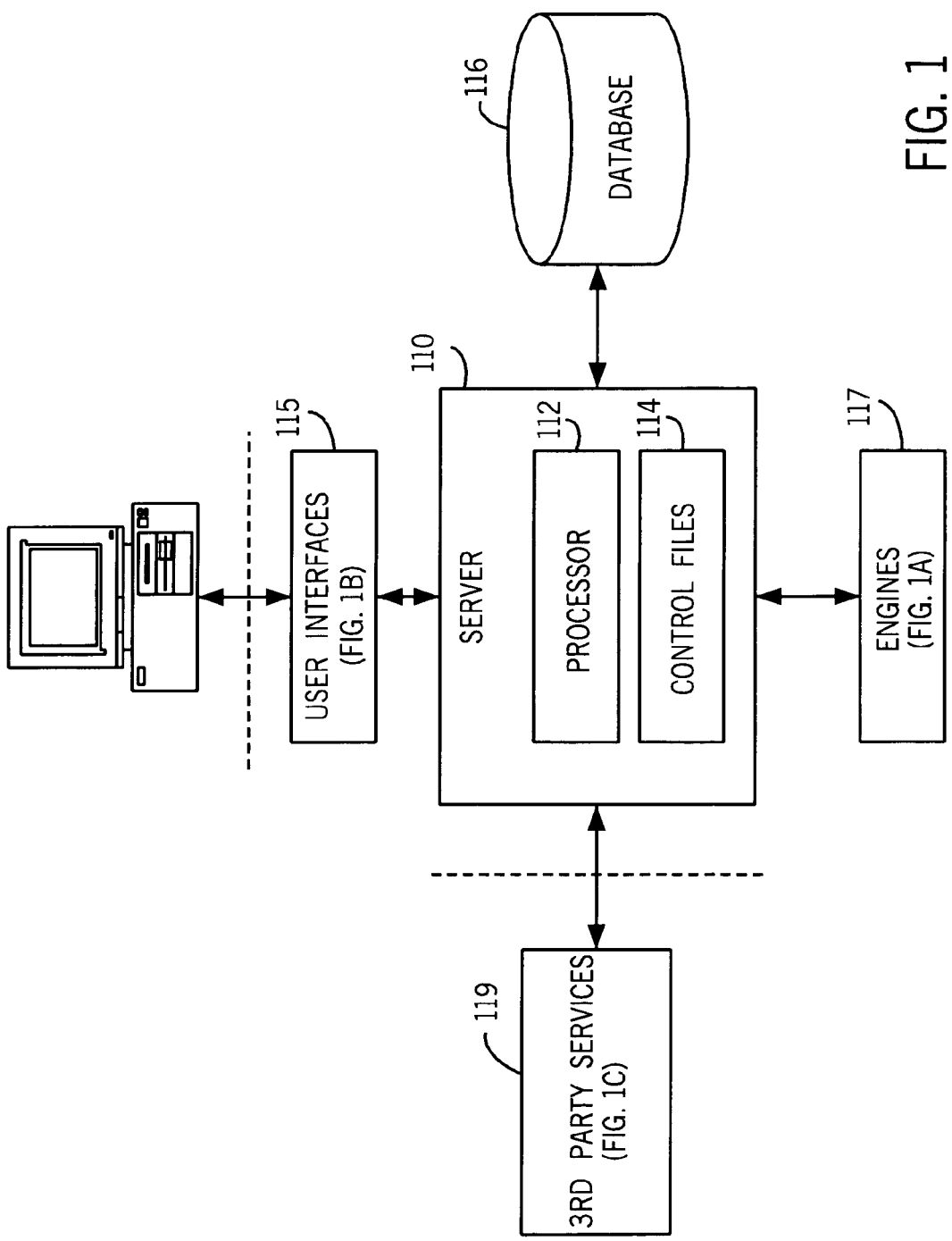

Loan Selection

| Home | About Us | Privacy | Disclosures | License | Contact Us |

ABC Home Mortgage

- Apply Now
- Returning Users
- Learn More
- Use Our Tools
- Check Rates 24 x 7 Customer Service
Call 1-800-555-1234 or Email Here is a sampling of the loan options for which you have been approved. To see any additional loans and rate/point combinations that you have been approved for, click the View More Loan Options button for each loan category. If you would like a written record of your approval, please click here to view and print your approval letter from us.

Click on the Loan Details link for a loan to view additional information. If you decide that's the right loan for you, you can reserve your loan and float or lock your interest rate online at that time.

Working with ABC Mortgage, you will receive the following benefits:
- An appraisal waiver for the specified property.
- Reduced documentation requirements for the income reported in your application.
- Reduced documentation requirements for the assets reported in your application.

NOTE: The rates quoted below are based on current market prices and are valid until 08/23/2002 21:45:00 EST. If you do not take advantage of these rates by 08/23/2002 21:45:00 EST, we will provide you with an updated quote.

View Glossary    Print

Purchase Price: $150,000.00          Loan Amount: $120,000.00

Fixed Rate Mortgages — View More Loan Options — 3020

| Loan Type | Interest Rate | APR | Monthly Payment (P&I) | Points | Estimated Cash to Close | |
|---|---|---|---|---|---|---|
| 30-Year Fixed | 5.750% | 5.920% | $703.12 | 1.000 | $34,600 | Loan Details |
| 15-Year Fixed | 5.250% | 5.420% | $962.14 | 1.000 | $36,845 | Loan Details |

3010 → (30-Year Fixed row)
3012 → (15-Year Fixed row)

Fixed Rate Mortgages — View More Loan Options — 3018

| Loan Type | Interest Rate | APR | Monthly Payment (P&I) | Points | Estimated Cash to Close | |
|---|---|---|---|---|---|---|
| 5/1 ARM | 4.875% | 4.680% | $630.98 | 1.000 | $33,220 | Loan Details |
| 7/1 ARM | 5.125% | 4.970% | $658.64 | 1.000 | $33,960 | Loan Details |

3014 → (5/1 ARM row)
3016 → (7/1 ARM row)

Logout

General approval disclaimer placeholder text.

Equal Housing Lender | Copyright 2002, ABC Home Mortgage

Lorem ipsum dolor sit amet, consectetuer adipiscing elit, sed diem nonummy nibh euismod tincidunt ut laoreet dolore magna aliguam erat volutpat. Ut wisis enim ad minim veniam, quis nostrud exerci tution ullam corper suscipit lobortis nisl ut aliquip ex ea commodo consequat. Duis te feugi facilisi. Duis autem dolor in hendrerit in vulputate velit esse molestie consequat, vel illum dolore eu faugiat nulla facilisis at vero er.

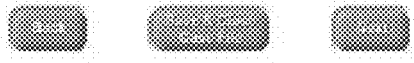
FIG. 44

Case File Manager ProSPAN

| Open/Create Case File | My User Account | Today's Rates | Glossary | Calculators | Logout |

Case File Application Number: 1234  
Business Source Name: ABC Call Center  
Case File Status: Active - Not Registered Applicant Name(s): Ken Bass  
Trusted Advisor: John Doe  
TA Phone Number: (999) 999-9999 9999

[tabs] ... Underwrite & Price Results ...

These rates are valid until 05/29/2003 15:34 PM ET. If the rate quote expires, you will need to re-underwrite this loan application.

Loan Details

| | | | |
|---|---|---|---|
| Loan Product Preference | None | Monthly Homeowner's Association Fees | $0.00 |
| Purchase Price | $150,000.00 | Estimated Monthly Real Estate Taxes | $96.00 |
| Down Payment | $30,000.00 | Estimated Monthly Hazard Insurance | $50.00 |
| Loan Amount | $120,000.00 | Loan To Value Ratio | 80.00 |
| Maximum Approved Loan Amount | $142,500.00 | Combined Loan To Value Ratio | 80.00 |
| New Subordinate Financing Amount | $0.00 | Maximum Loan To Value Ratio For Rate | 80.00 |
| New Subordinate Financing P & I Amount | $0.00 | Maximum Approved Loan Amount for Same Rate | $120,000.00 |

Marketing Messages

- An appraisal waiver for the specified property.
- Reduced documentation requirements for the income reported in your application.
- Reduced documentation requirements for the assets reported in your application.

Approved Loan Products

Select a loan to reserve funds:

[30 Year Fixed] [15 Year Fixed] [20 Year Fixed] [7 Year Balloon] [3/1 ARM] [5/1 ARM] [7/1 ARM] [10/1 ARM] [All Products]

Sort by: [estimated closing costs ▼] [Sort]

| | Base Interest Rate | LDPRA | Total Interest Rate | APR | Monthly P&I | Points | Estimated Closing Costs |
|---|---|---|---|---|---|---|---|
| ⦿ | 6.125% | 0.000 | 6.125% | 6.100% | $729.14 | -0.875 | $32,314 |
| ○ | 6.000% | 0.000 | 6.000% | 5.990% | $719.47 | -0.625 | $33,208 |
| ○ | 5.875% | 0.000 | 5.875% | 5.900% | $709.86 | -0.250 | $33,652 |
| ○ | 5.750% | 0.000 | 5.750% | 5.820% | $700.29 | 0.250 | $34,248 |
| ○ | 5.625% | 0.000 | 5.625% | 5.740% | $690.79 | 0.750 | $34,839 |
| ○ | 5.500% | 0.000 | 5.500% | 5.660% | $681.36 | 1.250 | $35,433 |
| ○ | 5.250% | 0.000 | 5.250% | 5.540% | $662.66 | 2.625 | $37,070 |
| ○ | 5.125% | 0.000 | 5.125% | 5.490% | $653.39 | 3.500 | $38,114 |
| ○ | 5.000% | 0.000 | 5.000% | 5.430% | $644.19 | 4.250 | $39,088 |
| ○ | 4.875% | 0.000 | 4.875% | 5.390% | $635.06 | 5.125 | $40,062 |

Pipeline Manager

Home | Committing | Pricing | Transaction History | My User Account | Logout | Help Welcome to the Secondary Transactions home page, where you can find an overview of transaction activity. For more information, or to manage any of the categories listed below, please choose one of the links above.

Today's Transactions

| Transaction | Time | Count | Amount | Wtd Avg PNY | Wtd Avg Pass-Thru | Wtd Avg Price | Extension Fees | User Name | Status |
|---|---|---|---|---|---|---|---|---|---|
| Sell/Fund | Jul-01-02 11:01AM | 175 | $19,250,000 | 0.0000% | 0.0000% | 100.00000 | $00,000 | s9ucmm | Completed |
| Sell/Fund | Jul-01-02 11:04AM | 123 | $13,530,000 | 0.0000% | 0.0000% | 100.00000 | $00,000 | sxunna | Completed |

Committing / Best Efforts

Eligible to Commit

| | Count | Amount | Wtd Avg Note Rate |
|---|---|---|---|
| 30 Yr Fixed | 2 | $125,000 | 6.3750% |
| 15 Yr Fixed | 1 | $75,000 | 6.3750% |
| Total | 3 | $200,000 | 6.3750% |

— 5320

Need Extensions

| | Count | Amount | Wtd Avg Note Rate |
|---|---|---|---|
| 30 Yr Fixed | 2 | $125,000 | 6.3750% |
| 15 Yr Fixed | 1 | $75,000 | 6.3750% |
| Total | 3 | $200,000 | 6.3750% |

— 5330

Need Product Changes

| | Count | Amount | Wtd Avg Note Rate |
|---|---|---|---|
| 30 Yr Fixed | 2 | $220,000 | 6.5000% |
| 15 Yr Fixed | 1 | $100,000 | 6.5000% |
| Total | 3 | $320,000 | 6.5000% |

— 5340

Upcoming Expirations

| | Count | Amount | Wtd Avg Note Rate |
|---|---|---|---|
| Today | 6 | $660,000 | 6.5000% |
| Next 1-3 Days | 30 | $3,000,000 | 6.5000% |
| Next 4-7 Days | 36 | $3,960,000 | 6.5000% |
| Total | 72 | $7,620,000 | 6.5000% |

— 5350

All Active Commitments — Best Efforts

| | Count | Amount | Wtd Avg PNY | Wtd Avg Pass-Thru | Wtd Avg Price | Extension Fees |
|---|---|---|---|---|---|---|
| 30 Yr Fixed | 675 | $74,250,000 | 0.0000% | 6.0000% | 101.00000 | $618 |
| 20 Yr Fixed | 25 | $2,750,000 | 0.0000% | 6.0000% | 101.00000 | $0 |
| 15 Yr Fixed | 100 | $11,000,000 | 0.0000% | 6.0000% | 101.00000 | $0 |
| Total | 800 | $88,000,000 | 0.0000% | 6.0000% | 101.00000 | $618 |

— 5360

Pricing

Loans to Value

| | Loans Imported | Loans Marked | Total Loan Amount | Market Price | Loans Not Priced |
|---|---|---|---|---|---|
| Mandatory | 2391 | 2269 | $379,883,791 | 101.00000 | 122 |
| Best Efforts | 800 | 800 | $88,000,000 | 101.00000 | 0 |
| Total | 3191 | 3069 | $467,883,791 | 101.00000 | 122 |

Loans to Sell

| | Loans Imported | Loans Sold | Sale Price | Sale Price (dollars) | Fees & Interest | Total Proceeds | Loans Not Sold |
|---|---|---|---|---|---|---|---|
| Mandatory | 363 | 332 | 101.00000 | $55,087,686 | $00,000 | $55,087,686 | 31 |
| Best Efforts | 6 | 6 | 101.00000 | $660,000 | $00,000 | $660,000 | 0 |
| Total | 369 | 332 | 101.00000 | $55,747,686 | $00,000 | $55,747,686 | 31 |

SYSTEMS AND METHODS FOR FACILITATING THE FLOW OF CAPITAL THROUGH THE HOUSING FINANCE INDUSTRY

CROSS-REFERENCE TO RELATED PATENT APPLICATIONS

The present application claims the benefit of priority under 35 U.S.C. §119(e) to U.S. Patent Application No. 60/488,785 entitled "Systems and Methods for Facilitating the Flow of Capital Through the Housing Finance Industry" filed Jul. 21, 2003, the entire disclosure of which is hereby incorporated by reference.

FIELD OF THE INVENTION

The present invention relates generally to facilitating the flow of capital through the housing finance industry. The present invention more particularly relates to providing computer systems and methods to support various participants throughout multiple stages of the mortgage loan process, from originating a mortgage loan for a consumer to facilitating the disposition of mortgages in the secondary mortgage market.

BACKGROUND OF THE INVENTION

The purchase of a home is typically the largest investment that a person makes. Because of the amount of money required to purchase a home, most consumers (such as home buyers, loan customers, loan applicants, potential borrowers, etc.) do not have sufficient assets to purchase a home outright on a cash basis. In addition, consumers who have already purchased a home may wish to refinance their home, either to obtain a lower interest rate or to liquidate equity (i.e., a cash-out refinance loan). Therefore, consumers work with lenders such as banks, credit unions, mortgage companies, savings and loan institutions, state and local housing finance agencies, and so on, to obtain the funds necessary to purchase or refinance their homes. Consumers contact lenders through one or more of the lender's business channels, such as over the Internet, through a call center or through the lender's agents such as mortgage brokers or loan officers. These lenders offer a variety of mortgage products to these consumers. The lenders who directly or through their agents make (originate and fund) mortgage loans to consumers comprise the "primary mortgage market."

When a mortgage is made in the primary mortgage market, the lender may: (i) hold the loan as an investment in its portfolio; or (ii) sell the loan to investors in the "secondary mortgage market" (e.g., pension funds, insurance companies, securities dealers, financial institutions and various other investors) to replenish its supply of funds to make more loans. The loan may be sold alone, or in packages of other loans, for cash or in exchange for mortgage-backed securities which provide lenders with a liquid asset to hold or sell to the secondary market. By choosing to sell its mortgage loans to the secondary mortgage market for cash, or by selling the mortgage-backed securities, lenders renew their supply of funds to make more home mortgage loans, thereby assuring consumers a continual supply of mortgage credit.

Several steps or processes are typically involved in originating and funding mortgage loans in the primary mortgage market. Such steps include completing and receiving loan applications for mortgage products, underwriting and pricing mortgage products, analyzing, comparing and selecting a mortgage product, loan processing and closing, funding of the loan, etc. Additionally, several steps or processes are typically involved in selling or otherwise disposing of the mortgage loan in the secondary mortgage market. Such steps include analyzing and choosing the best execution for a given loan or loans (such as determining whether to retain or "portfolio" a closed loan, determining to which secondary mortgage market participants (if any) the closed loans should be sold and at what price, or other decisions affecting the final disposition of a closed loan), hedging interest rates, committing the mortgage loan to a secondary market purchaser, effectuating an actual sale of the mortgage loan, delivery of the mortgage loans to the purchaser, etc.

Lenders who make mortgage loans directly to consumers may not be well equipped to provide efficient or capable systems to serve all the needs of their customers in the primary market, service multiple business channels in an integrated fashion, provide efficient or capable systems to sell into the secondary market, and meet the requirements of secondary mortgage market investors. Current systems are configured to handle a discrete portion or process within the overall mortgage process. For example, current applications or tools may be implemented to allow a consumer to complete a loan application on-line. Other systems may handle applications initiated by a lender's agent, such as a mortgage broker. Other systems may handle the underwriting or scoring of an application. Yet other systems may handle the aggregation of loans for sale in the secondary market or the delivery of funding of the mortgages in the secondary market. Furthermore, multiple, separate systems may be needed to handle different business channels of the lender (such as a consumer-direct business channel, broker channel, loan officers, call center, etc.).

However, in order for lenders to handle the full breadth of activity associated with the mortgage process, conventional systems available to lenders require data to be transferred from one system to another by porting, manual entry or other inefficient processes. In addition, applications used within a lender's shop by different business channels (e.g., loan officers, call center) may not employ common data sets and may not be able to communicate with one another. With an interest rate sensitive product like a mortgage loan in constantly changing market conditions, time is essential. Having separate systems leads to inefficiencies for all participants (consumers, lenders, mortgage purchasers, etc.) such as increased cost, additional labor costs, keying errors, wasted time, etc.

Accordingly, it would be advantageous to provide an integrated, brandable, Internet-based tool (or other network-based tool) that services or supports different business channels of a lender (such as consumer-direct, call centers, agents, etc.) and that employs common data for the different business channels. It would further be advantageous to assist lenders in originating and processing loans by providing a complete software product to a lender for use across business channels. The complete software product, which supports multiple business channels, would benefit a lender (especially smaller lenders) by increasing efficiency, lowering lender operating costs, and generally resulting in more capital being available to lend. It would further be advantageous to provide an integrated database to allow multiple users access to the same database having data associated with one or more mortgage loans. It would further be advantageous to provide a computerized system and method which would provide multiple user interfaces, each user interface having access to some or all of the data provided on the integrated database. It would further be advantageous to provide a computerized system and method which allows consumers to choose amongst multiple approved loan products including multiple rate/point combinations for the products. It would further be advantageous to provide a computerized system and method which would facilitate the receipt and processing of mortgage loan applications from consumers. It would further be advantageous to provide a computerized system and method which would facilitate the multiple processes associated with the pricing, closing, and disposition of mortgage loans. It would further be advantageous to provide a computerized system and method which would facilitate the pricing, hedging, selecting a best execution, sale and disposition of mortgage loans to secondary mortgage market participants.

It would be desirable to provide a computerized system and method or the like of a type disclosed in the present application that includes any one or more of these or other advantageous features. It should be appreciated, however, that the teachings herein may also be applied to achieve systems and methods that do not necessarily achieve any of the foregoing advantages but rather achieve different or additional advantages.

SUMMARY OF THE INVENTION

According to a first preferred embodiment, a computerized mortgage loan data processing system is provided. The system comprises an advisor interface and a loan cost analysis engine. The advisor interface is configured to receive mortgage loan application data from a mortgage loan advisor. The mortgage loan application data pertains to a potential borrower and to a mortgage loan application for a mortgage loan for the potential borrower. The loan cost analysis engine is configured to compare, prior to closing of the loan, data pertaining to the loan pricing for the mortgage loan with loan pricing standards to evaluate whether the loan pricing is in compliance with the loan pricing standards. The advisor interface is configured to provide an indication to the mortgage loan advisor regarding whether the loan pricing is in compliance with the loan pricing standards prior to closing of the loan.

According to a second preferred embodiment, a mortgage loan analysis method implemented by a mortgage loan data processing system comprises receiving mortgage loan application data pertaining to a potential borrower and to a mortgage loan application for a mortgage loan for the potential borrower, comparing data pertaining to loan pricing for the mortgage loan with loan pricing standards to evaluate whether the loan pricing is in compliance with the loan pricing standards, and providing the user with an indication whether the loan pricing is in compliance with the loan pricing standards prior to closing of the loan. The mortgage loan application data is received from a user of a user interface of the mortgage loan data processing system.

According to a third preferred embodiment, a computerized mortgage loan data processing system comprises an advisor interface, a data storage system, a loan cost analysis engine, and an investor interface. The advisor interface is configured to receive mortgage loan application data from a user. The mortgage loan application data pertains to a potential borrower and to a mortgage loan application for a mortgage loan for the potential borrower. The data storage system has mortgage loan data stored therein for a plurality of mortgage loans, including the mortgage loan application data received by the advisor interface for the mortgage loan. The loan cost analysis engine is configured to compare data pertaining to the loan pricing for the mortgage loan with loan pricing standards to evaluate whether the loan pricing is in compliance with the loan pricing standards. The investor interface is configured for use by a secondary mortgage market investor. The investor interface is configured to provide an indication to the secondary mortgage market investor regarding whether the loan pricing is in compliance with the loan pricing standards. The indication is provided prior to sale of the mortgage loan to the secondary mortgage market investor.

According to a fourth preferred embodiment, a computer-implemented method for mortgage loan analysis comprises receiving data pertaining to loan pricing for a mortgage loan that has been made to a borrower, comparing the data with loan pricing standards and producing an output indicating whether the loan pricing is in compliance with the loan pricing standards, and providing an indication whether the loan pricing is in compliance with the loan pricing standards to a secondary mortgage market investor prior to a sale of the mortgage loan to the secondary mortgage market investor.

According to a fifth preferred embodiment, a loan cost analysis engine is configured to receive mortgage loan application data pertaining to potential borrowers and to mortgage loan applications for mortgage loans for the potential borrowers. For each mortgage loan application, the loan cost analysis engine is configured to compare data pertaining to loan pricing for the corresponding mortgage loan with loan pricing standards to evaluate whether the loan pricing is in compliance with the loan pricing standards. The loan cost analysis engine is configured to generate a code associated with the mortgage loan. The code is useable to validate that the mortgage loan was submitted for analysis by the loan cost analysis engine and to provide an indication of results of the analysis by the loan cost analysis engine.

According to a sixth preferred embodiment, a computer-implemented method for mortgage loan analysis comprises receiving loan application data and loan pricing data, generating a loan cost analysis determination, and providing the underwriting determination and the loan cost determination to an originator prior to closing of the loan. The loan application pertains to a mortgage loan application. The loan pricing data pertains to loan pricing for a loan associated with the mortgage loan application. The loan cost analysis determination provides an indication whether the loan pricing complies with loan pricing standards.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications

BRIEF DESCRIPTION OF THE DRAWINGS

FIG. 1 is a schematic representation of a computer system for mortgage loan processing according to an exemplary embodiment.

FIGS. 11-32 are depictions of a consumer-direct user interface for access to the system shown in FIG. 1.

FIGS. 35-52 are depictions of a call center user interface for access to the system shown in FIG. 1.

FIGS. 53-59 are depictions of a pipeline manager user interface for access to the system shown in FIG. 1.

FIGS. 60-62 are depictions of a platform administrator user interface for, access to the system shown in FIG. 1.

FIGS. 63-66 are depictions of an access administrator user interface for access to the system shown in FIG. 1.

DETAILED DESCRIPTION OF THE PREFERRED EMBODIMENTS

Figure 1A:
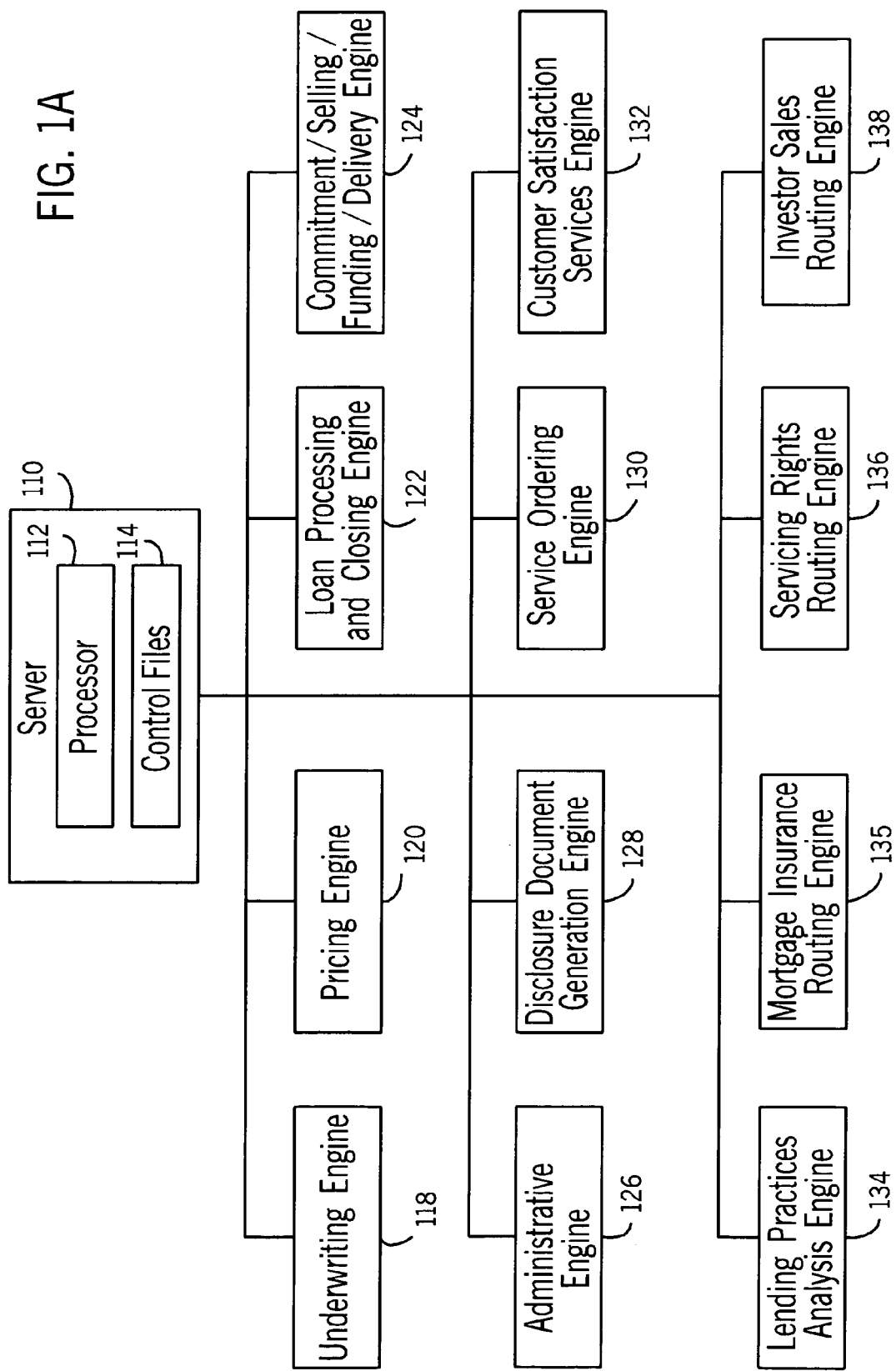
FIGS. 1A-1C show aspects of FIG. 1 in greater detail.

Exemplary embodiments of computer systems and methods for facilitating the flow of capital through the housing finance industry are disclosed. The systems and methods disclosed are intended to provide an integrated platform which allows lenders (such as banks, credit unions, mortgage companies, savings and loan institutions, state and local housing finance agencies, etc.) to efficiently originate and provide loans in the primary mortgage market, while still providing the lenders an efficient way to sell, transfer or otherwise dispose of mortgages in the secondary mortgage market. The systems and methods disclosed are further intended to provide support to lenders and other various participants in a mortgage loan process throughout multiple stages of the mortgage loan process, from consumer education, pre-qualification, and loan application to facilitating disposition of the mortgages in the secondary mortgage market and setup of loan servicing.

The systems and methods disclosed provide an integrated and brandable electronic lending infrastructure to facilitate to flow of capital through the housing finance industry. The systems and methods provide a complete package (i.e., a turn-key system) for a lender by making available to all lenders (even lenders without expertise to develop web sites, develop and maintain software, hardware, etc.) the features and functionality disclosed. A server and/or web site may be provided and maintained by a third party service while still providing valuable lender branding and lender identification to a consumer. Lenders without expertise in web site development and system administration are provided with a brandable system that they can configure with their own logos, color schemes, fonts, and text messages to provide the system with a "look and feel" that is consistent with the lenders' corporate identity. The preferred systems and methods disclosed can work with an existing loan origination system (LOS), secondary market system, or quality control system, or these may be provided with the system disclosed herein. The systems and methods disclosed may also be used by multiple lending institutions, each with their own branding and loan data.

The system provides an integrated system with an integrated database to be accessed by multiple parties. Advantageously, the system provides common access to the same data (such as via a single database, an integrated database, distributed databases, multiple synchronized databases, etc.) for all participants in the mortgage process. Such participants may include, for example, consumers, conventional lenders, other loan originators, loan servicers, secondary mortgage market investors, document providers, appraisers, mortgage insurance providers, hazard insurance providers, attorneys, property sellers, realtors, attorneys, closing agents, and others. A different, customized interface is preferably provided for each of these participants, including different periods of access and different levels of access. Thus, the system provides unique "views" of the loan data that can be tailored by information (i.e., to what information does a given participant have access?) and time (i.e., during what time periods does the participant have access to the information?). An integrated data set may be accessed for purposes related to both an origination phase of a loan, as well as the secondary market sale of closed loans. The integrated data set may be accessed simultaneously by a number of different interfaces such as a consumer interface, a trusted advisor interface, a call center interface and a lender interface. A set of services is commonly available to the interfaces in the integrated system. By providing at least limited access to parties that previously have not had access, the system produces greater efficiencies in the loan application, closing, and disposition processes.

Figures 65, 66:
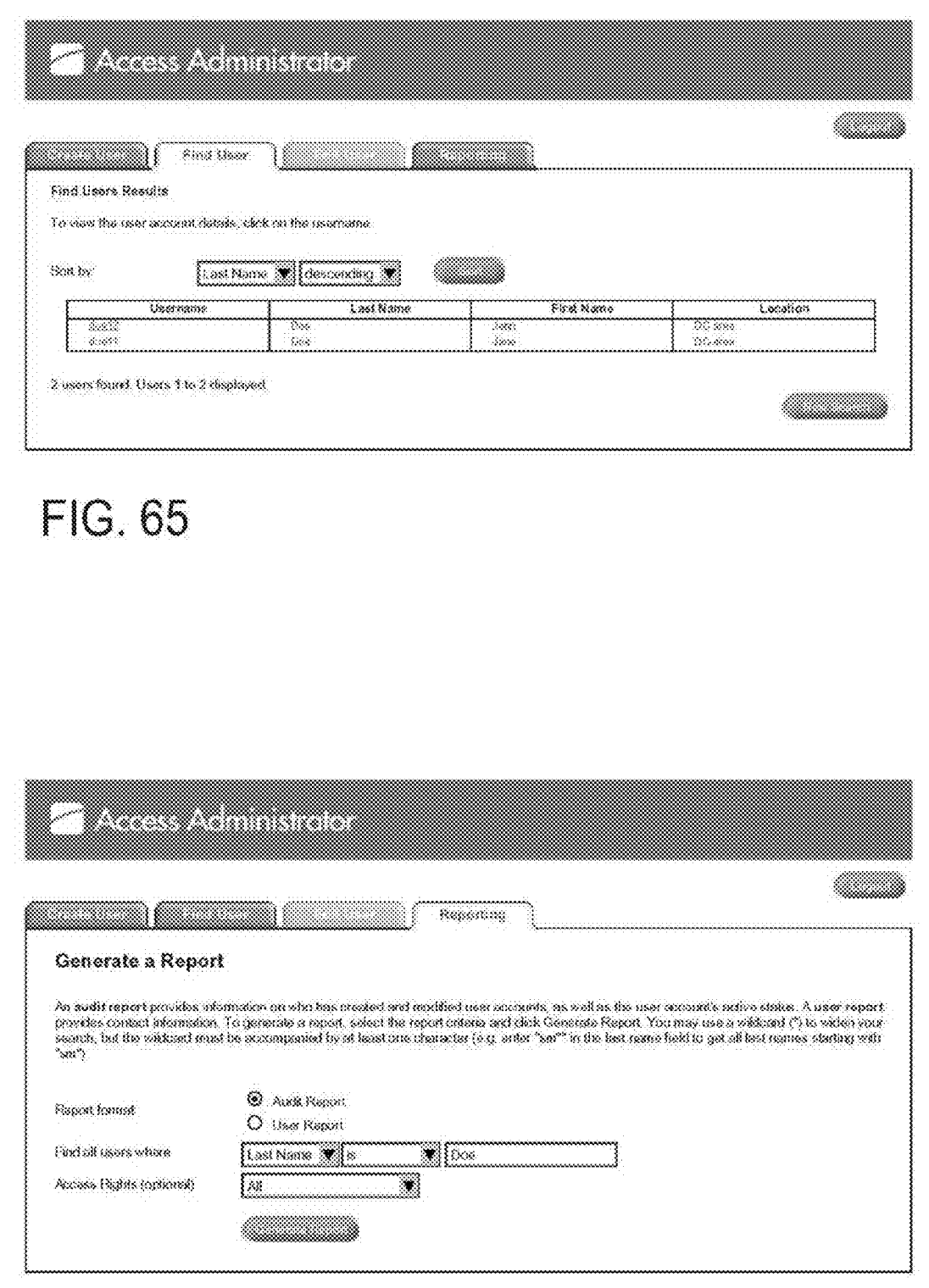

Referring to FIGS. 1 to 66, systems and methods for mortgage loan processing are disclosed that provide lenders with the capability to efficiently obtain mortgages in the primary market and then sell or otherwise dispose of the mortgages in the secondary mortgage market. Although discussed in the context of mortgage loans, it should be understood that the systems and methods disclosed are not limited to mortgages, but can have application with respect to other types of loans, home products and financial instruments.

According to various exemplary embodiments, the systems and methods may be provided in real time over the Internet or other computer network (such as a publicly accessible global network). The systems and methods may be implemented in a variety of environments including on a single computer system, intranets, local area networks, communication networks, dial-up services, etc. The systems and methods provide mortgage industry participants with access to a common integrated database which can be used from the early phases of the mortgage process (e.g., a lender encouraging a consumer to use the systems and methods disclosed, completing a loan application, etc.) to the later phases such as the selling and servicing of the mortgage in the secondary mortgage market, etc.

The systems and methods may be implemented using a related combination of automated interfaces and manual processes. It should be appreciated, however, that a greater use of automated processing and a wider range of product features with multiple executions and elections may also be used.

In Section I, the components and data flow of an integrated, brandable, Internet-based (or other network-based) tool is described that services or supports different business channels of a lender (such as consumer-direct, call centers, advisors, etc.) and employs common data for the different business channels. In Section II, a consumer-direct user interface is described which allows for access to the system by a consumer via a lender web site. In Section III, an advisor (e.g., loan officer, mortgage broker) user interface is described which allows for access to the system by an advisor to a consumer. In Section IV, a call center user interface is described which allows for access to the system by a lender's call center assisting a consumer. In Sections V-VII, a lender user interface (including a pipeline manager user interface, a platform administrator user interface and an access administrator user interface) is described for access to the system by a lender. It should be noted at the outset that a lender user interface is intended to broadly refer to user interfaces used by a lender (such as the call center user interface, pipeline manager user interface, a platform administrator user interface and an access administrator user interface). In Section VIII, a number of other interfaces that may be used by other participants in the mortgage process are described. In Section IX, other interfacing that may occur with third party service providers is described. In Section X, a number of other engines/tools made available by the system are described.

I. Components and Data Flow

Shown in FIG. 1 is a simplified schematic illustration of a system for use throughout multiple phases, processes, or stages relating to mortgage loans, generally indicated as system 10. System 10 may utilize various computer capabilities, hardware, software, electronic communications links, etc.

Figure 1B:
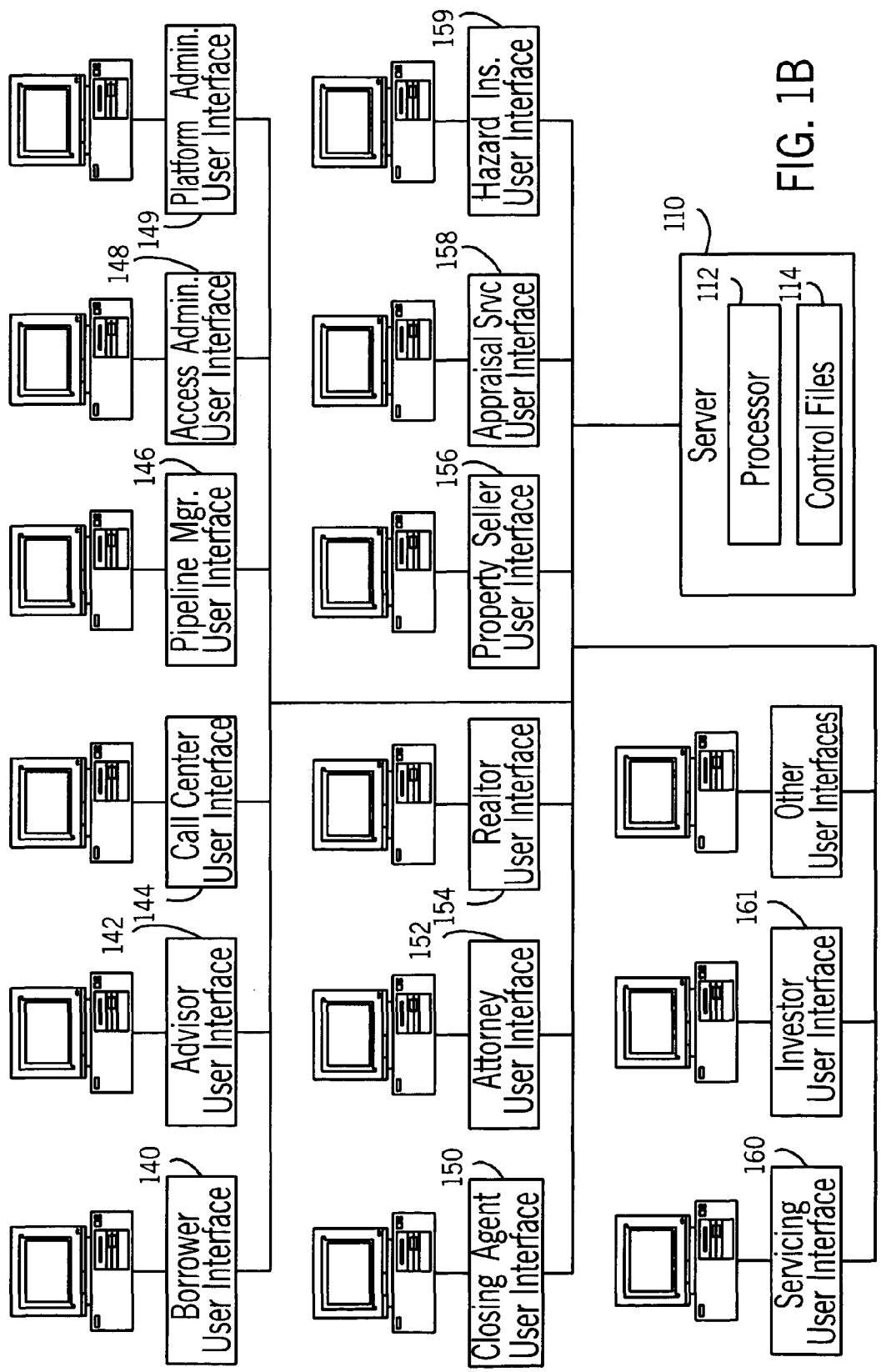
Figure 1C:
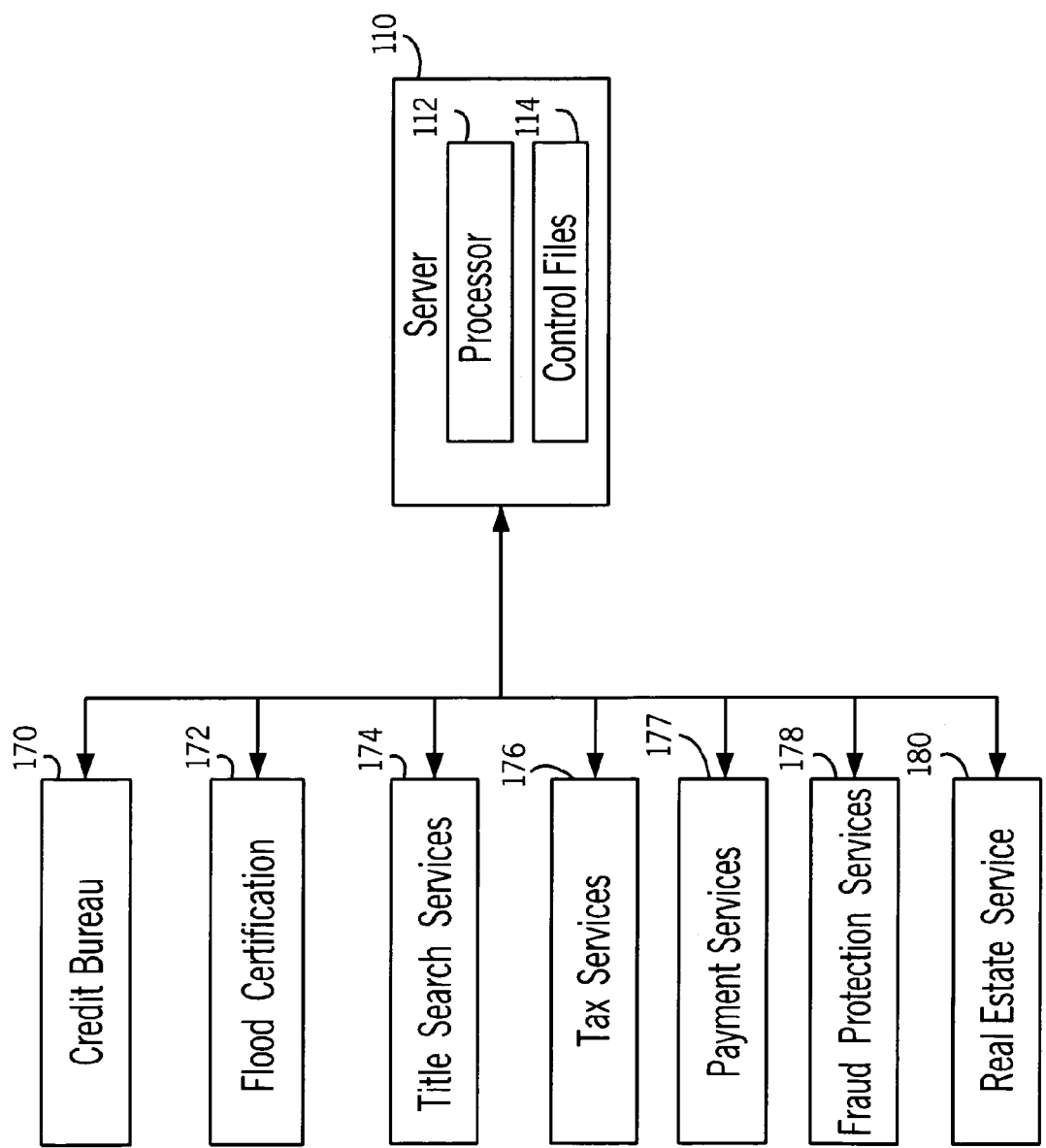

System 10 includes a computer server 110 having a processor 112. Server 110 operates under the control of computer software shown as control files 114. Server 110 has access to database 116 which may be used to store, among other data, records relating to a number of different mortgages, loans, applications, etc. According to one exemplary embodiment, server 110 may execute one or more engines 117 (e.g., functional programs configured to assist or complete a functional task). FIGS. 1A-1C show aspects of FIG. 1 in greater detail. As shown in FIG. 1A, the engines 117 comprise an underwriting engine 118, a pricing engine 120, a loan processing and closing engine 122, an engine 124 for commitment, selling, funding and delivery, an administrative engine 126, a disclosure document generation engine 128, a service ordering engine 130, a customer satisfaction services engine 132, a lending practices analysis engine 134, a mortgage insurance routing engine 135, a servicing rights routing engine 136, and an investor sales routing engine 138. According to a particularly preferred embodiment, each engine or set of software objects and/or program elements collectively have the ability to execute independently in a separate thread or logical chain of process execution, while permitting the flow of data inputs between various software objects and/or program elements. According to a particularly preferred embodiment, engines 117 are executed on a single server (shown as server 110). According to an alternative embodiment, the engines 117 can each be executed on separate logical servers or using separate physical devices.

Server 110 is coupled to provide one or more remote user interfaces 115. As shown in FIG. 1B, the user interfaces 115 include a consumer user interface 140, an advisor user interface 142, a call center user interface 144, a pipeline manager user interface 146, an access administrator user interface 148, a platform administrator user interface 149, a closing agent user interface 150, an attorney user interface 152, a realtor user interface 154, a property seller user interface 156, and an appraisal service user interface 158, a hazard insurance user interface 159, a servicing agent user interface 160, and an investor user interface 161. User interfaces 115 typically provide a display such as web pages, computer programs, etc. on conventional input and display devices. Data or information may be provided to and received from users via web pages, hyper-text markup language (HTML) formatted files, extensible markup language (XML) formatted files, web services, web service calls, etc. User interfaces 115 are preferably provided by the server 110 via a computer network such as the Internet or a local or wide area dedicated or private network, wireless network, etc. User interfaces 115 are configured to allow a user to access system 10 (including accessing the functionality of engines 117).

The configuration and functionality of user interfaces 115 is described in further detail below. The user interfaces 115 provide users or participants in a mortgage process access and integrated functionality to data relating to mortgage applications and loans. Furthermore, multiple user interfaces 115 configured for different types of users (e.g., a consumer, a lending advisor, a call center, a lender, etc.) have varying periods of access and varying levels of access to the same data files on the same integrated system platform.

Server 110 is also configured to be coupled to one or more third party services 119. As shown in FIG. 1C, the third party services 119 may include a credit bureau 170, a flood certification service 172, a title insurance service 174, a tax service 176, a payment service 177 for application fees, mortgage payments, etc. (such as credit card payment or processing services, online payment services, electronic check services, etc.), a fraud protection service 178, and a real estate service 180. The services 119 may be accessible via network connections, web services, etc. The services 119 are described in greater detail below.

Figure 2:
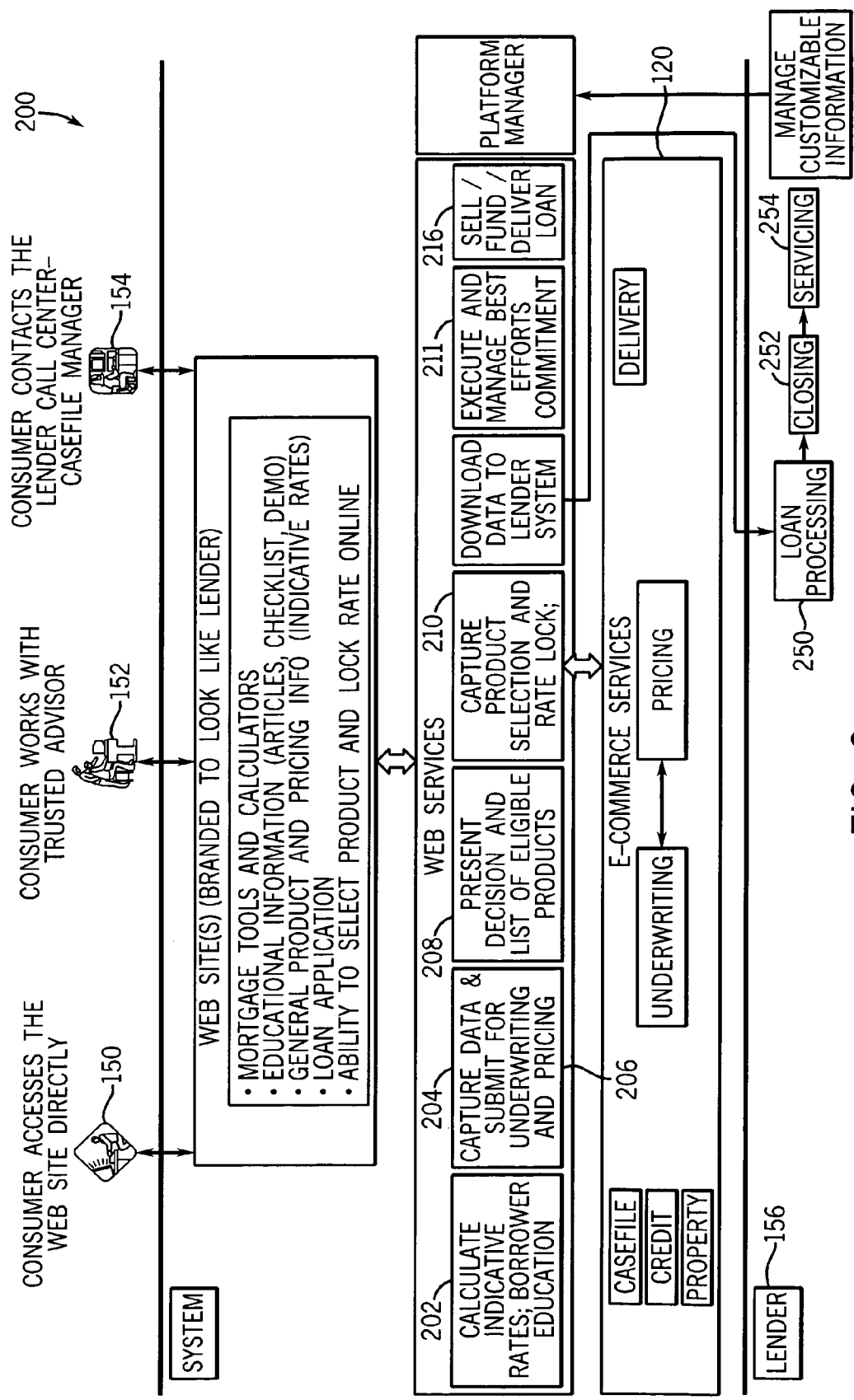
FIG. 2 is a schematic representation of data flow of the computer system shown in FIG. 1.

Referring now to FIG. 2, the data flow diagram illustrates multiple processes or steps in which system 10 may be used, from the first steps of getting a consumer to use system 10 and apply for a loan or mortgage, to the last steps of selling a closed loan or mortgage in the secondary mortgage market. System 10 provides a lender with the features and functionality to manage and facilitate these steps efficiently by, among other features, providing interfaces 115 common access to integrated or synchronized databases.

Data relating to the various steps may be inputted and outputted through user interfaces 115, and engines 117 process the data. Shown in FIGS. 11-66, discussed in greater detail below, are examples of user interfaces 115 which have been reconfigured to provide different web pages for receiving, presenting and submitting data relating steps 202 to 216. Other user interfaces may also be employed.

FIG. 2 illustrates that multiple business channels of a lender may access certain features of system 10. For example, a first business channel 150 is a consumer-direct channel for consumers who directly access system 10 via user interface 140 having one or more web pages to complete and submit a loan application or to review the status of a pending loan application. A second business channel 152 is an advisor channel for consumers who consult advisors (e.g., loan officers, mortgage brokers, financial advisors) to assist the consumer in completing and submitting a loan application or to review the status of a pending loan application. Business channel 152 may have access to system 10 via user interface 142. A third business channel 154 is a lender's call center channel for consumers who call for telephone support to complete and submit a loan application or to review the status of a pending loan application. Business channel 154 may have access to system 10 via user interface 144. Channels 150-154 access the same data.

Shown in FIG. 2, system 10 allows a lender to provide introductory information (e.g., relating to a consumer completing a loan application) (generally step 202, discussed in greater detail below in connection with FIG. 3), receive a completed loan application from the consumer (generally step 204, discussed in greater detail below in connection with FIG. 4), receive underwriting and pricing information for one or more loans (generally step 206, discussed in greater detail below in connection with FIG. 4), present the consumer with eligible loan products (generally step 208, discussed in greater detail below in connection with FIGS. 4 and 5), receive a selection from the consumer of one or more of the eligible loan products and lock in an interest rate (generally step 210, discussed in greater detail below in connection with FIG. 6), commit the loan to a secondary mortgage purchaser (generally step 211, discussed in greater detail below in connection with FIG. 7), process and close the loan (generally step 212, discussed in greater detail below in connection with FIG. 8), and sell, fund and deliver the loan to a secondary mortgage purchaser (generally step 216, discussed in greater detail below in connection with FIGS. 9 and 10). FIG. 2 also depicts underwriting engine 118 and pricing engine 120 which may be implemented or utilized as described below.

According to a particularly preferred embodiment, system 10 is configured to provide data or information regarding loans to a lender or lender computer system for assisting the lender to: process the loan prior to closing (such as finalizing paperwork, obtaining certifications, etc.) (step 250); close the loan (step 252); and to service the loan (step 254).

FIGS. 3-10 show certain aspects of FIG. 2 in greater detail. Those structures/processes which have already been described in connection with FIG. 2 will not be described again.

Figure 3:
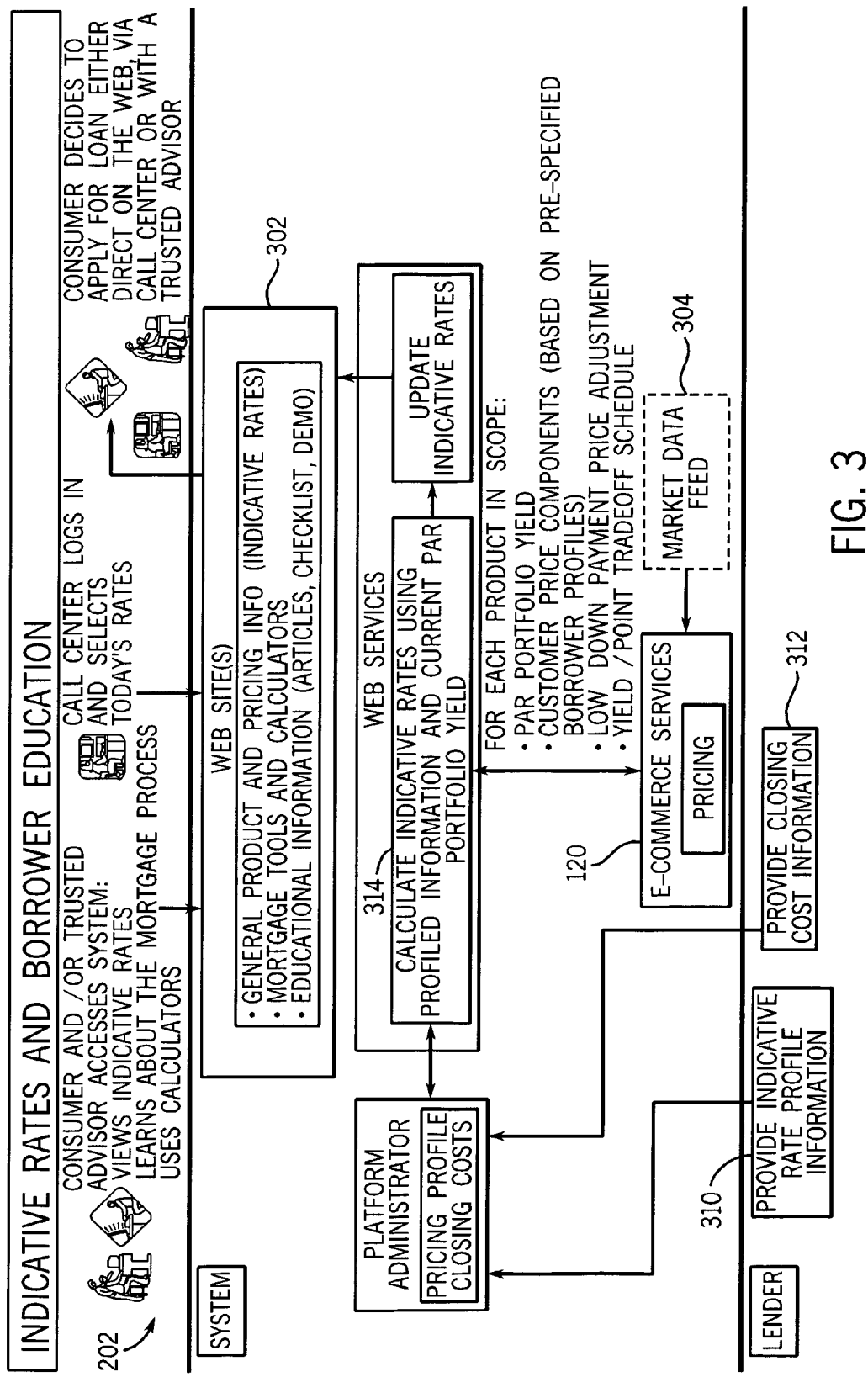
FIG. 3 is a schematic representation of data flow for providing consumer education tools, indicative rates, and other introductory information for use with the computer system shown in FIG. 1.

As shown in FIG. 3, providing introductory information (step 202) may be done by providing a variety of content or information to a user interface to display the content. As described in greater detail below in connection with the consumer-direct interface (FIGS. 11-32) and the trusted advisor interface (FIGS. 33-34), information may include consumer education materials, calculators (including affordability calculators, probable qualification calculators, etc.), educational information, and general product and pricing information. Product and pricing information is presented as an indicative loan rate. An indicative loan rate is provided to a user by system 10 as follows. A lender provides a customized pricing profile (step 310) via platform administrator interface 149. The customized pricing profile reflects lender-specific pricing in connection with particular mortgage products, such that the consumer may be provided with interest rates and other pricing information for mortgage products offered by a particular lender. According to a particularly preferred embodiment, a pricing profile applies to indicative rates and approved product rates including lender selected values for such costs as hedge costs, miscellaneous point adjustments, rounding options, and so on. Other information is provided by the lender for indicative rates a risk profile to be used, points to be displayed, estimated closing costs for a loan, acceptable loan-to-value (LTV) amounts, etc. (step 312). Based on the information provided by the lender and a current par portfolio yield for a loan product, an indicative rate for the loan product is calculated (step 314). The indicative rate may be provided by pricing engine 120 or alternatively may be provided by a current market data feed or other updated market data (step 304). The indicative rate is provided to the user as part of the introductory information.

In addition to configuring the system 10 to display lender-specific pricing, other lender-specific customizations may also be performed in connection with mortgage products. For example, a lender may customize the system 10 to display information regarding various types of mortgage products of by the lender, including information regarding mortgage products that would be sold to different secondary mortgage market participants as well as information regarding any unique or specialty mortgage products that would be retained in the portfolio of the lender.

Figure 4:
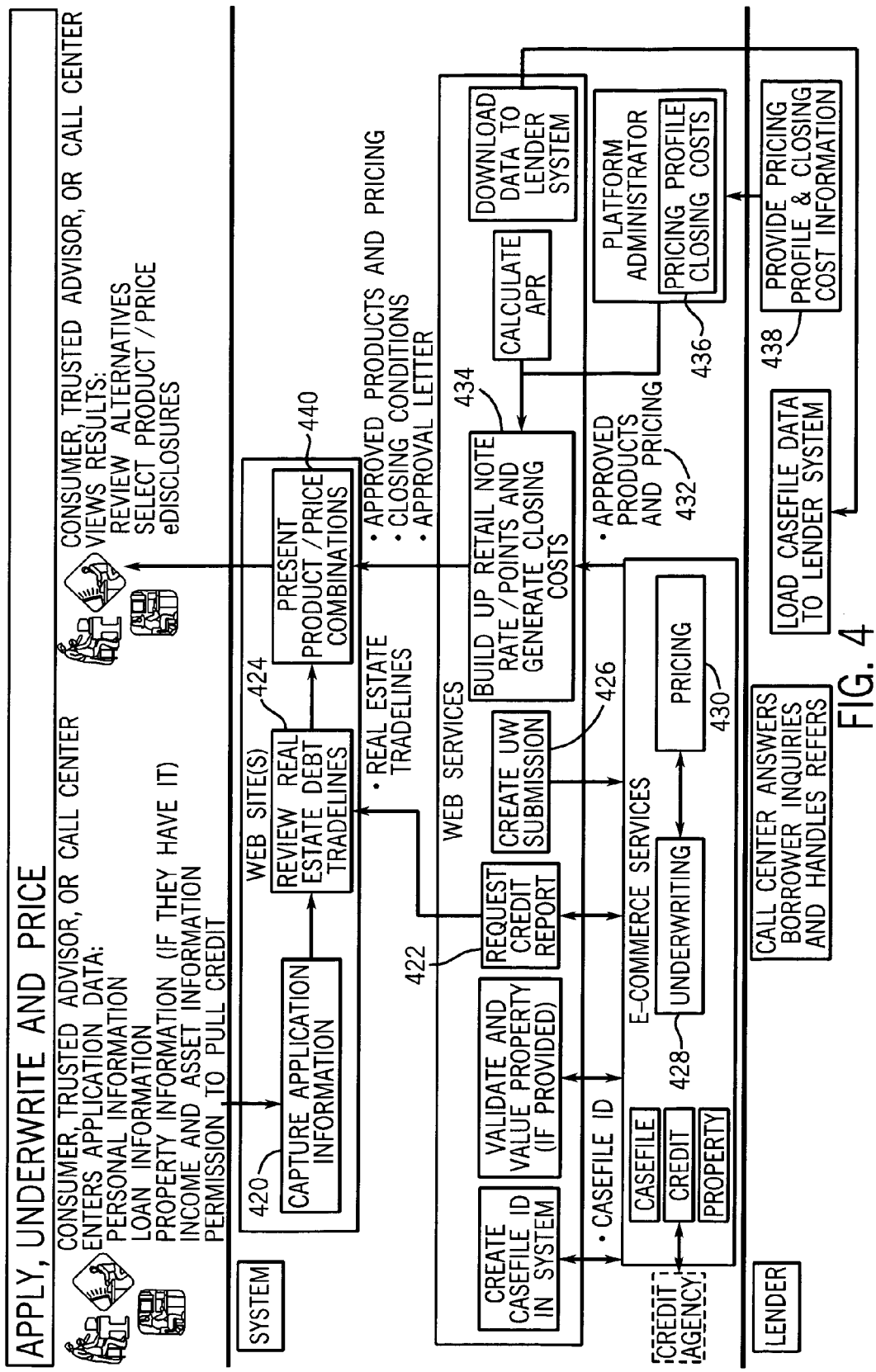
FIG. 4 is a schematic representation of data flow of an application, underwriting and pricing steps for use with the computer system shown in FIG. 1.

Shown in FIG. 4 are steps relating to receiving a completed loan application (generally step 204), underwriting and pricing one or more loans (step 206), and presenting the consumer with eligible loan products (step 208). Loan application information is entered, validated and stored (e.g., captured) (step 420). A user (such as a consumer, advisor, call center representative, etc.) may provide consumer data via a user interface in response to prompts, data fields, questions, etc.

Information including a user name, a password and other information are obtained to set up a user account and record (e.g., case file or data file). It should be noted that the record or data file relating to a loan application from a consumer is the same record or data file relating to a loan closed from the loan application, and furthermore, is the same record or data file that will be used to sell the loan to a secondary mortgage market participant. Loan application information may also comprise the purpose of the loan (such as purchase, refinance, refinance for home equity, etc.), property information, consumer information, consent to allow a lender to access a credit report of the consumer, information regarding consumer income, consumer assets, consumer debt, demographic data, consent for electronic disclosure, etc. The loan application data or information may be stored in database 116 for use and retrieval.

A credit report related to the consumer may be provided in electronic form via a third party such as credit bureau 170 (step 422). Credit report information will typically include the consumer's name, social security number, current address and the credit agency information or entries. Entries in the consumer's credit report relating to real estate debt may be reconciled (step 424). A user may reconcile real estate entries by providing additional information relating to the real estate debts (such as the disposition of the debt after closing, whether the real estate debt is secured by property, etc.).

According to a preferred embodiment, appropriate requirements are evaluated for a subject property in view of the property, the consumer and loan characteristics (e.g., FICO score, LTV, loan purpose, and so on). For example, a determination may be made that the subject property requires a complete appraisal, that the subject property may have an appraisal requirement reduced to an "exterior only" appraisal, or the subject property may have an appraisal requirement waived or eliminated (i.e., an appraisal waiver). In another embodiment, system 10 operates with properties that have been pre-qualified (i.e., where a property is evaluated in advance and no further evaluation is needed so long as the agreed-upon price is within a specified range).

As shown in FIG. 2, upon receipt of a completed loan application, a request is made for an underwriting and pricing decision (generally step 206). Referring to FIG. 4, an underwriting submission is created (step 426) and application information is provided to underwriting engine 118 and pricing engine 120 (steps 428 and 430). Underwriting engine 118 may be configured to accept multiple product submissions and return multiple underwriting recommendations. According to a particularly preferred embodiment, the underwriting and pricing steps are as disclosed in U.S. patent application Ser. No. 09/593,106, titled "Online Mortgage Qualification and Application System and Process" filed Jun. 13, 2000, the entire disclosure of which is hereby incorporated by reference. It should be noted that the description below describes general structures and methods as well as other particularly preferred embodiments of underwriting and pricing a mortgage. Information provided to the underwriting engine 118 and pricing engine 120 will typically include the loan purpose, consumer information, property information, reconciled real estate entries from the credit report, and income/asset information. Based on the received information, the underwriting engine 118 and pricing engine 120 provides the lender with an underwriting recommendation, a list of the approved products for which the consumer is approved, and pricing for the approved products (step 432).

Underwriting engine 118 advantageously allows for underwriting recommendations for home purchases as well as home refinancing. In the case where an application is being submitted to refinance a home, or even in the case of a home purchase, underwriting engine 118 may return an underwriting recommendation without the need for the consumer to provide income or asset documents or verification.

Pricing engine 120 is configured to price the interest rate of the loan with a mortgage insurance alternative. In a conventional home mortgage, borrowers are typically required to pay at least 20% of the purchase price in the form of a down payment. In one embodiment, pricing engine 120 is configured to price a mortgage to include a credit enhancement fee into the interest rate, points, or other fees associated with the mortgage to compensate for the increased risk of default. According to another embodiment, pricing engine 120 is configured to price loans for traditional borrower paid mortgage insurance (typically in situations where the loan to value ratio is greater than 80 percent). Alternatively, pricing engine 120 may be selectively reconfigurable to price the mortgage in accordance with one or more pricing structures (such as including the credit enhancement fee into the interest rate, etc. and/or the traditional borrower paid mortgage insurance). Pricing engine 120 may be further configured to provide a lender with an option as to which pricing arrangement (with respect to mortgage insurance and mortgage insurance alternatives) will be provided to the borrower. Alternatively, the pricing engine 120 may be configured to provide multiple pricing options to a borrower to allow the borrower to select a desired pricing option (such as selecting a mortgage insurance alternative or borrower-paid mortgage insurance) in a side-by side comparison which allows the borrower to view the associated costs with each pricing option.

The final loan products are then generated (step 434). The final loan products reflect the retail note rate, points, closing costs, etc. specific to the lender (step 436). According to a particularly preferred embodiment, the lender generates a pricing profile that includes the retail note rate, points, and closing costs (step 438) via platform administrator interface 149 as will be described below. Additionally, the lender may manipulate the pricing of the mortgage products by making adjustments to the loan-level points via system 10. The lender or loan officer may add or subtract points (i.e., implement overages and underages) from each loan product prior to presentation to the consumer. The lender is also able to configure system 10 in connection with other parameters. For example, if the lender offers an escrow waiver option (in which the consumer opts not to have taxes and insurance escrowed), then the lender may configure the system 10 to charge the consumer a fee for taking advantage of the escrow waiver option. The final approved loan products, associated prices (i.e., a retail loan price), closing conditions and an electronic approval letter are then presented to the user and/or to the call center (step 440). Furthermore, the minimum and maximum loan amount limits are provided to call center interface 144 when the consumer is approved, and messaging or a "solution finder" is provided to call center interface 144 when the consumer is not approved as described below. Additionally, messaging may be provided regarding loan maximums and minimums indicating thresholds for a refinance loan changing from a rate/term to a cash-out designation. The associated prices for the final approved loan products include (or are presented as) an annual percentage rate (APR). According to a particularly preferred embodiment, an APR calculator generates the APR and other data needed to complete the "Truth-In-Lending" and other disclosures. Such disclosures may be generated automatically by disclosure document generation engine 128 based on data stored in the system 10. According to an alternative embodiment, the necessary loan data from system 10 may be provided to a third party service provider to prepare the disclosure documents.

Figure 5:
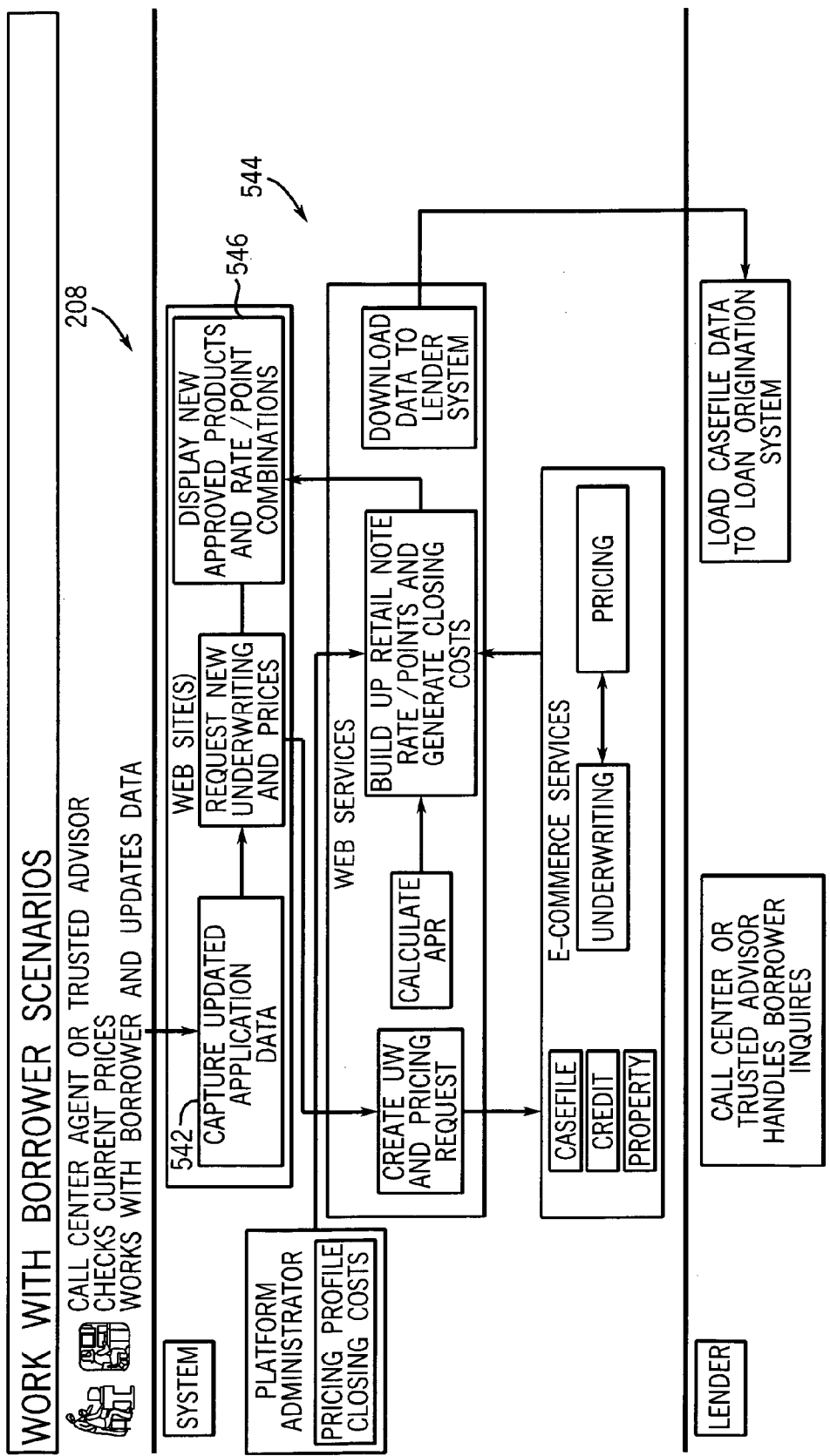
FIG. 5 is a schematic representation of data flow of steps for use with the computer system shown in FIG. 1 to help a consumer request updated pricing, correct application information, and perform other functions prior to approval.

As shown in FIG. 5, system 10 advantageously allows a user to review the available or approved mortgage products and to model different "what-if" scenarios (step 208). For example, a user may wish to change the down-payment amount they will apply toward a loan. The updated data will be captured (step 542), and a new underwriting and pricing request based on the updated data will be generated (step 544) similar to those steps described above. The newly approved products are then identified for the user (step 546). This configuration advantageously allows a user to change assumptions (such as down-payment, savings required, income required, etc.) to obtain approval for different loans and/or to assess whether altering certain parameters would alter the underwriting recommendation. Furthermore, the user is presented with an actual underwriting and pricing result for the various loan products.

Figure 6:
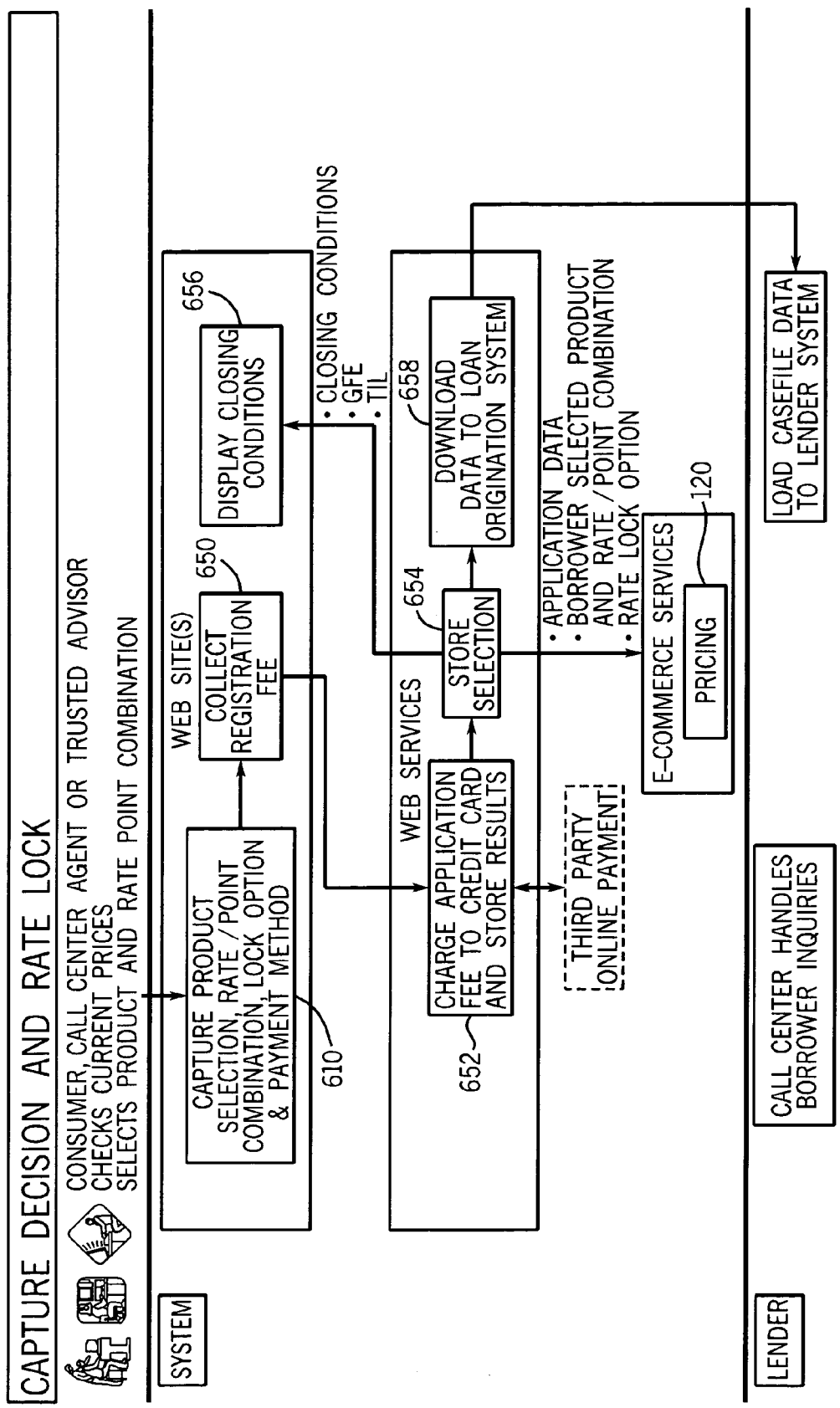
FIG. 6 is a schematic representation of data flow of a decision and consumer rate lock steps for use with the computer system shown in FIG. 1.

As shown in FIG. 6, the user selects the loan product which it wishes to obtain and may opt to lock the interest rate of the product (step 210). The user may select the desired product from a list of approved products (such as a 30-year fixed mortgage, a 15-year fixed mortgage, a 5/1 adjustable rate mortgage (ARM), etc.) (step 610). The user may also make a decision to lock in the interest rate (i.e., fix or finalize the interest rate for the product), to allow the interest rate to "float" for a certain number of days (i.e., allow the interest rate to vary of fluctuate until a future time), or to allow the interest rate to "float down" (i.e., allow the interest to vary or fluctuate in a downward direction until a future time, but not to exceed or go higher than a specified amount or cap). A registration fee may be collected for the rate lock, float or float down (step 650). The registration fee may be collected via a third party provider such as by using a credit card, on-line bill payment, or other third party payment services (step 652) (such as payment services 177 shown in FIG. 1C). The product selection is stored in the data file (step 654). The closing conditions for the loan are then provided to the user (step 656), such as reminders regarding required documentation to verify insurance, income, flood zone certification, etc.

System 10 is configured to present a variety of mortgage products (or product types) to the user for consideration, to permit the user to select from the different mortgage products, and to underwrite those mortgage products. Often, certain mortgage products are configured to be sold to certain participants in the secondary mortgage market. System 10 is configured to be useable with different types of mortgage products configured for sale to different participants in the secondary mortgage market. For example, a particular lender may use the system 10 primarily in connection with mortgages that will be sold to one secondary mortgage market participant which purchases conventional mortgage products, and the underwriting engine 118 may be configured to ensure that the mortgage products meet the standards of the secondary mortgage market participant. However, system 10 may still present a variety of mortgage products (such as conventional mortgage product types and jumbo mortgage product types) to a user and provide an underwriting recommendation associated with each product. The lender may also decide to define its own mortgage products and offer those mortgage products to consumers using the system 10, and to provide underwriting for those products as well. It is desirable that the underwriting engine 118 produce underwriting recommendations which are useable in connection with different secondary mortgage market participants and/or that can be tailored to meet the lender's own standards. To this end, the operation of underwriting engine 118 may be altered or customized by an individual lender to accommodate various product types. Preferably, this is achieved by adding a set of business rules on top of an underlying underwriting engine, as detailed in U.S. patent application Ser. No. 10/324,090 titled "Method and Apparatus for the Customization of an Automated Loan Underwriting System" filed Dec. 20, 2002, hereby incorporated by reference.

The data regarding the approved mortgage product is also provided to lender's loan origination system (LOS) (step 654), which may use the data to generate loan documents to be signed by the consumer. According to a first exemplary embodiment, the loan origination system is a separate computer system having a communication link to system 10. According to a second exemplary embodiment, the loan origination system is an integrated portion of system 10. The application data, the selected product and rate lock option is provided to pricing engine 120 to confirm the selection of product and rate-point combination by the consumer.

Figure 7:
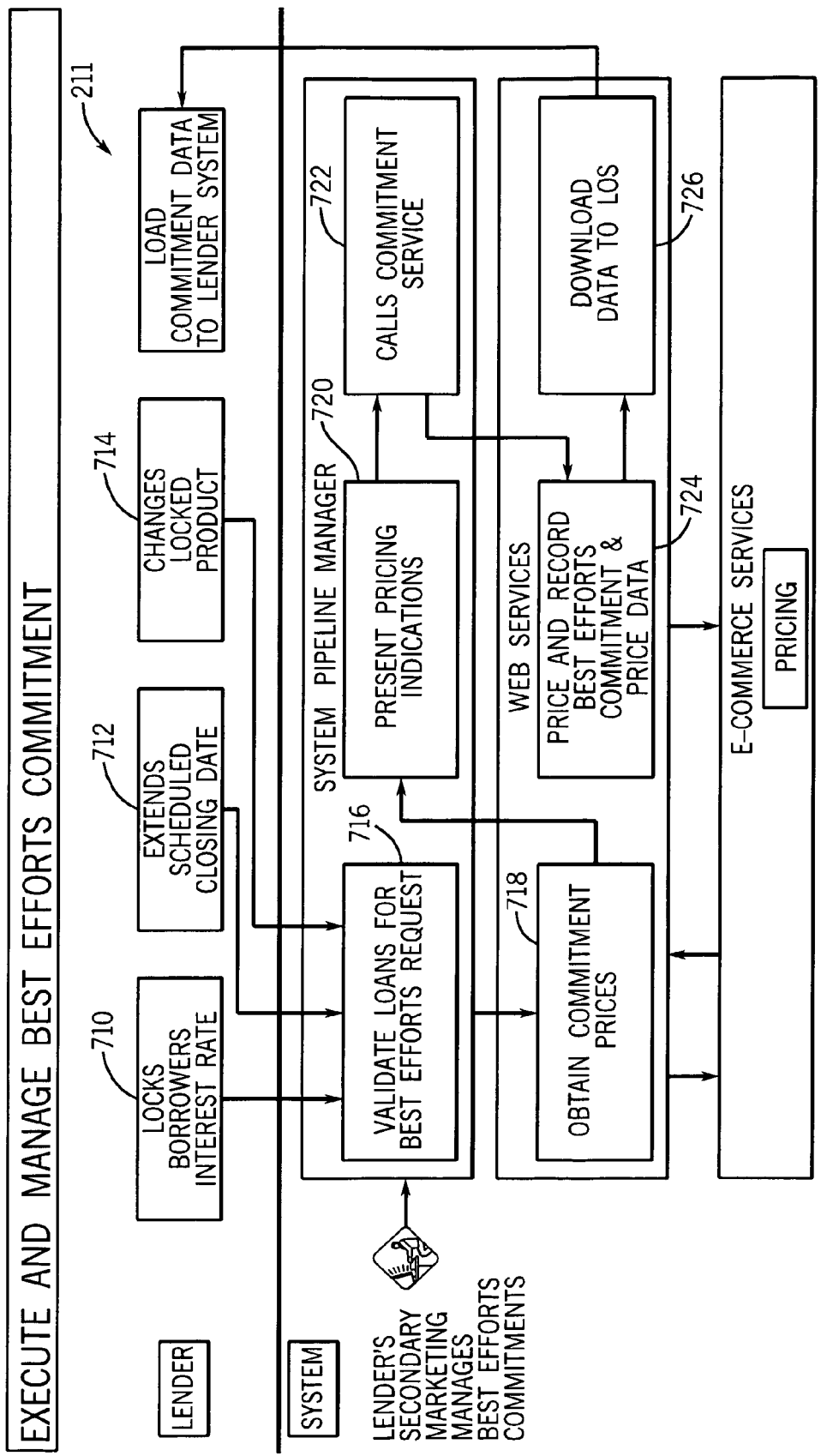
FIG. 7 is a schematic representation of data flow of steps for use with the computer system shown in FIG. 1 to help a lender hedge against interest rate fluctuations during the interim between a consumer rate lock and sale of loan to secondary mortgage market.

As shown in FIG. 7, a loan may be committed to a secondary mortgage purchaser (step 211), for example, using a best efforts commitment or a forward commitment. To the extent that best efforts commitments are used, the system 10 preferably uses the systems and methods described in pending U.S. Patent Application No. 60/437,084, titled "Method and System for Buying and Pricing Mortgage Loans Under Forward Commitments" filed Dec. 30, 2002, the entire disclosure of which is hereby incorporated by reference. The foregoing application describes a best efforts commitment system in which lender data can be monitored to provide for enhanced pipeline management. It should be noted that the description below describes general structures and methods as well as other particularly preferred embodiments of committing a mortgage to a secondary mortgage purchaser.

A lender locks the consumer interest rate for the loan (step 710). The lender may also provide an updated closing date, such as by changing or extending the scheduled loan closing date (step 712). The lender may also change the type of product which has been locked (step 714). The updated loan data may be accessed by the lender and reviewed to validate the loans which are to be committed to a secondary mortgage market participant (step 716). For example, the lender will confirm that the loan data is accurate. A price for the loans which will be committed as part of a "best efforts" commitment is obtained (step 718) and provided to the lender (step 720). A verification of the loans to be committed may be done with the lenders commitment service (step 722). A price for the re-verified loans is obtained (step 722), and the commitment and price is recorded (step 724). Summary data regarding the loans which have been committed to the secondary mortgage purchaser are then provided to the lender (step 726).

Figure 8:
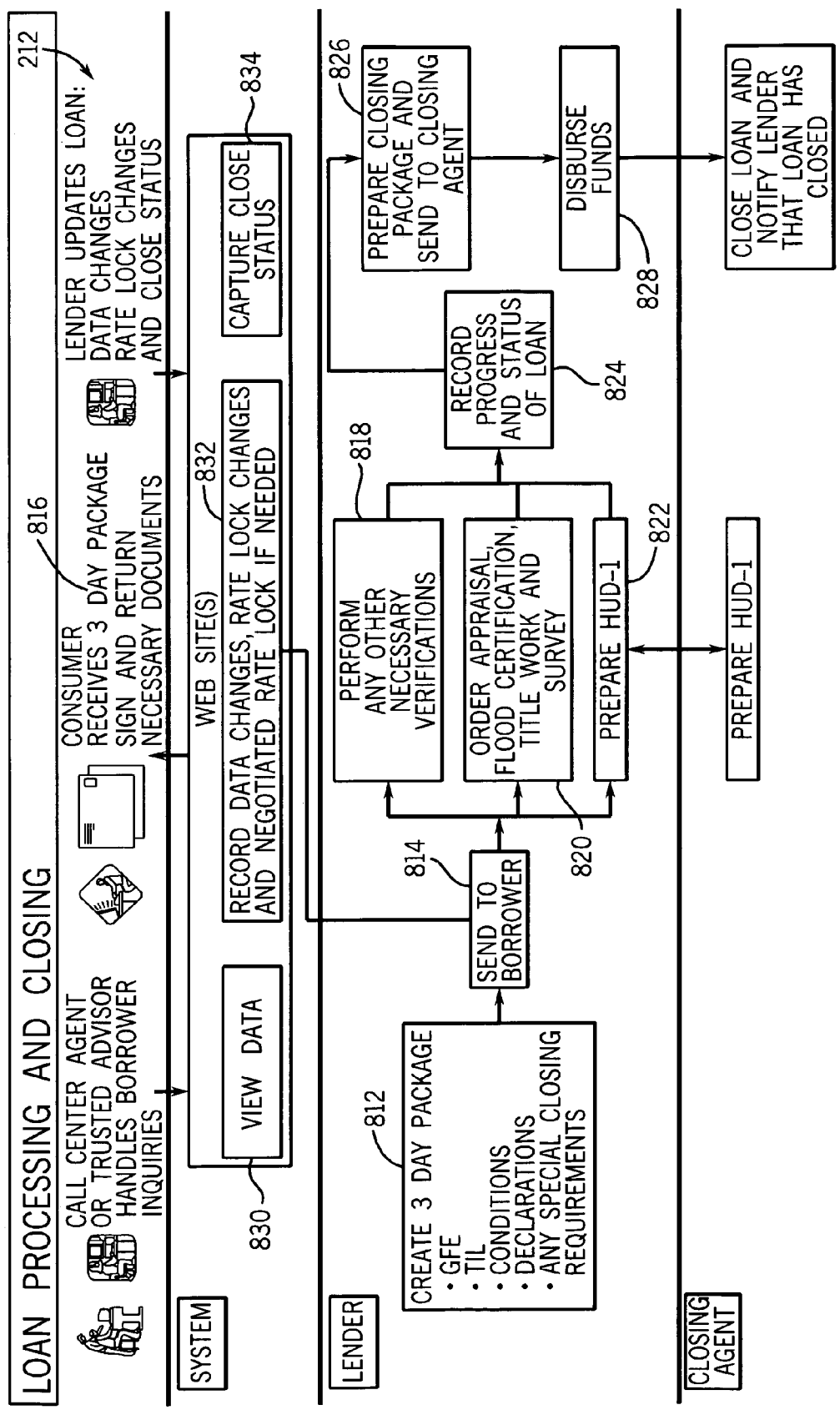
FIG. 8 is a schematic representation of data flow of loan processing and closing steps for use with the computer system shown in FIG. 1 to communicate with a lender's back end system.

As shown in FIGS. 2 and 8, the loan is processed and closed (step 212). The lender prepares the required disclosure package for the consumer (step 812) and sends the package to the consumer (e.g., via e-mail, via U.S. postal mail, or via making the package available by way of the consumer interface 140) for completion (step 814). Alternatively, closing documents may be generated using system 10 based on the data stored on system 10. System 10 allows the user (such as the consumer, advisor, call center representative, etc.) to view and print a variety of documents including a Good Faith Estimate, a Truth-In-Lending disclosure, the loan conditions, a summary of the application data, other disclosure documents such as transfer of servicing disclosures, associated state laws or regulations, broker disclosures, licensing disclosures, fee disclosures, etc. These documents may be generated automatically using the document generation engine 128 based on data stored in the system 10. Alternatively, the necessary loan data from system 10 may be provided to a third party service provider to prepare the disclosure documents.

The consumer receives the documents, then signs and returns any necessary documents (step 816). The system may also be used in connection with e-Mortgages and can be configured to receive and process electronic signatures for the various loan closing documents.

In order to close the loan, the lender may also perform any other necessary verifications (step 818). As described below, the lender may use service ordering engine 130 to order (through an automatic system call to a third-party data base) an appraisal, flood certification, title search and survey for the property (step 820). Alternatively, such information may be stored and retrieved locally, e.g., on data base 116. Any other necessary forms (e.g., a HUD-1) may also be prepared to close the loan based on data stored in the 116 (step 822). The progress of these steps are recorded as is the closing status of the loan (step 824). The progress or status of the loan may be provided to consumer interface 140, advisor interface 142 and/or call center interface 144. Upon completion of these steps, a closing package is prepared by the lender and sent to the closing agent (step 826) and the funds are ultimately disbursed (step 828) to the consumer. Alternatively, the closing package may be accessed by the closing agent electronically by way of closing agent interface 150, and the loan may then be closed with paper documents or using the system 10 (i.e., an e-closing).

System 10 allows a consumer, advisor, or call center to access data regarding the status of the loan (step 830), such as whether the loan has closed, what additional steps need to be completed, etc. Furthermore, a lender may access system 10 to make changes to the loan such as data changes, rate lock changes, close status, etc. (steps 832 and 834). As described in greater detail below, other participants may also be provided access to the data in system 10.

Figure 9:
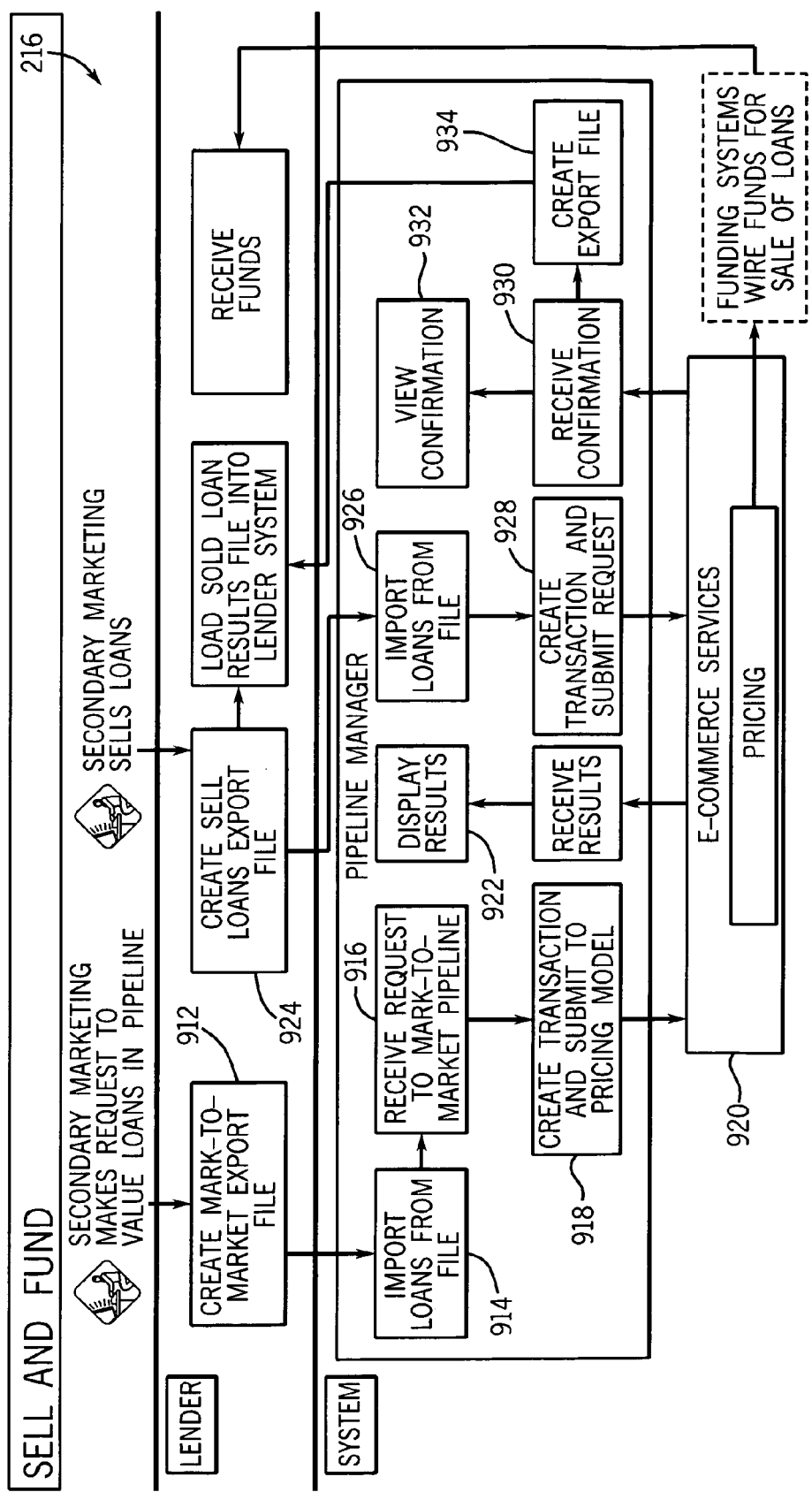
FIG. 9 is a schematic representation of data flow of steps for use with the computer system shown in FIG. 1 to sell a mortgage to and receive funding from a secondary mortgage market investor.
Figure 10:
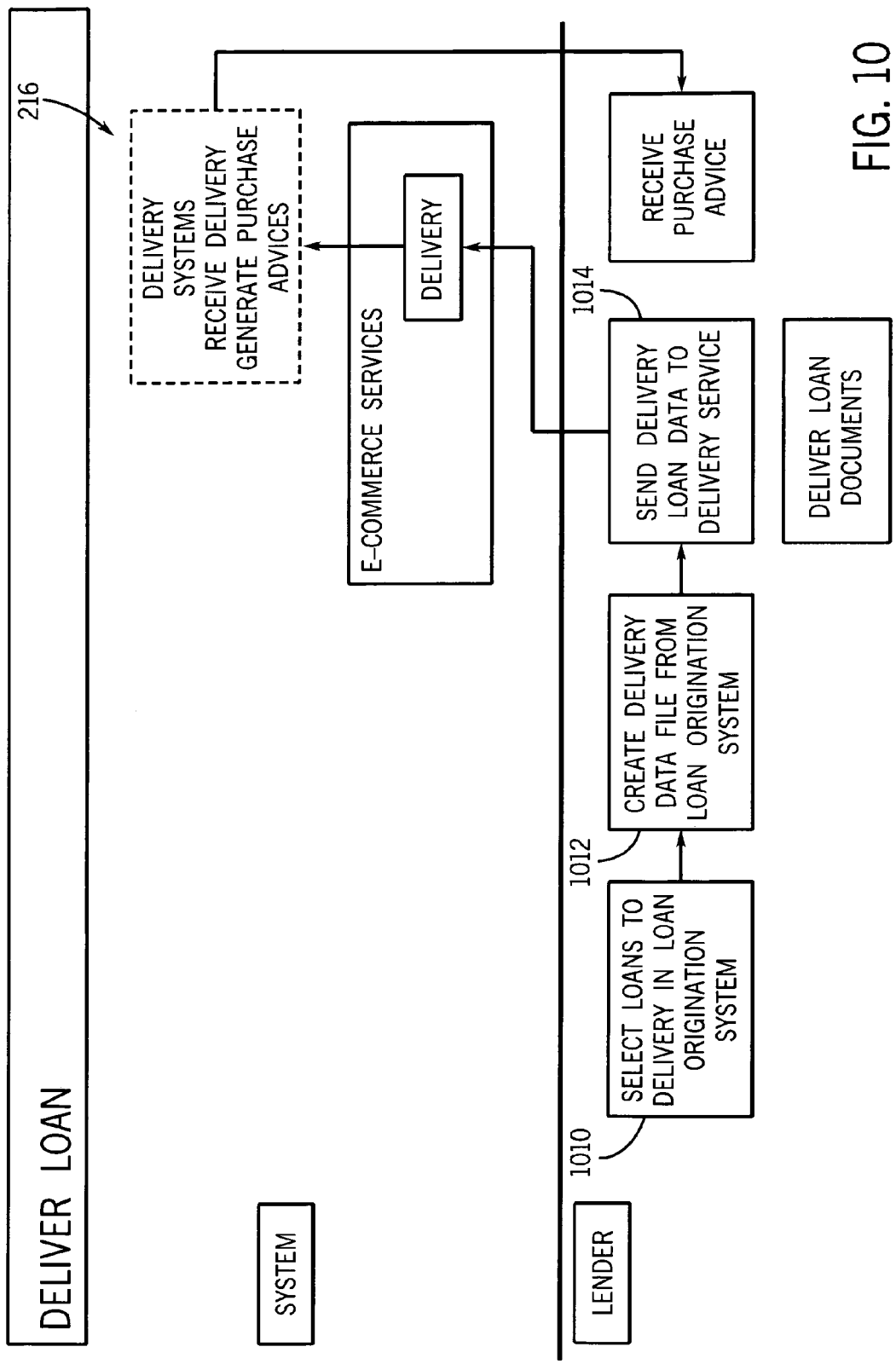
FIG. 10 is a schematic representation of data flow of a delivery step for use with the computer system shown in FIG. 1.

As shown in FIGS. 9 and 10, one or more loans may be sold and delivered to a secondary mortgage purchaser (step 216). Loans may be sold for cash or MBS (mortgage-backed security). The steps of pricing and selling one or more loans to a secondary mortgage market participant are described in detail in pending U.S. patent application Ser. No. 10/329,634 titled "System and Method for Mortgage Loan Pricing, Sale and Funding" filed Dec. 26, 2002, the entire disclosure of which is hereby incorporated by reference. It should be noted that the description below describes general structures and methods as well as other particularly preferred embodiments of pricing and selling a mortgage to a secondary mortgage purchaser. Generally, a lender may receive a price which would be paid in the secondary mortgage market for one or more loans. This process is generally referred to as "mark-to-market." The lender may obtain a price in the secondary mortgage market without actually selling them. Generally, the lender creates a file for which it wishes to obtain a price (step 912). The file is provided to or received by engine 124 shown in FIG. 1 (step 914). A request to price the one or more loans is received (step 916), and submitted to a pricing engine (step 918). A price in the secondary mortgage market for the loans is generated (step 920) and provided to the lender (step 922).

A lender may sell the loans to the secondary mortgage market participant based on the results of the mark-to-market request. Alternatively, a lender may sell the loans without first receiving the results of the mark-to-market request. The lender creates a file of loans which are to be sold (step 924). The file containing the loans to be sold is imported into system 10 from the loan origination system (step 926) to ensure that loan data is synchronized with the loan when the loan is delivered. A pricing request for the loans to be sold is created (step 928). A confirmation that the loans have been sold is received (step 930) and may be viewed by the lender (step 932). The results of the loan sale are created into an export file (step 934) and provided to the lender (step 936). The lender may also then receive proceeds from the loan sale (step 938). According to a particularly preferred embodiment, the lender receives proceeds via wire funds transfer. The lender may also wait before selling, or may receive the mark-to-market price merely to monitor the value pipeline even though the loans have not yet closed and cannot yet be sold. Advantageously, system 10 allows a lender to aggregate their pipeline of registered and closed loans (including those loans originated in system 10) for committing, pricing, selling and funding.

The loans to be delivered are selected by the lender (step 1010). A file containing data for delivery of the loans is then created (step 1012) and delivered (step 1014).

II. Consumer Interface

According to a particularly preferred embodiment, user interface 140 is a consumer interface and is configured for use by a consumer or loan applicant. Consumer interface 140 allows a user (typically an individual borrower, loan applicant, etc.) to access and provide information or data (such as data for a loan application) regarding the individual consumer. It should be noted that although the web pages provided by consumer interface 140 are shown in English, the web pages may be provided in multiple languages (such as English and Spanish or other languages). The user may toggle between languages on each page. The system may also be provided with the ability to identify case files that were completed in a non-English language. Preferably, this former functionality may also be disabled. This functionality may also be provided for the other user interfaces described herein.

Figure 11:
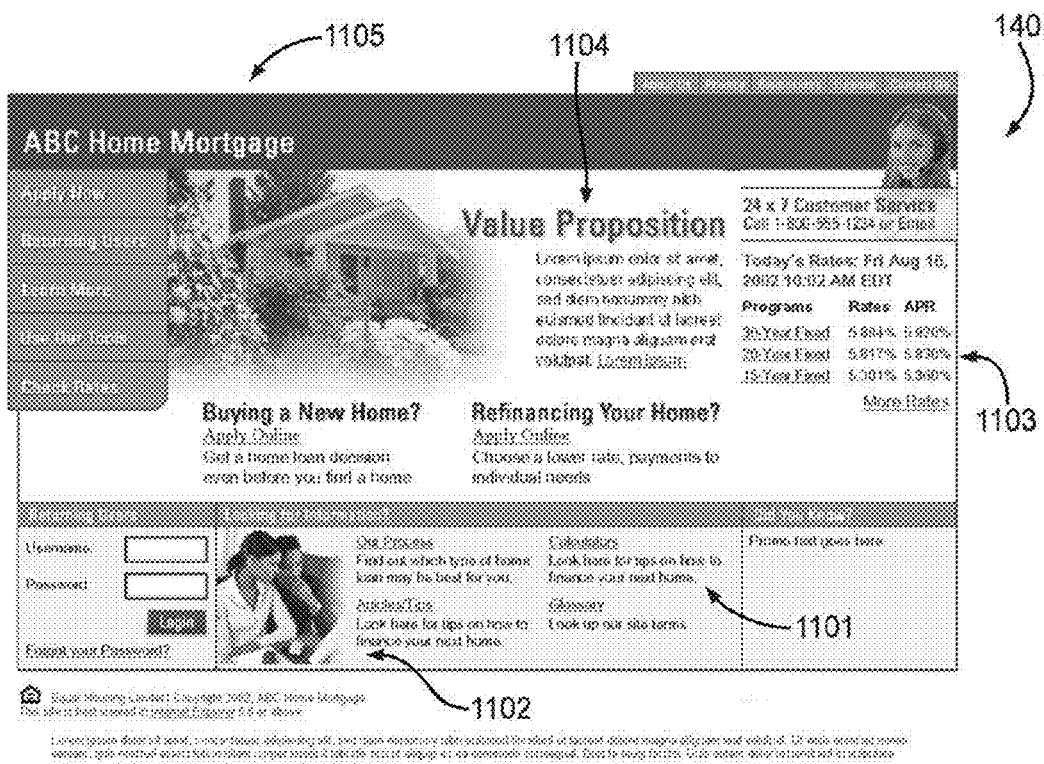
Figure 12:

Shown in FIG. 11 is user interface 140 (shown as a web page) according to an exemplary embodiment. User interface 140 is configured to provide indicative mortgage rates and consumer education materials. User interface 140 may be used to provide access to mortgage tools such as calculators 1101 (including affordability calculators, probable qualification calculators, etc.), educational information 1102, and general product and pricing information 1103. Lender configurable portions 1104 and 1105 (such as those portions shown in the FIGURES having Latin text) are provided to allow a lender to insert a customized message, provide additional "branding" or lender customization, naming, trademarks and logos, etc.

Shown in FIGS. 12-28 are various web pages providing data fields to be completed by a consumer via user interface 140 for completion of a loan application.

Figure 13:
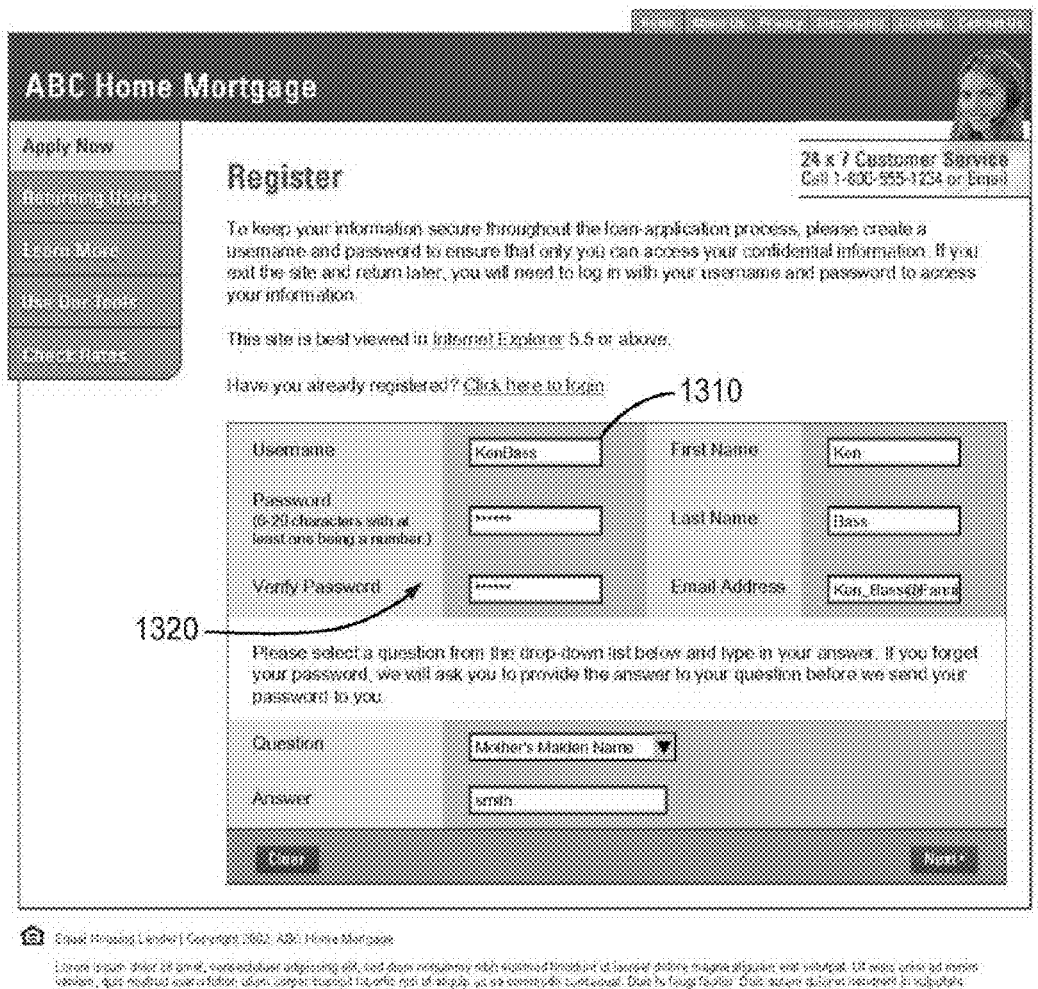
Figure 14:
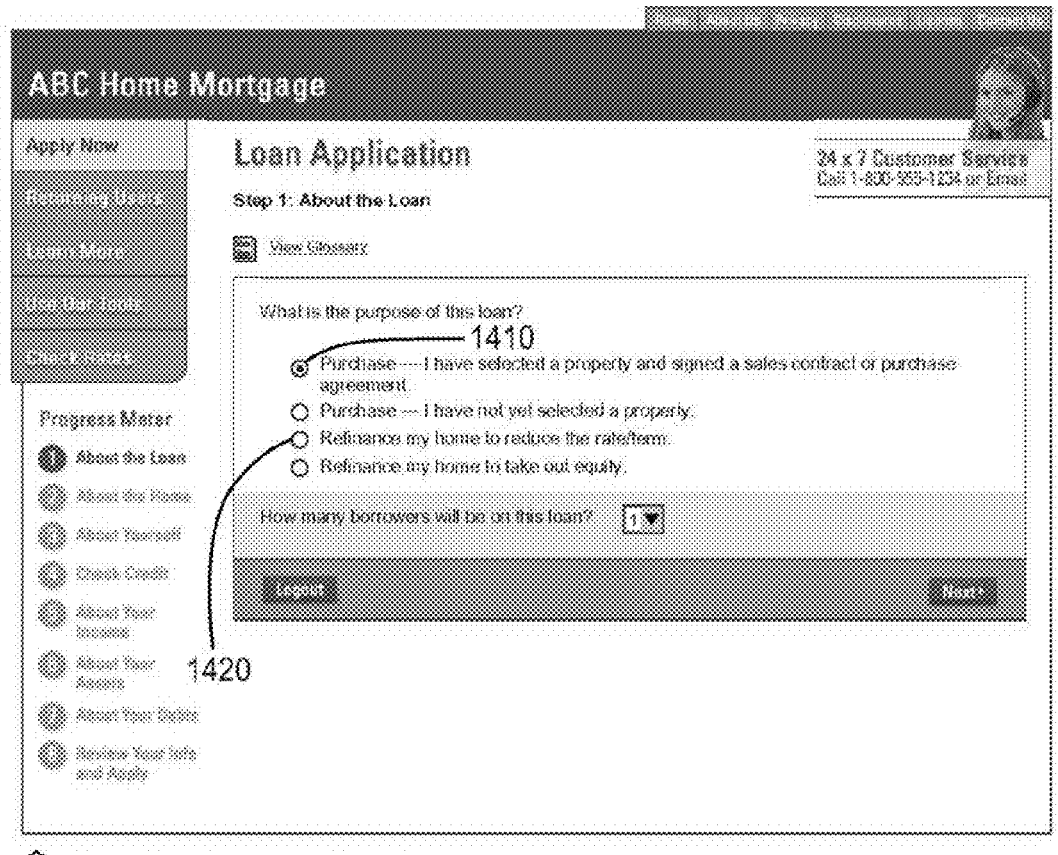
Figure 16:
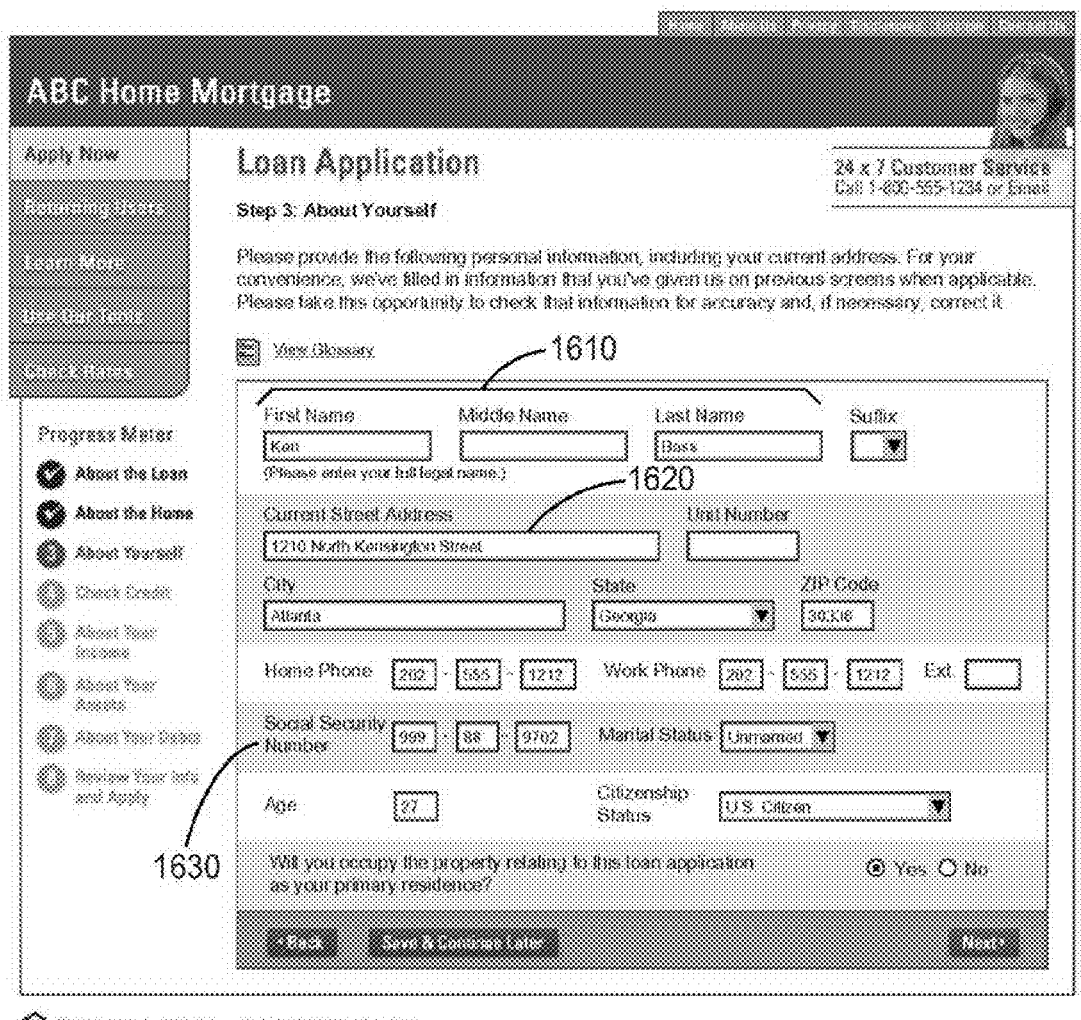
Figure 17:
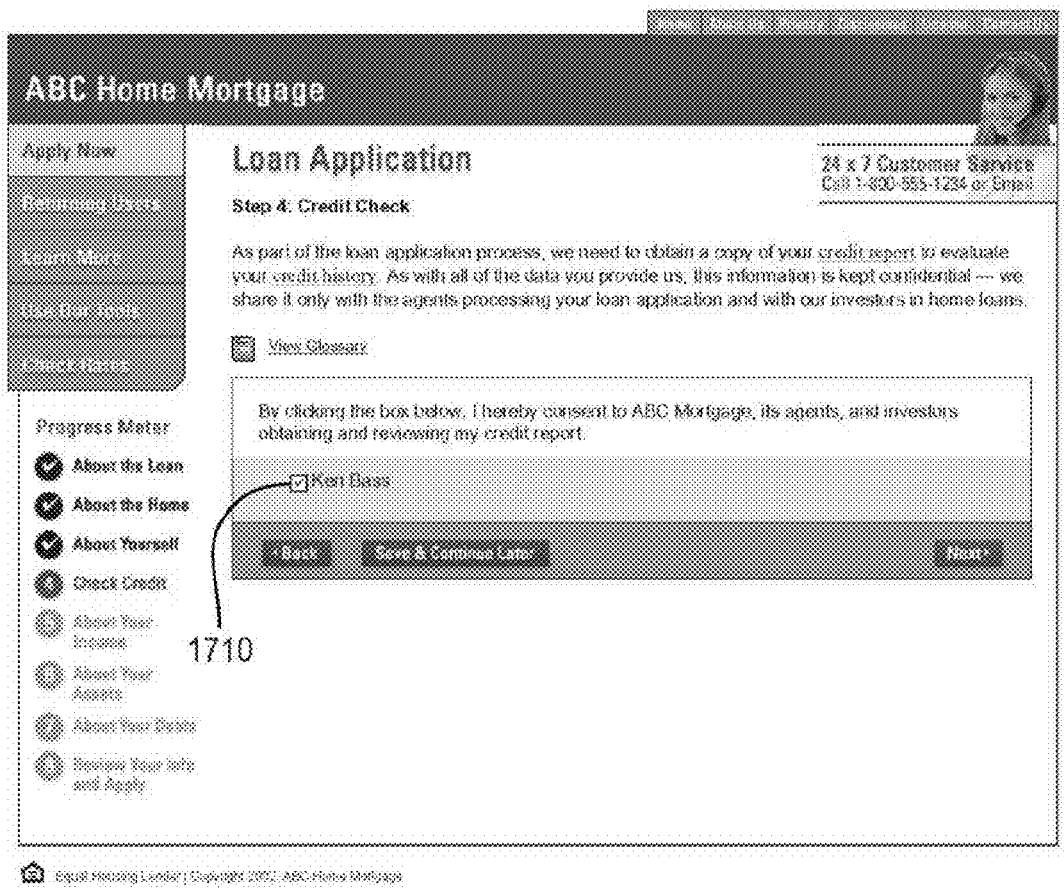
Figure 19:
Figure 21:
Figure 22:
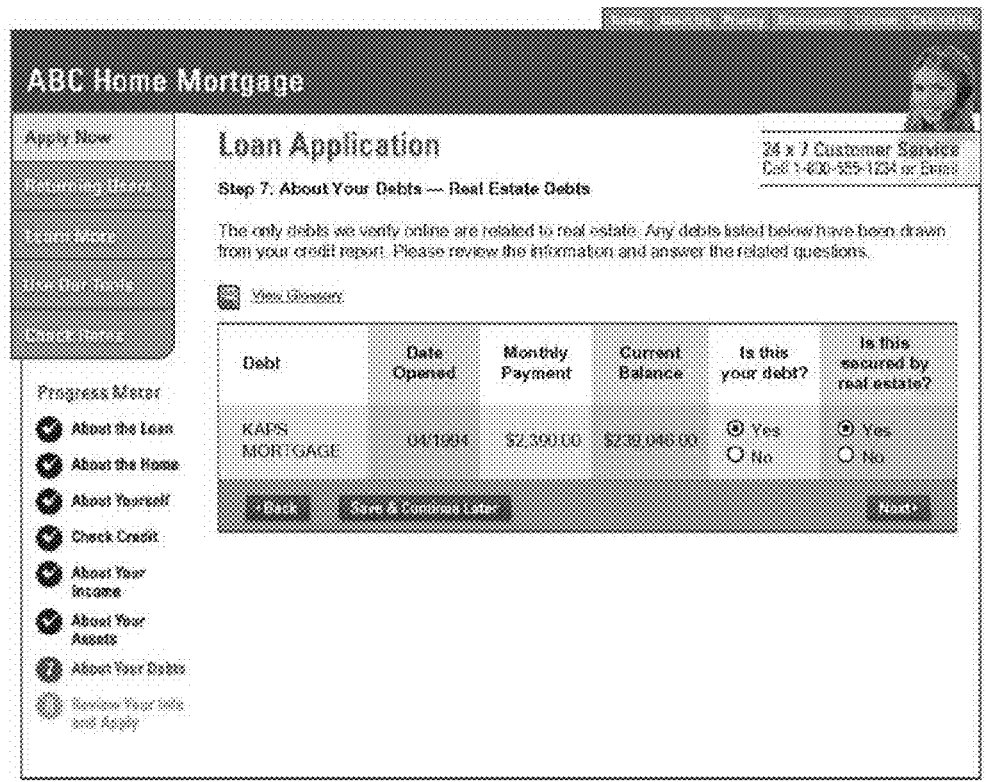
Figure 23:
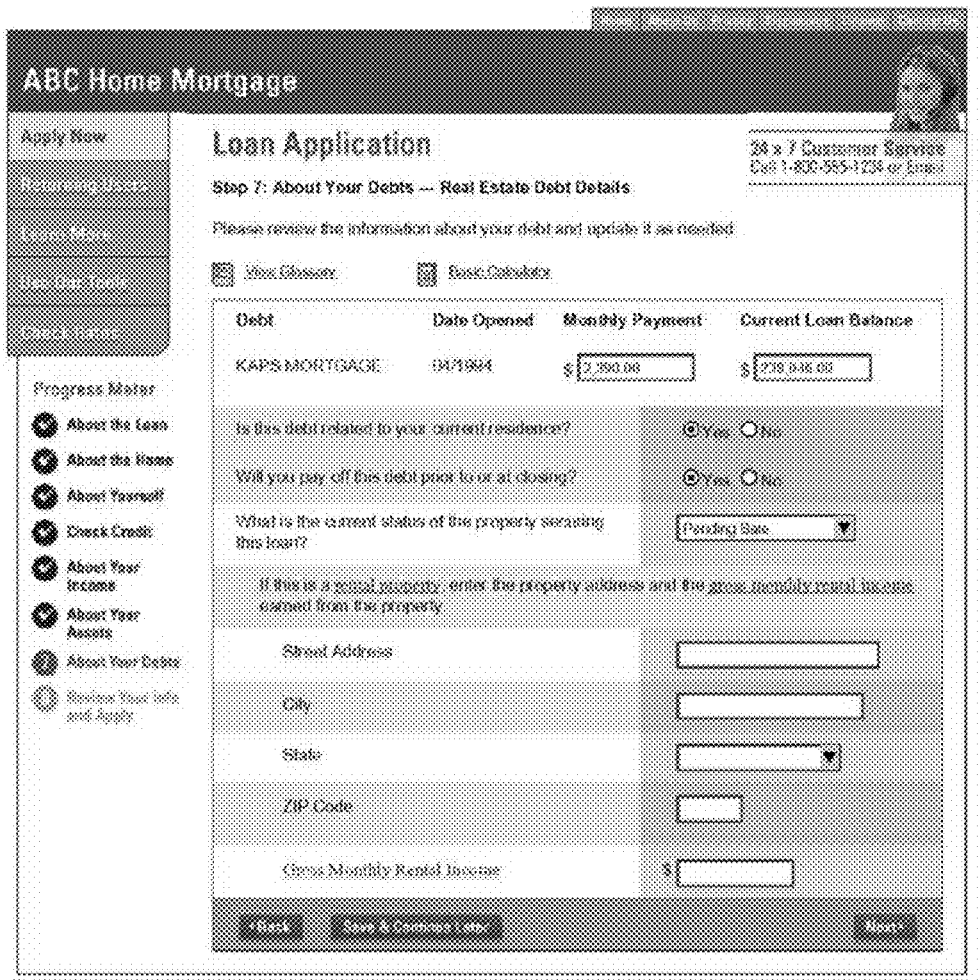
Figure 24:
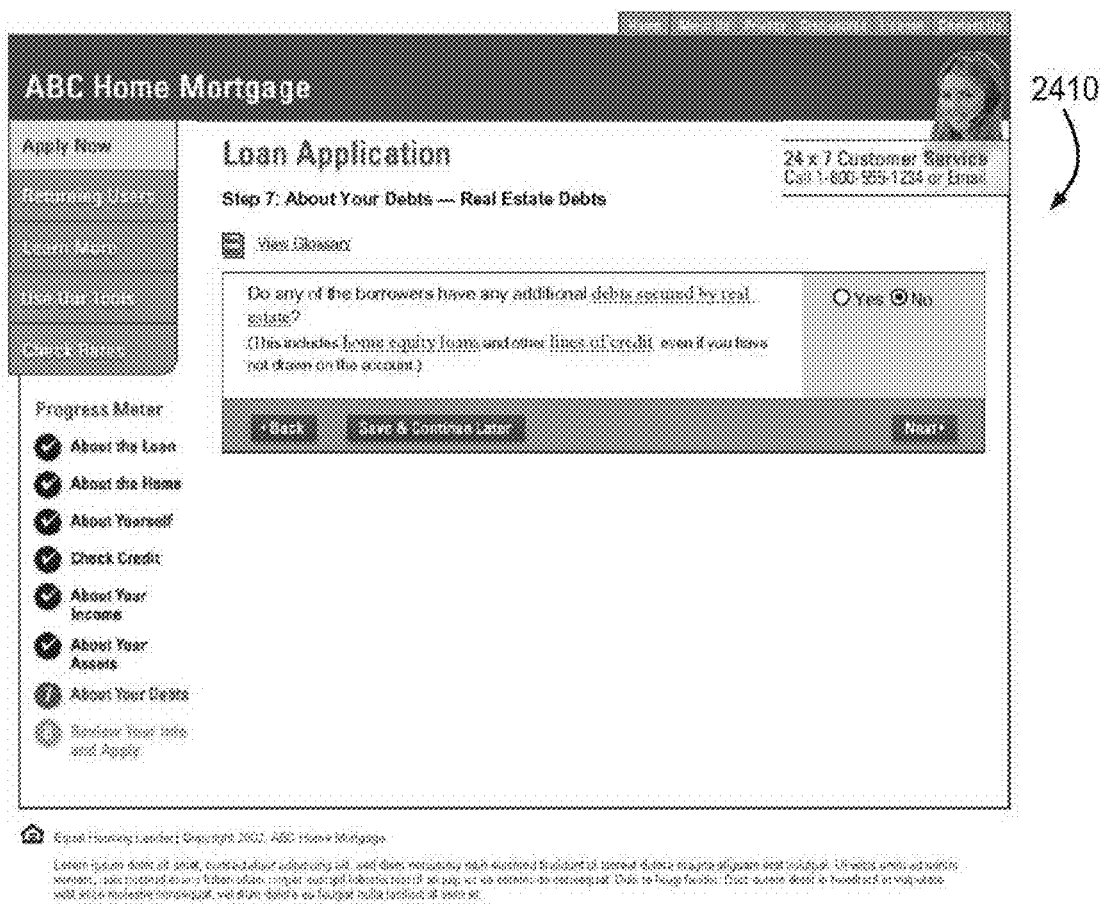
Figure 25:
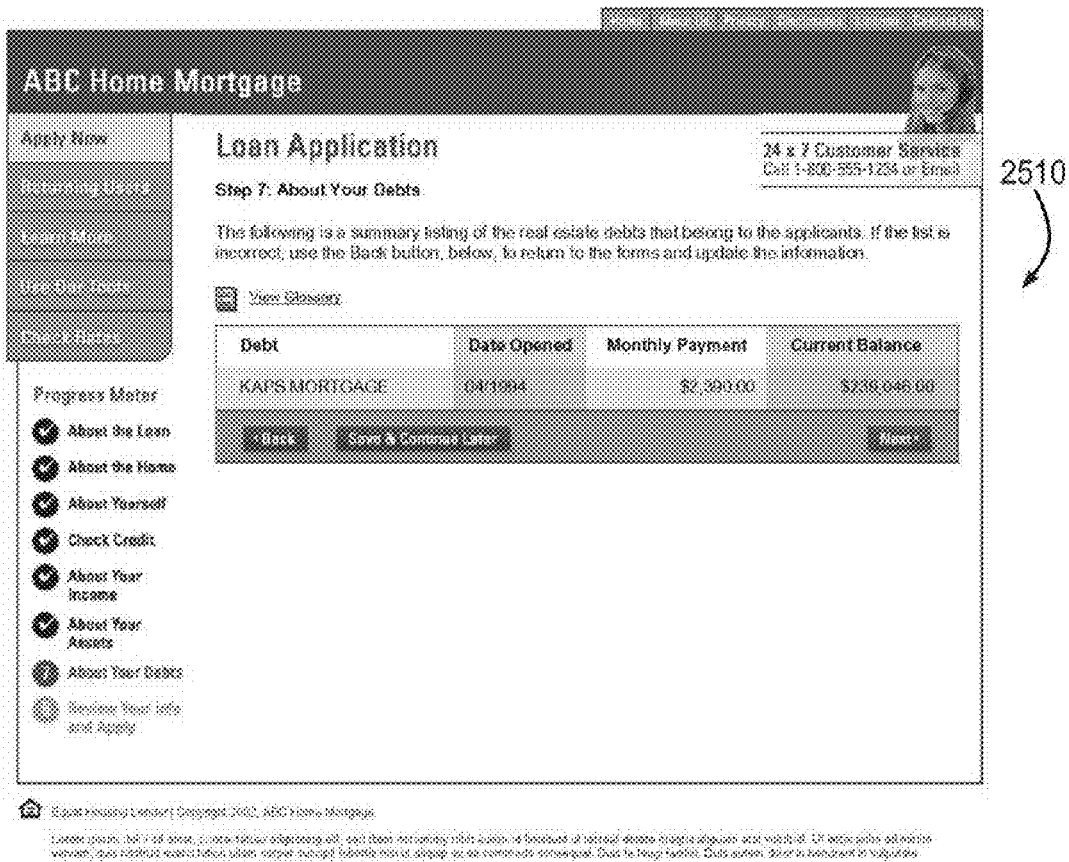
Figure 27:
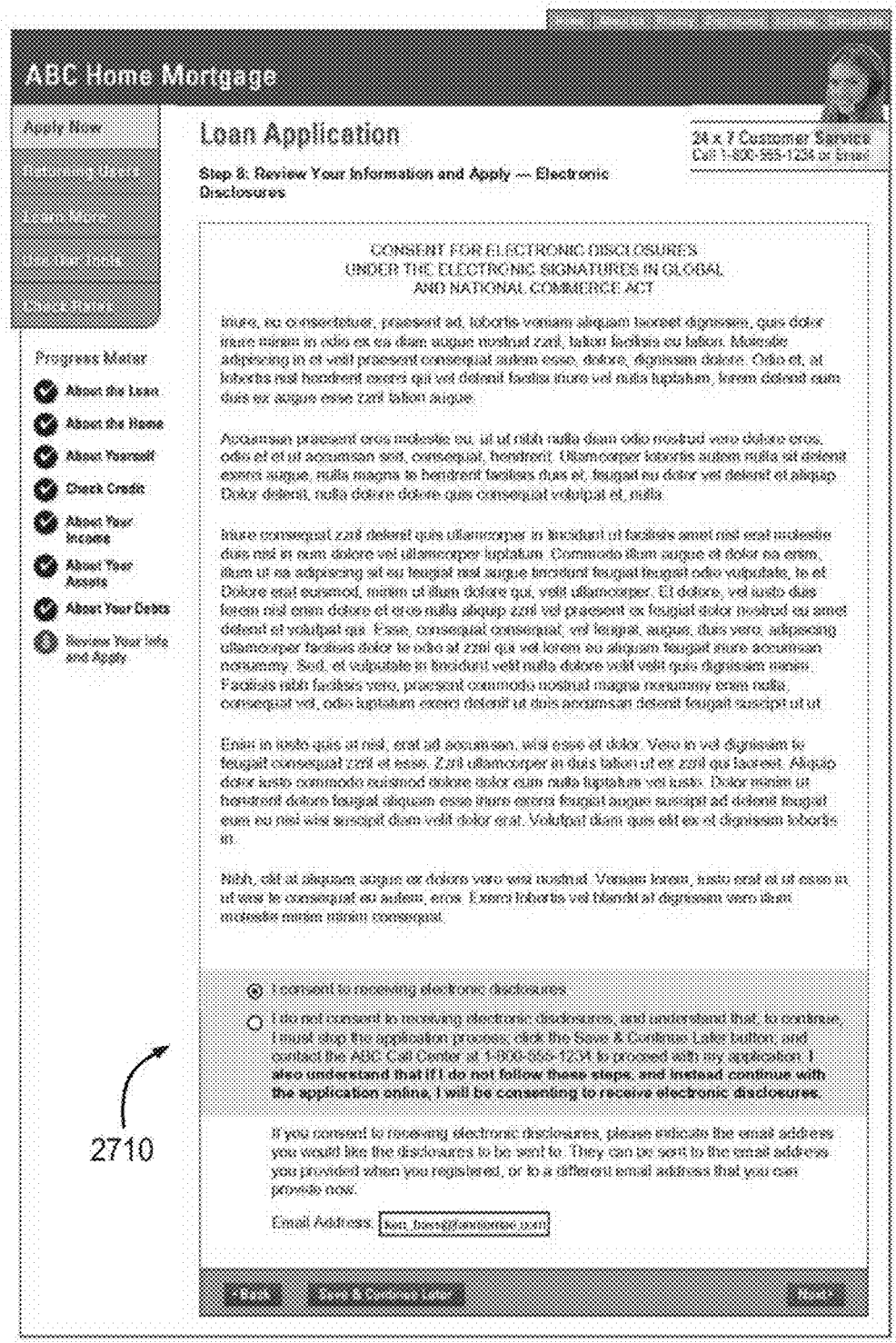
Figure 29:
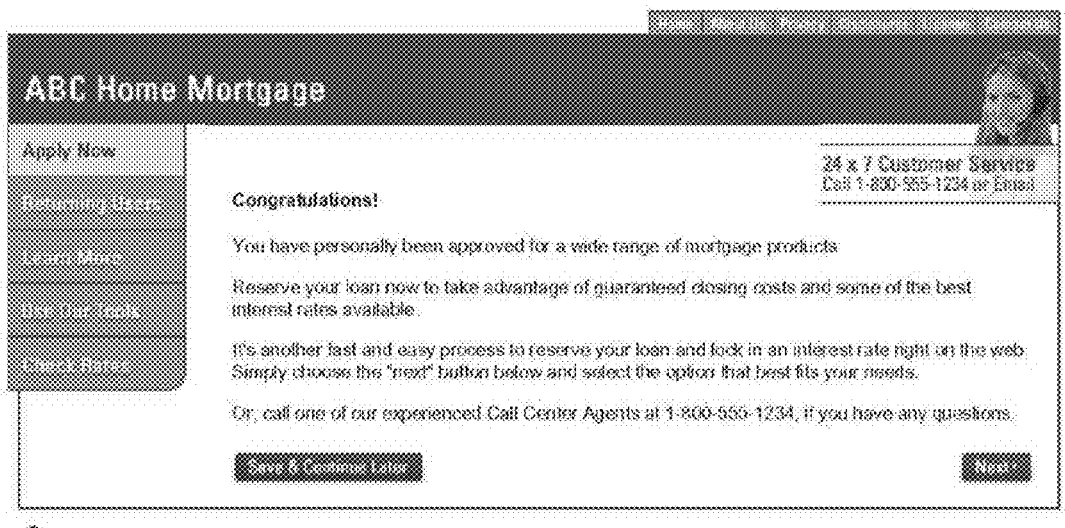

As shown in FIG. 13, registration information may comprise a user name 1310, a password 1320 and other information to set up a user account and record (e.g., data file). It should be noted that the record or data file relating to a loan application from a consumer is the same record or data file that will relate to a loan closed from the loan application, and furthermore, is the same record or data file that will be used to sell the loan to a secondary mortgage market participant. Referring to FIG. 14, loan application information may also comprise the purpose of the loan (which may be selected with a check box or buttons such as purchase 1410, refinance 1420, cash-out refinance 1430, etc.). Referring to FIG. 15, loan application data or information may also comprise property information (such as address 1510, residence type 1520, purchase price 1530, association fees 1540, etc.). Referring to FIG. 16, loan application data or information may further comprise consumer information (such as name 1610, address 1620, social security number 1630, etc.). The user interface may be configured to receive information regarding additional consumers (e.g., up to four consumers or more) by providing data fields relating to the consumers on the same page. Alternatively, information relating to one or more consumers may be provided or entered sequentially, serially, etc. Loan application data or information may further comprise a consumer consent to allow a lender to access a credit report of the consumer (see FIG. 17, check box 1710), information regarding consumer income (see FIG. 18, check box 1810 and FIG. 19, data fields 1910), consumer assets (see FIG. 20, data fields 2010), consumer real estate debt (see FIGS. 21 to 25, data fields 2110, 2210, 2310, 2410 and 2510), consumer demographic data (see FIG. 26, data fields 2610), consumer consent for electronic disclosure (see FIG. 27, check box 2710) and loan application summary data (see FIG. 28, data fields 2810). Preferably, the credit consent is received first, allowing the remaining data to be collected while credit is retrieved. As shown in FIGS. 22-25, a user may reconcile real estate entries by providing additional information relating to the real estate debts (such as whether or not the real estate debt will be paid off at closing, if the real estate debt is secured by property, etc.). Similar data may be entered via user interfaces 142 and 144. The loan application data or information may be stored in database 116 for use and retrieval.

Figure 31:
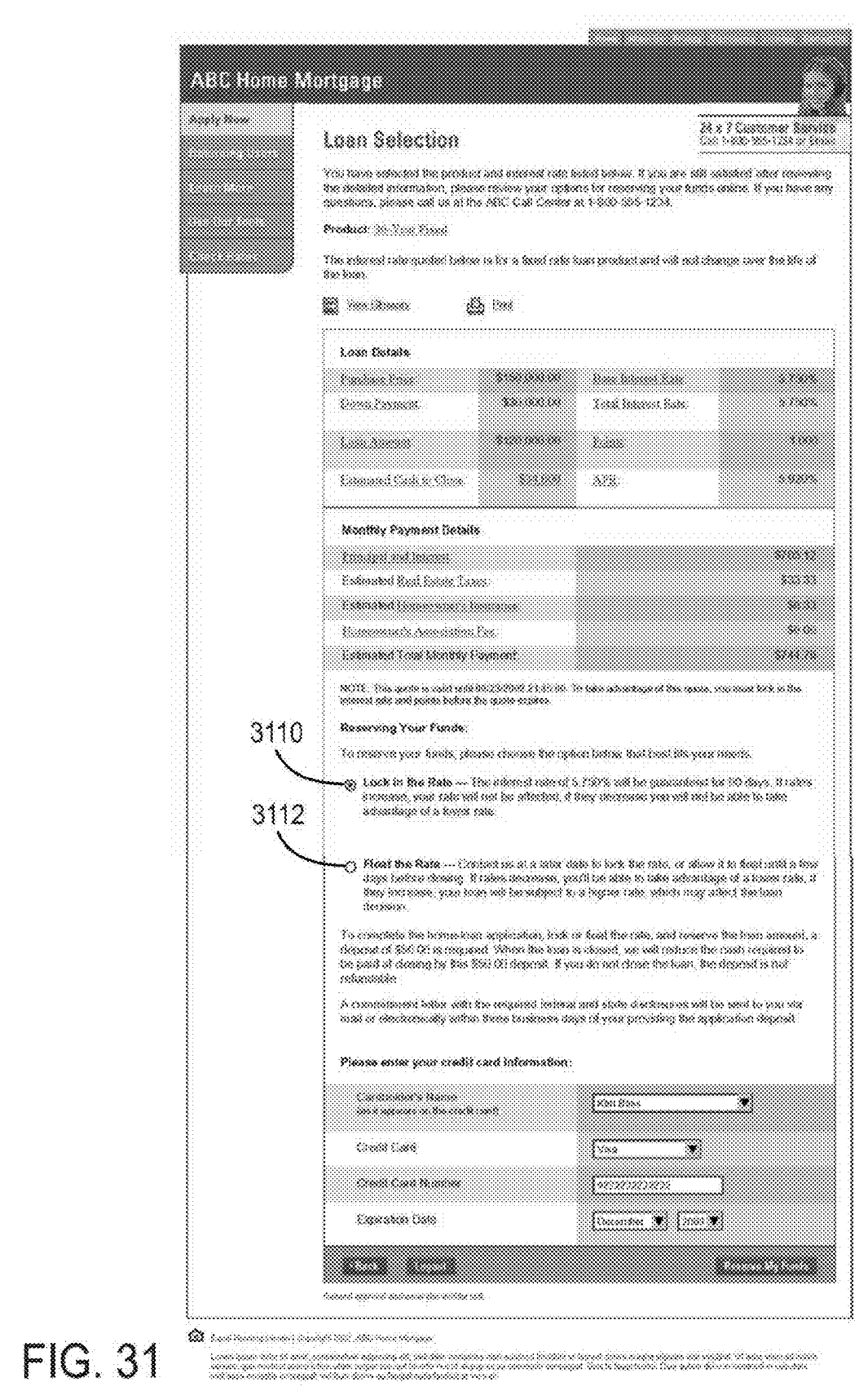
Figure 32:
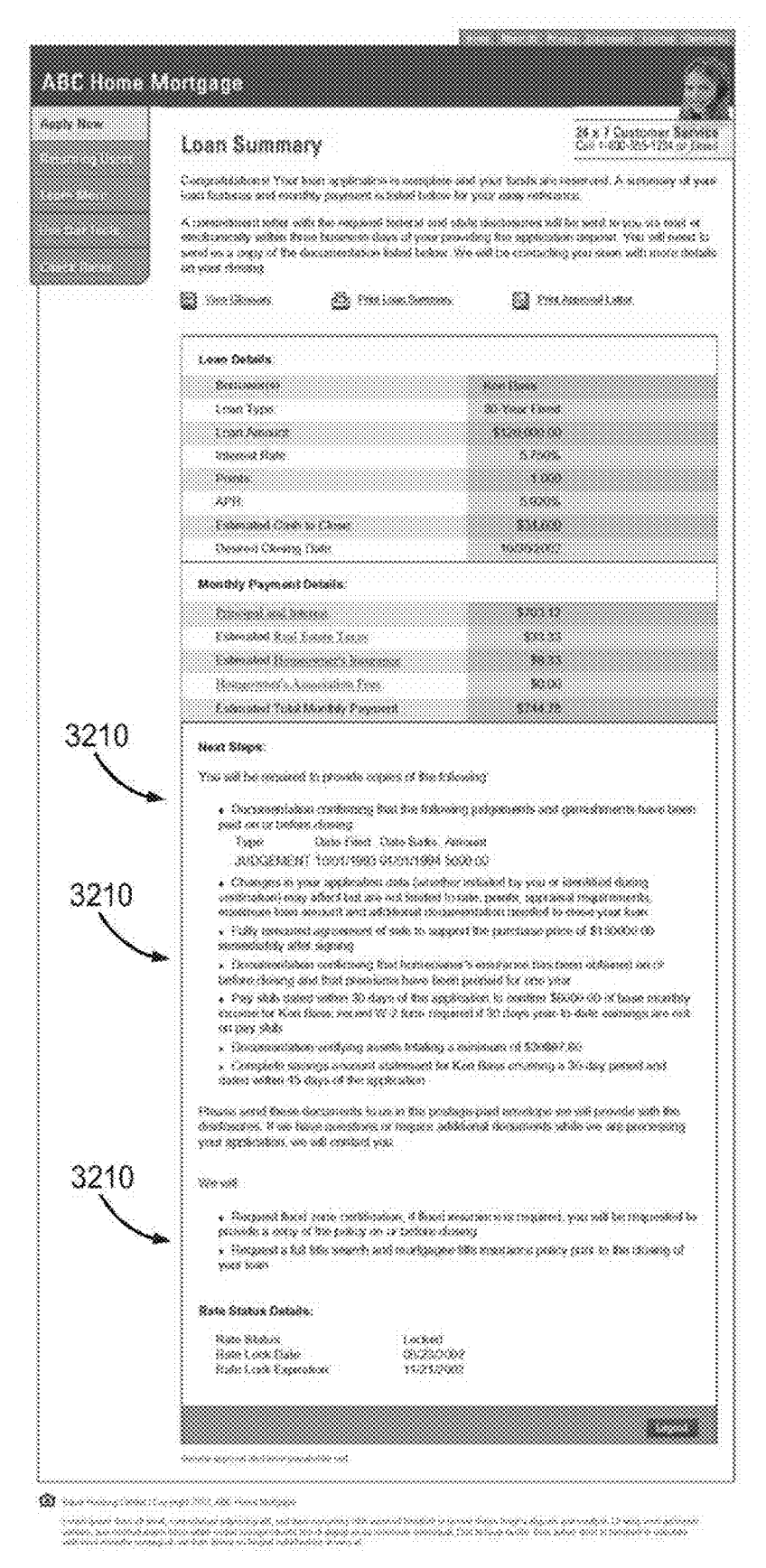

As previously indicated, the consumer is preferably provided with the option of submitting multiple loan products for underwriting, and obtaining underwriting recommendations on each of the submitted products, as described in U.S. patent application Ser. No. 09/593,106, titled "Online Mortgage Qualification and Application System and Process" filed Jun. 13, 2000. The final approved loan products and associated prices (i.e., a retail loan price) are then presented to the user as illustrated in FIG. 30. The user may select from the approved products (shown as a 30-year fixed mortgage 3010, a 15-year fixed mortgage 3012, a 5/1 adjustable rate mortgage (ARM) 3014, and a 7/1 ARM 3016). Other approved loan products may be presented to the user by selecting tab 3018 for additional adjustable rate products and/or tab 3020 for additional fixed rate products. The user may also make a decision to lock in the interest rate (i.e., fix or finalize the interest rate for the product) or to allow the interest rate to "float" for a certain number of days (i.e., allow the interest rate to vary of fluctuate until a future time). As shown in FIG. 31, the user may select a button 3110 to opt to lock in the interest or may select button 3112 to allow the interest rate to "float." Alternatively, the user may select another button to allow the interest rate to "float down" (i.e., allow the interest to vary or fluctuate in a downward direction until a future time, but not to exceed or go higher than a specified amount or cap). As shown in FIG. 32, the user is informed that the loan application is complete, funds are reserved, and the interest rate is locked. Furthermore, reminders 3210 regarding required documentation to verify insurance, flood zone certification, etc. prior to closing are provided to the user. Various disclosures, such as the Good Faith Estimate of loan costs, Truth-In-Lending disclosures and application data summaries, are also provided. Additionally, if an ARM is selected, the required Consumer Handbook for ARMs booklet and ARM specific disclosures are provided to the user.

III. Advisor Interface

Figure 33:
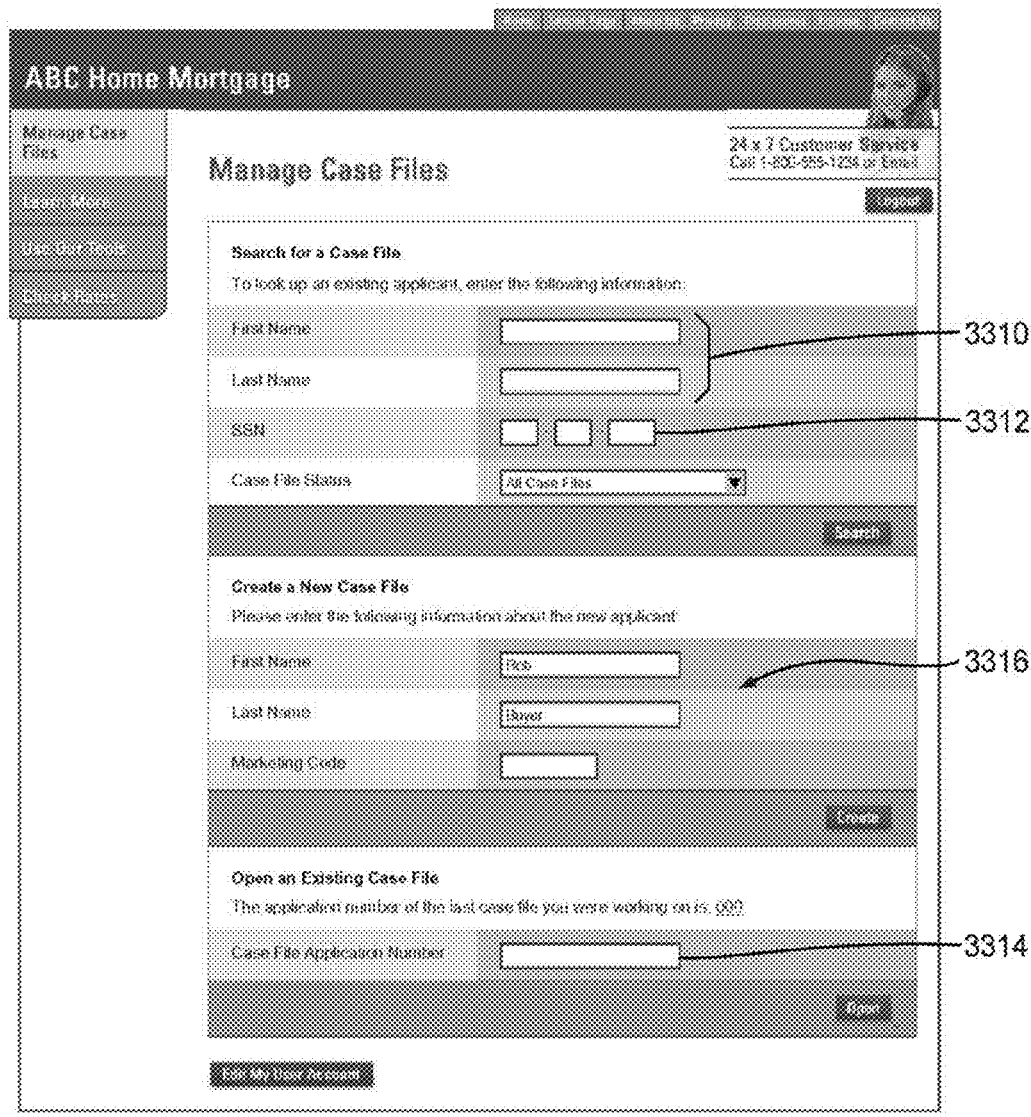
FIGS. 33-34 are depictions of an advisor user interface for access to the system shown in FIG. 1.
Figure 34:

According to a particularly preferred embodiment, user interface 142 is an advisor interface and is configured for use by advisors to consumers (e.g., a mortgage broker, banking officer, advisor, consultant, etc). Advisor interface 142 allows a user (i.e., advisor) to access and provide information or data regarding a set or group of consumers (selected from all consumers stored in database 116) with whom the advisor is associated (such as customers of the advisor). As shown in FIGS. 33 and 34, advisor interface 142 may allow the user to search for and retrieve records of one or more customers by searching by name (field 3310), social security number (field 3312), or by case file or data record (field 3314). As shown in FIG. 34, the search results are provided in a tabular format. An individual record from the search results would then be accessible to a user by selecting the record or case file. Referring back to FIG. 33, advisor interface 142 further allows a user to create a new case file or data record for a new consumer (field 3316).

Figure 34A:
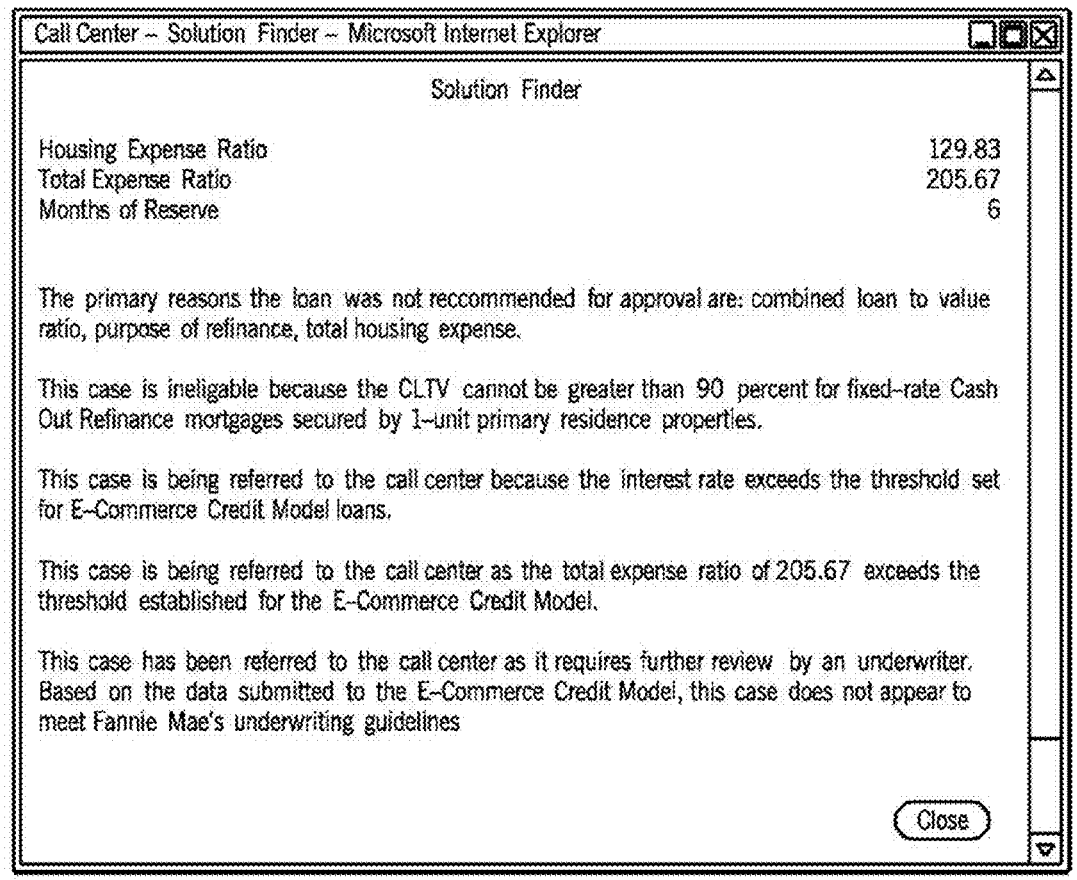
Figure 35:

According to a particularly preferred embodiment, user interface 142 is substantially similar to those shown in FIGS. 12-28 to complete or provide loan application information or data. User interface 142 (and user interface 144 described below) also provides messaging capability to assist the user with loan applications which have not been approved. As shown in FIG. 34A, a "solution finder" is provided to the user which outlines the factors as to why the loan application was not approved (such as the loan-to-value being too high, expense ratio being too high, etc.). This information may then be relayed to the consumer to suggest areas of improvement and enhance the consumer's probability of being approved at a later time. Similarly, a consumer accessing user interface 140 may be directed to contact the call center for loan applications which have not been approved.

User interface 142 may also provide the advisor with a Real Estate Settlement Procedures Act (RESPA) checklist to allow the advisor to check off the work steps they have completed which they will need to demonstrate to the lender in order to be compensated for work done on a closed loan.

IV. Call Center Interface

According to a particularly preferred embodiment, user interface 144 is a call center interface and is configured for use by a user at a call center (such as customer help lines, loan officers, support, loan processors and so on). Call center interface 144 may be configured to allow a user to access and provide information or data regarding all consumers/applicants in system 10, and also configured to create new files, data records or case files for new consumers. The call center interface 144 may also be configured to allow a user to change or update data, e.g., as in the case of a debt reconciliation. According to an alternative embodiment, call center interface 144 may be configured to access and provide information regarding a set or portion of all of the consumers/applicants in system 10.

Figure 37:
Figure 38:
Figure 39:
Figure 40:
Figure 41:
Figure 45:

A call center may access user interface 144 as shown in FIGS. 35-52. It should be noted that user interface 144 is configured to provide information in a tab-format which allows for rapid access to different categories or types of information. According to a particularly preferred embodiment, user interface 144 is intended to be used by a call center user. The layout and presentation of information allows a call center user to quickly and easily access selected topics of information by selecting various tabs. Furthermore, the layout of user interface 144 may also assist a call center user through the sequential steps to obtain and enter consumer information, reconcile debt, receive an underwriting recommendation and pricing information for loan products, select loan products to close on, lock in the interest rate of the loan, etc. as will be described below. As shown in FIG. 36, the user interface may be provided with tabs 3610-3630. Tabs 3610 to 3620 relate to loan application information: tab 3610 (FIG. 36) relates to loan information, tab 3612 (FIG. 37) relates to property information, tab 3614 (FIG. 38) relates to consumer information, tab 3616 (FIG. 40) relates to consumer income, tab 3618 (FIG. 42) relates to consumer assets, tab 3620 (FIGS. 43-45) relates to consumer debt.

Tab 3620 is configured to allow the call center to assist the consumer to reconcile real estate debt from a credit report. The call center may reconcile the real estate debt entries by answering questions such as if the debt belongs to the applicant (check box 4310), if the debt is secured by real estate (check box 4320), if the debt will be paid off prior to closing (FIG. 44, check box 4410), or adding additional real estate debt entries not on the credit report (see FIG. 45).

Figure 46:
Figure 47A:
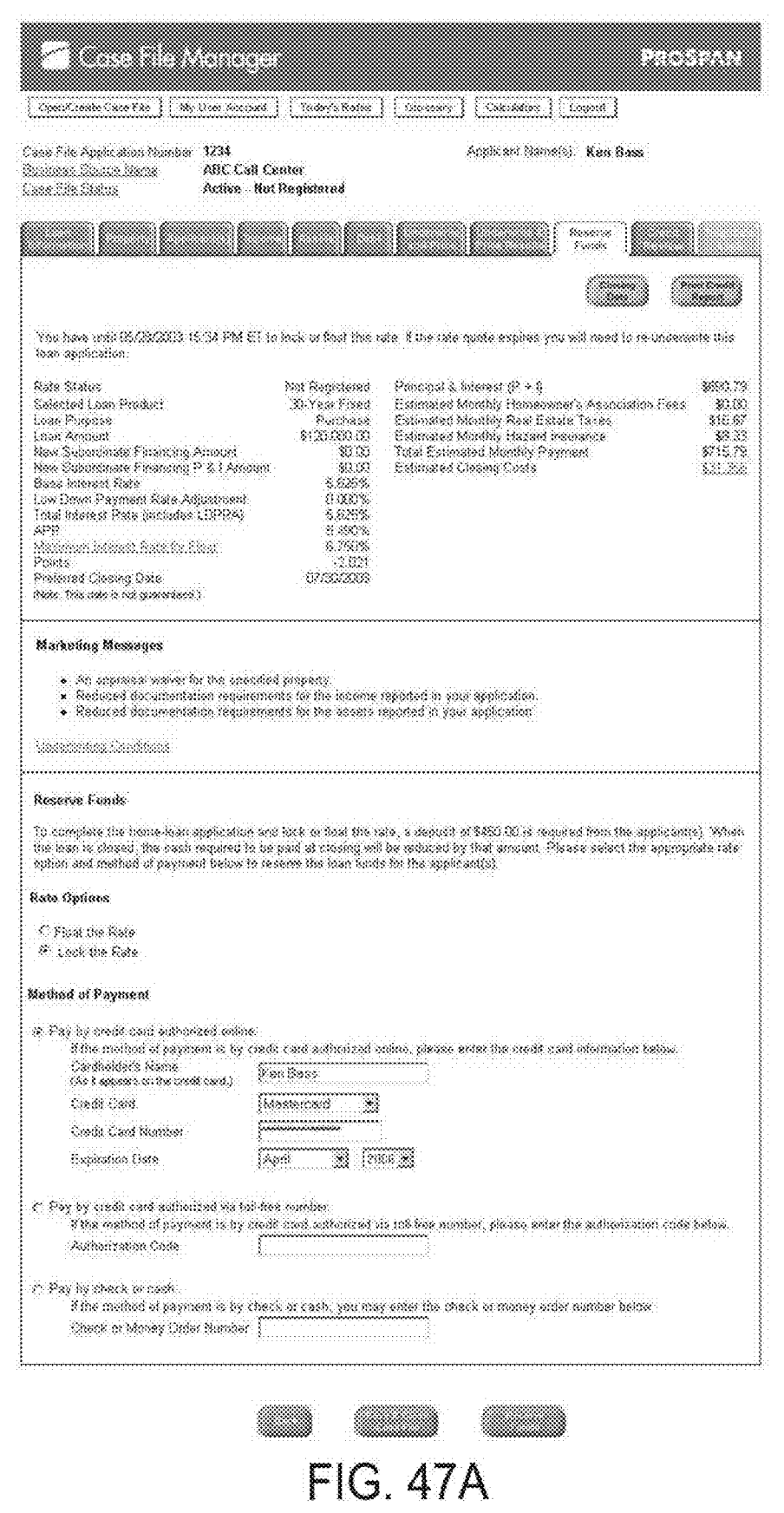
Figure 48:
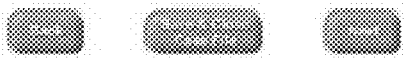

The loan may be underwritten and priced by completing and submitting the data fields on tab 3622 (FIG. 46). According to a preferred embodiment shown in FIG. 47, the approved products are organized in a tabular format according to product type. Within each tab, the user may review loan pricing parameters such as base interest rate, pricing adjustments, an actual percentage rate (APR) for the mortgage, monthly principal and interest amounts, points and estimated cost to close. The user, after reviewing the associated pricing parameters for the approved products, may then select a desired mortgage product (such as with a button provided by the individual mortgage product) to reserve the funds for the mortgage product. As show in FIG. 47A, the user may submit an electronic request to reserve funds for the selected mortgage product. The user may enter payment information (such as credit card information) to pay for the associated fees for reserving the funds and locking in the interest rate. The results of the pricing engine 120 are provided on tab 3624 (FIG. 48).

A consumer specific marketing message may be provided to the call center to be relayed to consumers in response to an underwriting recommendation of a loan application. The marketing message is preferably dependent on the underwriting recommendation. For example, an application having a high score may have a marketing message that allows the consumer to file reduced documentation to verify income or assets. Furthermore, for a consumer that is not approved, the solution finder may offer suggestions for enhancing the consumer's credit characteristics or taking other actions that would improve the consumer's chances of approval. Furthermore, the call center interface may provide a maximum approved loan amount to be communicated to the consumer (and an accompanying explanation that the maximum approved amount is different from the requested loan amount so that the closing costs may be included in the loan balance). According to alternative embodiments, consumer specific marketing messages may also be provided to the consumer and/or advisor via user interfaces 140 and 142.

Figure 49:
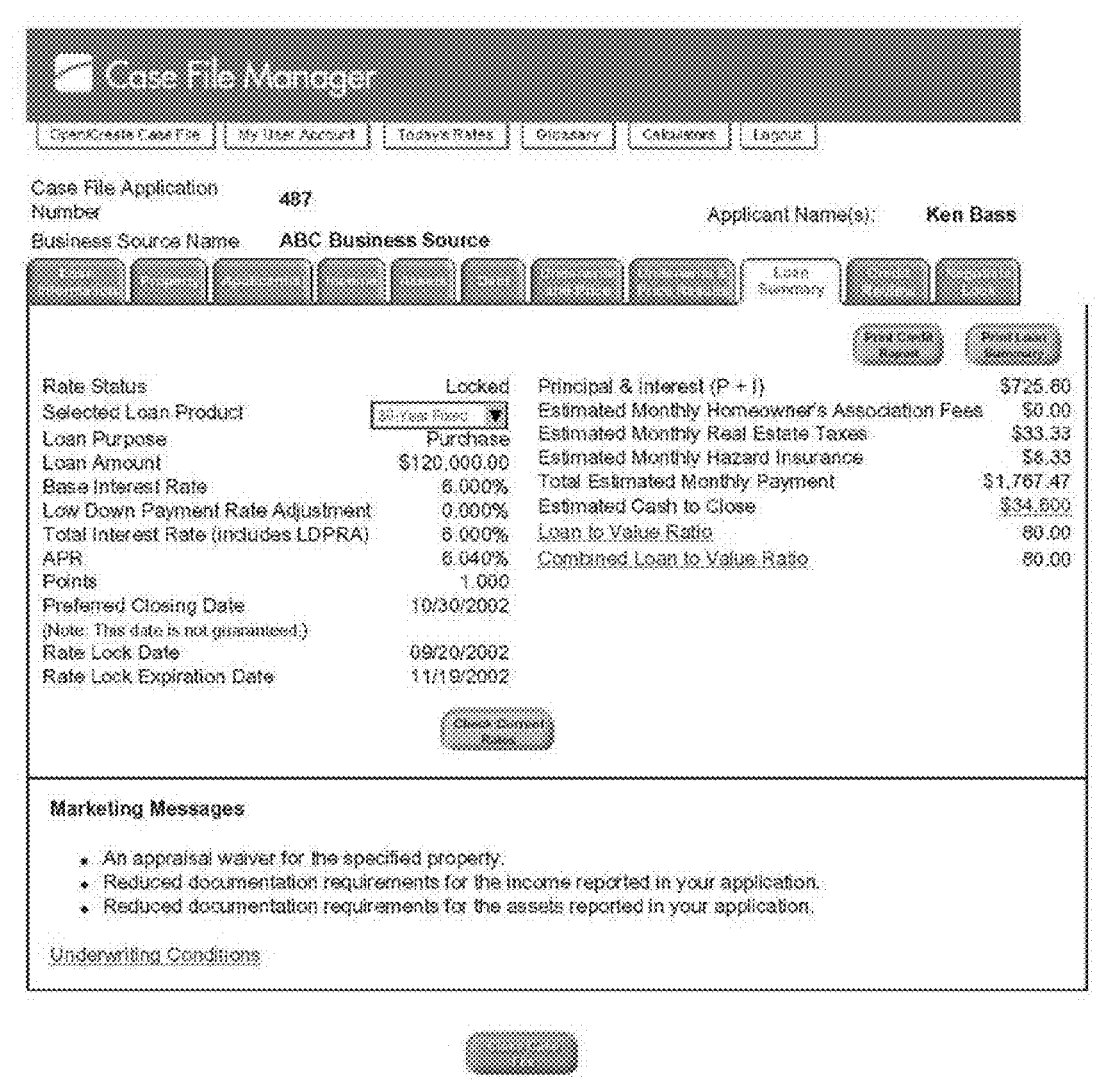
Figure 50:

A loan product summary may be provided on tab 3626 (FIG. 49). Other entries on the credit report may also be reviewed for accuracy on tab 3628 (FIG. 50). For example, call center interface 144 is further configured to display all entries from a credit report and to allow for reconciliation of individual Credit entries from the credit report. The application may be resubmitted for underwriting and pricing based on the reconciled credit entries.

Figure 51:
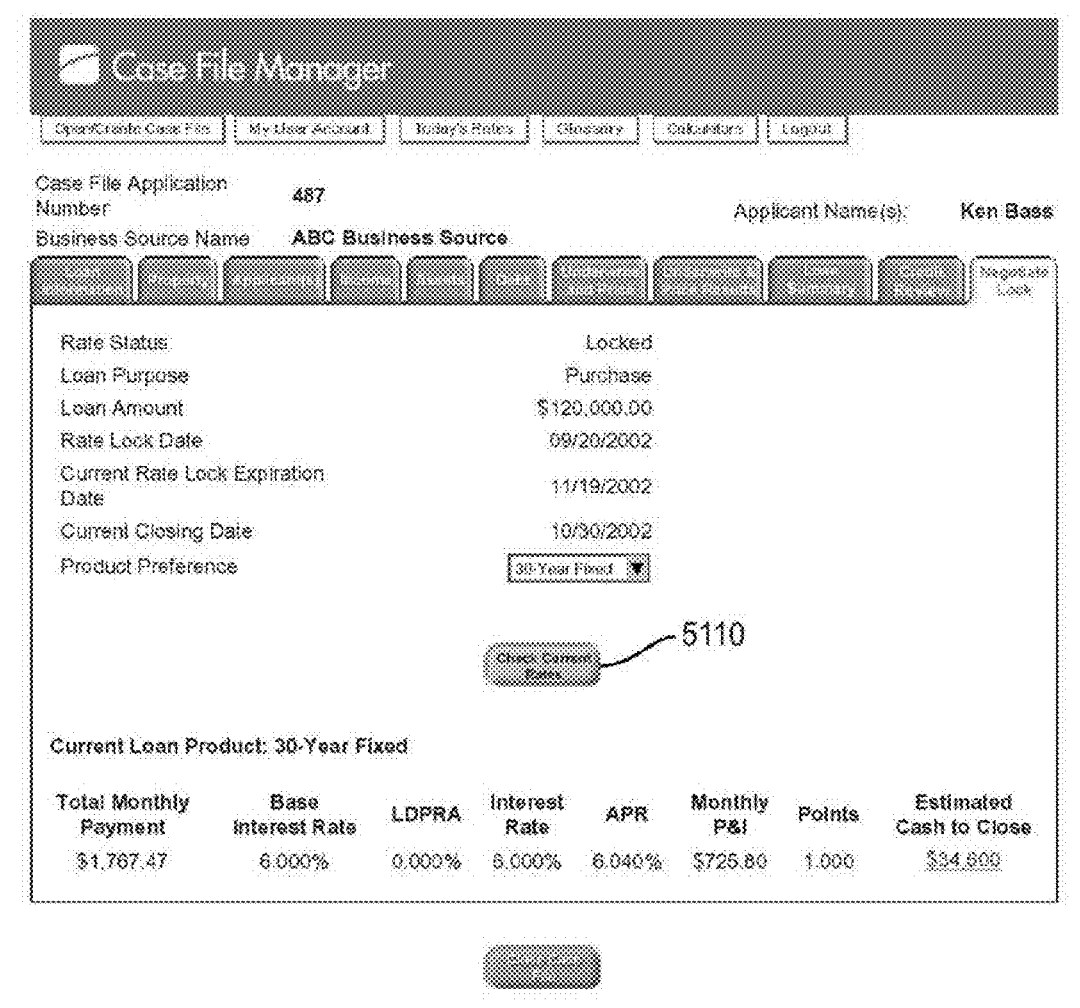
Figure 52:
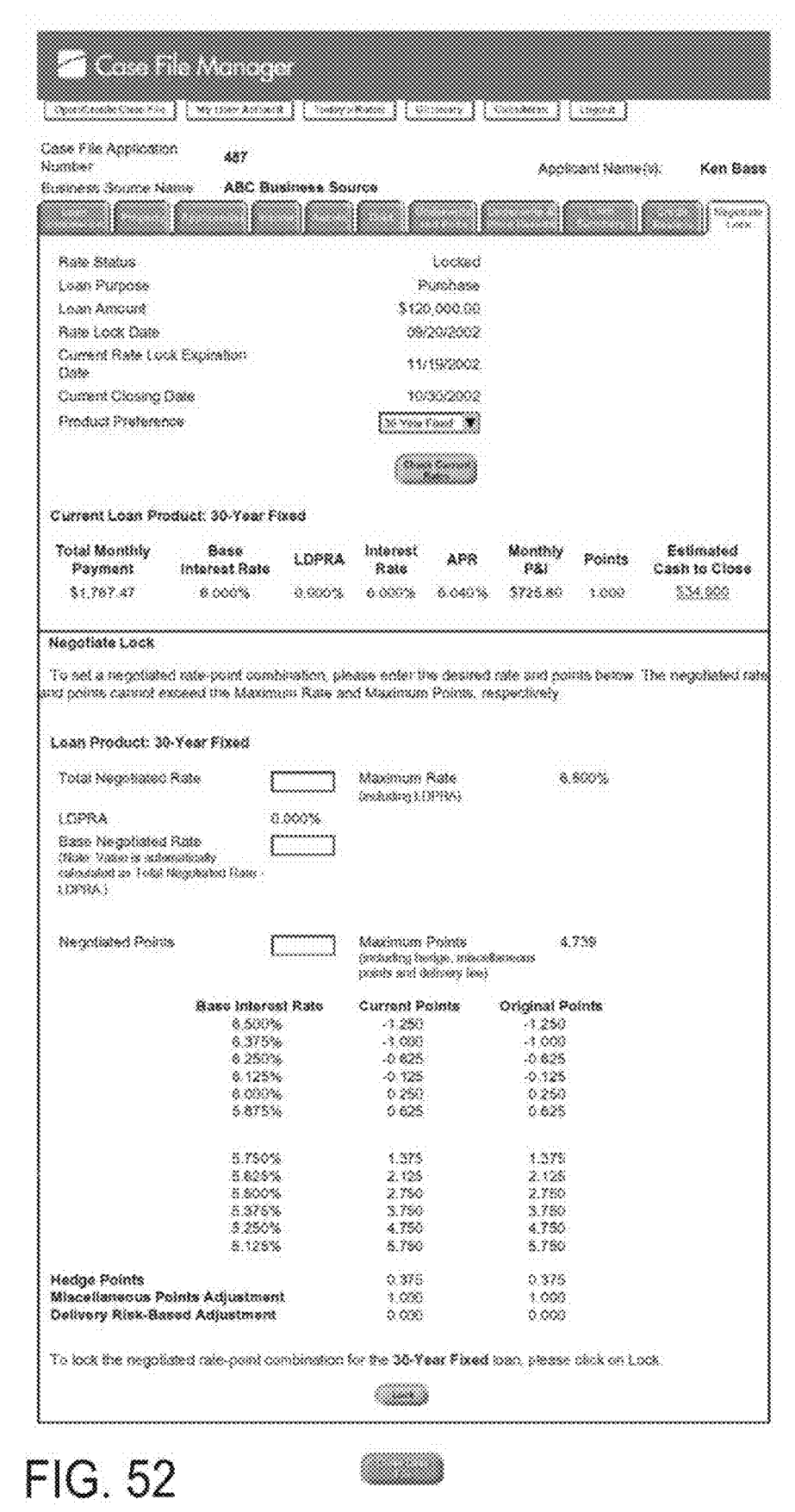

The loan may be selected and the rate locked on tab 3630 (FIG. 51). By selecting button 5110, the lender may manually enter a rate-point combination which was not returned (i.e., negotiated rate and points shown in FIG. 52).

V. Pipeline Manager Interface

According to a particularly preferred embodiment, pipeline manager interface 146 is a lender interface and is configured for use by a lender (such as a bank, loan officer, personnel of a lender responsible for marketing and selling mortgage loans to secondary mortgage market purchasers or others associated with loan pricing, selling or funding, etc.). Pipeline manager interface 146 also allows a lender to manage secondary mortgage market functions such as pricing and selling of closed loans to a secondary mortgage market participant for both cash and MBS executions.

Figure 54:
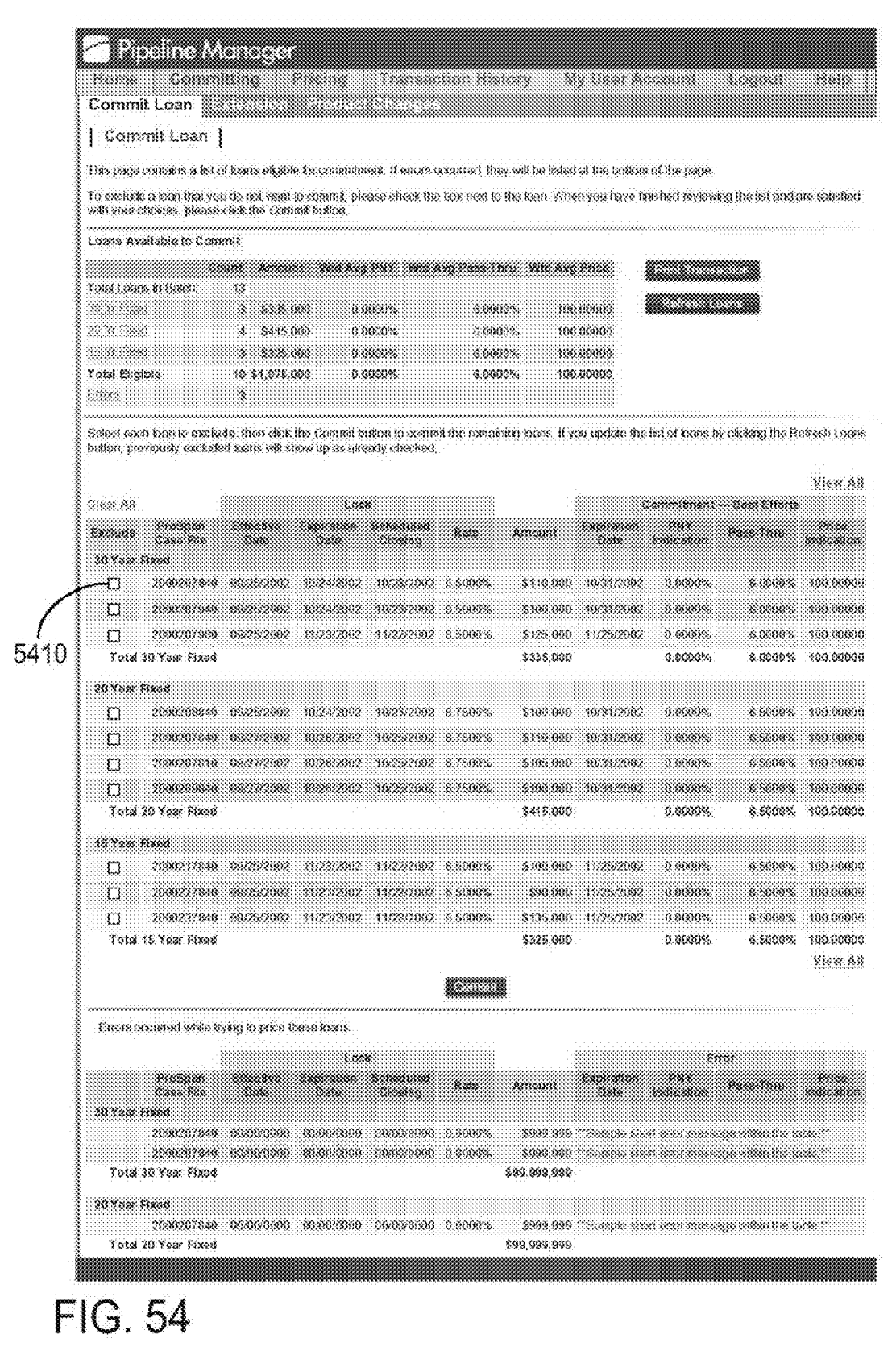
Figure 55:
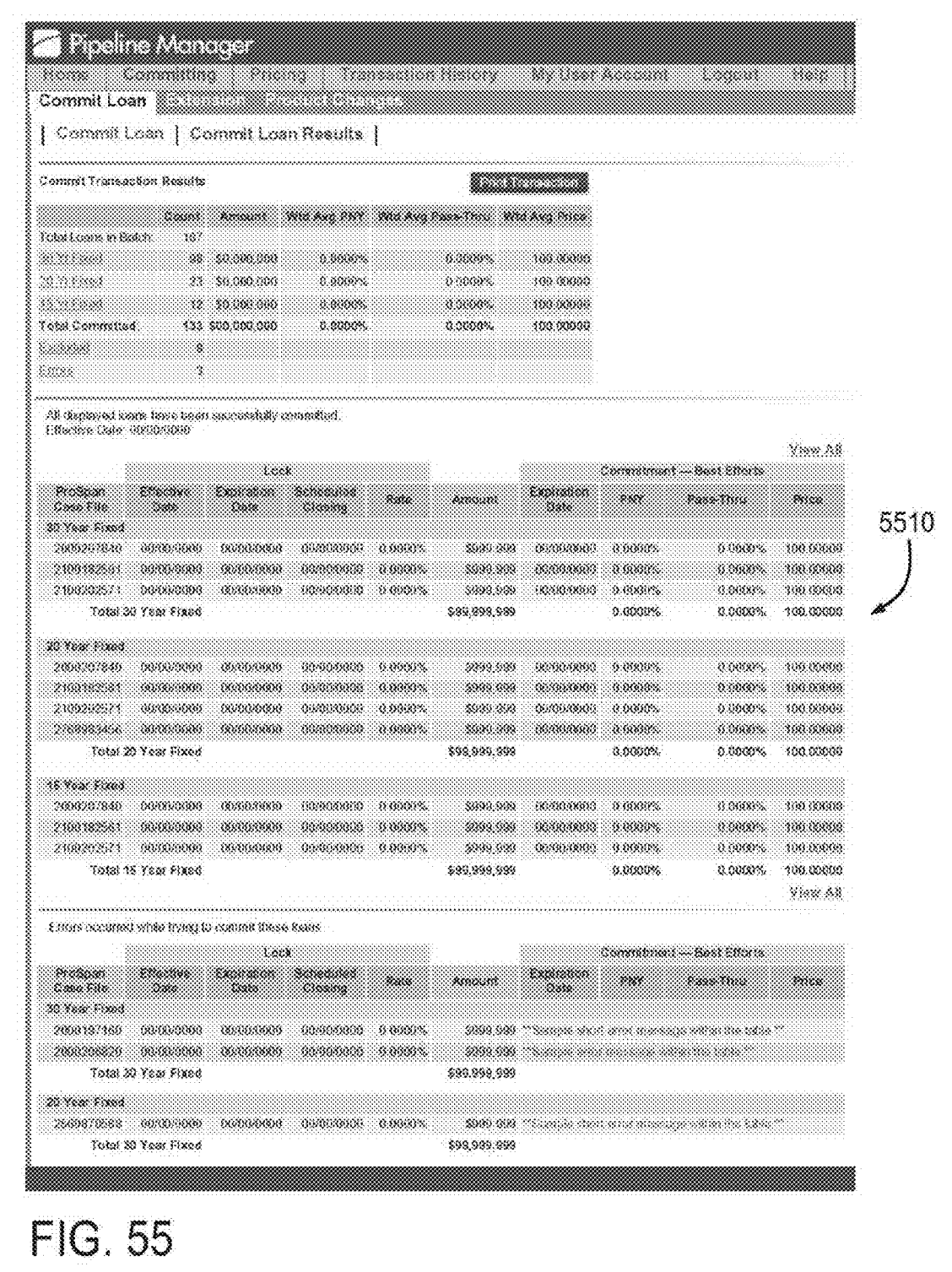

Shown in FIGS. 53-55 is pipeline manager interface 146 configured to allow a lender to access the commitment engine 124 which allows best efforts commitments and forward commitments of loans to a secondary mortgage market participant. As previously noted, in handling best efforts commitments, the system 10 preferably employs the systems and methods described in U.S. Patent Application No. 60/437, 084, titled "Method and System for Buying and Pricing Mortgage Loans Under Forward Commitments" filed Dec. 30, 2002. Referring to FIG. 53, an overview or summary page 5310 may be provided to the lender. Summary page 5310 comprises summary data 5320 regarding loans which are eligible to be committed using a best efforts commitment, summary data 5330 regarding loans which may need extensions or adjustments to the commitment date, summary data 5340 regarding loans which have changed product type, summary data 5350 regarding loans which have upcoming or pending expiration date (i.e., dates by which a commitment should be met) and summary data 5360 showing all active best efforts and/or forward commitments.

Referring to FIG. 54, the lender may select or exclude loans which are to be committed to the secondary mortgage market participant by selecting one or more check boxes 5410. Referring to FIG. 55, a summary page showing the results of the commitment are provided to the lender.

Figure 56:
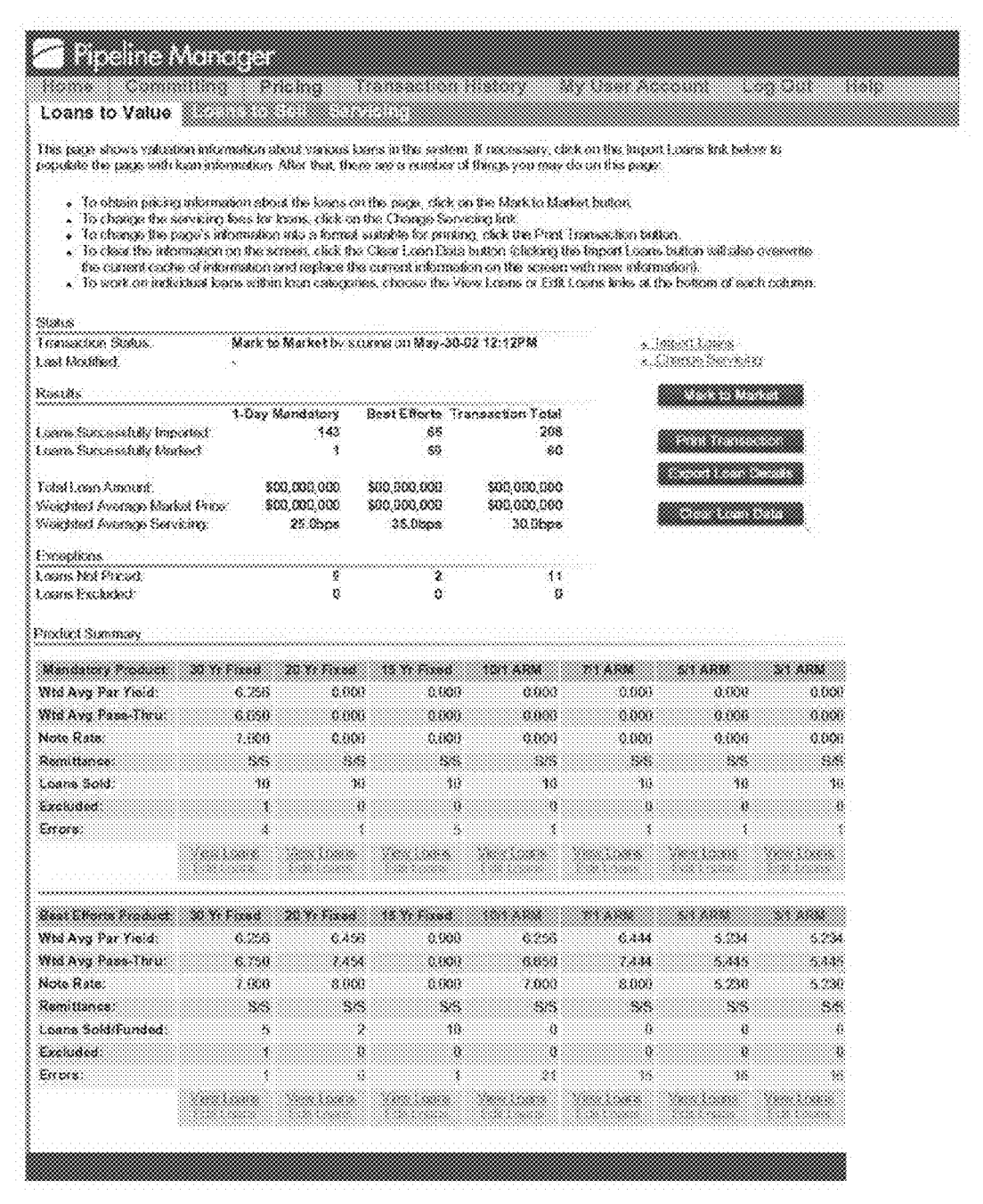

Shown in FIGS. 56-59 is pipeline manager interface 146 configured to allow a lender to price and sell loans to a secondary mortgage market participant. Referring to FIG. 56, which depicts an example user interface for presenting loan set summary information, the following data for all loans priced may be presented: (i) number of loans successfully imported from the lender's LOS, (ii) number of loans successfully marked (spot priced), (iii) total loan amount, (iv) weighted average market price (the weighted average value of the price for successfully processed loans) and (v) weighted average servicing (the weighted average value of the retained servicing for successfully processed loans). For loans that were not successfully priced (e.g., due to an error on validation or because the loan was already sold) but were not excluded, the total number of loans not priced can be displayed. Also, if the user excluded any loans from the loan set, the number of loans excluded may be displayed.

Figure 57:
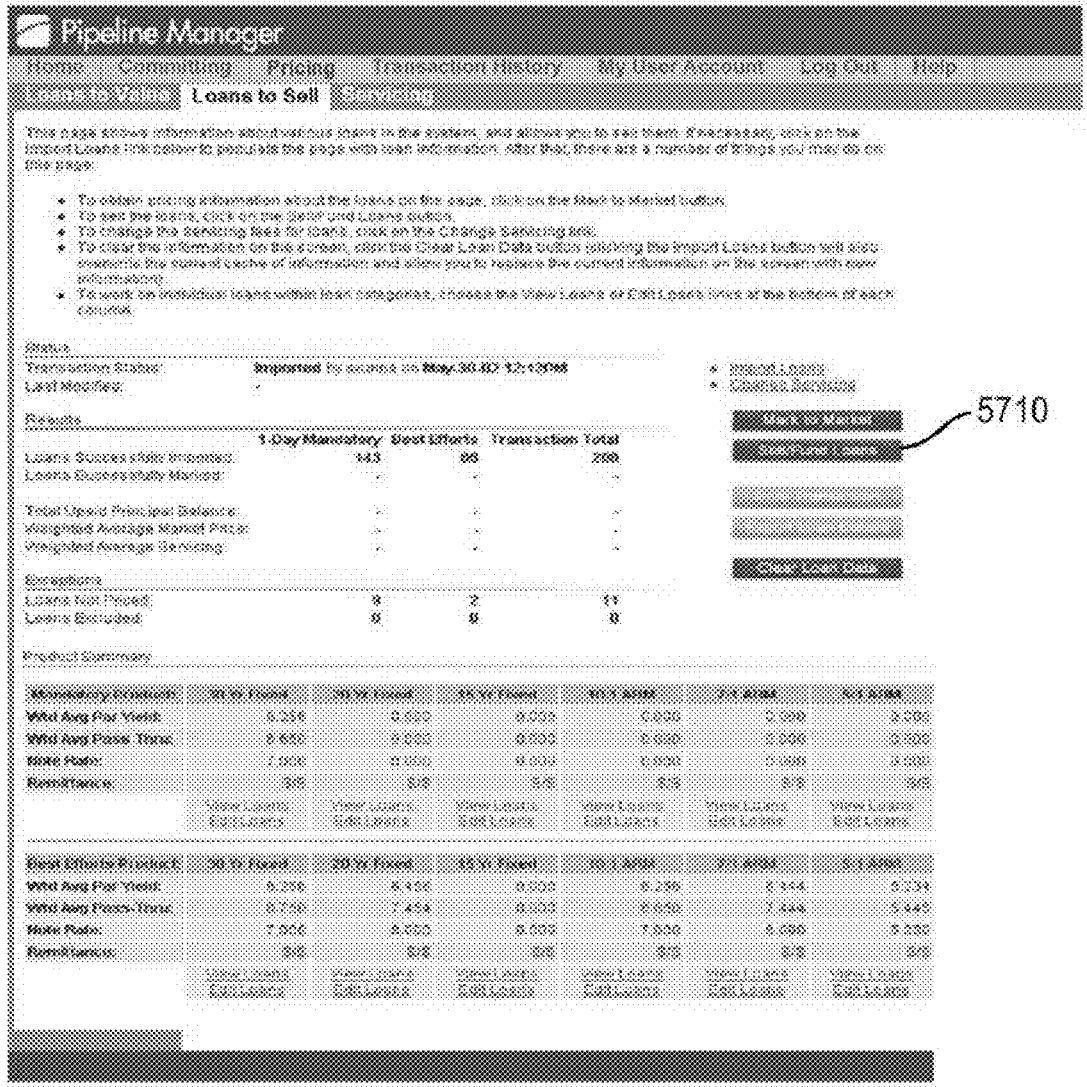
Figure 58:
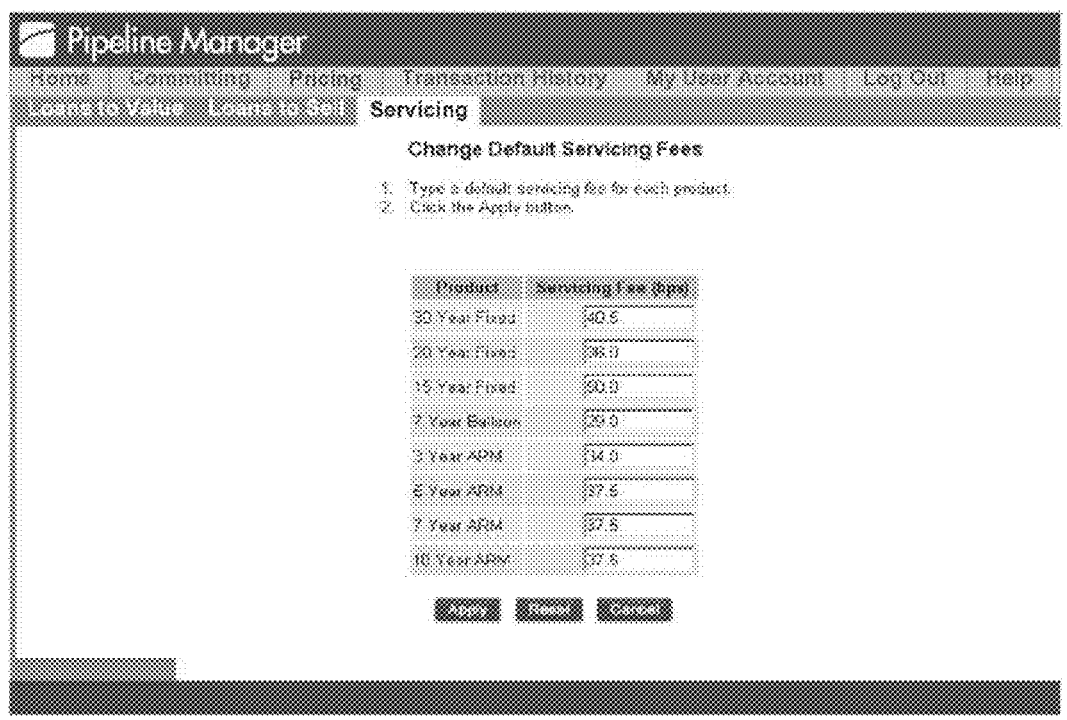
Figure 59:
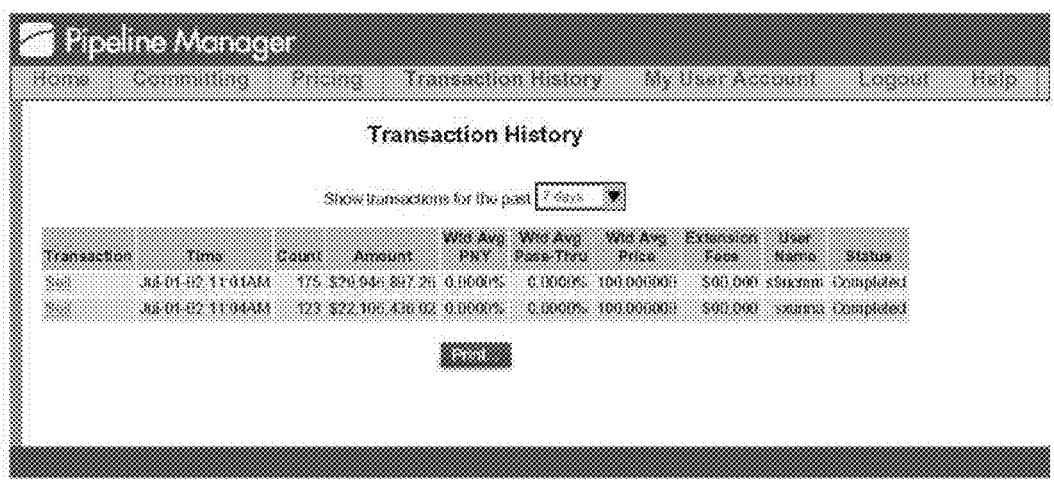

Referring to FIG. 57, which depicts an example user interface for allowing a lender to price and/or sell a loan set, the following data for loans may be presented: (i) number of loans successfully imported, (ii) number of loans successfully marked (spot priced), (iii) total unpaid principal balance, (iv) weighted average market price (the weighted average value of the price for successfully processed loans) and (v) weighted average servicing (the weighted average value of the retained servicing for successfully processed loans). A user may sell the one or more loans by pressing the "sell/fund loans" icon 5710. Referring to FIG. 58, a lender may adjust servicing fees to be retained from loans sold to the secondary mortgage purchaser. The lender may adjust the retained servicing fees based on product type. The system 10 preferably provides the lender with the ability to optimize servicing fees in accordance with U.S. patent application Ser. No. 10/329, 634 titled "System and Method for Mortgage Loan Pricing, Sale and Funding" filed Dec. 26, 2002, the entire disclosure of which is hereby incorporated by reference. Shown in FIG. 59, a summary of loans successfully sold may be presented to the lender.

In the preferred embodiment, the pipeline manager interface 146 includes a execution tool which uses the routing engine 138 to assist a lender with decisions affecting the final disposition of a closed loan (e.g., determining whether to retain or "portfolio" a closed loan, determining to which secondary mortgage market participants (if any) the closed loans should be sold and at what price, and so on). The tool may provide the user with the ability to sort, group and/or otherwise analyze loans for sale to a secondary mortgage market participant. For example, if a user of the pipeline manager interface is aware that a certain investor is offering favorable pricing on a particular type of loan, the user may use the execution tool to identify those loans meeting the investor's parameters and to group those loans for sale to the investor. According to a preferred embodiment, the tool permits the user to sort loans according to a variety of parameters, such as fixed vs. ARM, term, interest rate, points, dollar value, geographic location, and so on.

According to a preferred embodiment, the tool also allows business relationships, contracts, or other obligations to be taken into account. The tool is preferably configured to receive and store business relationship, contract, or other obligation data relating to loan commitments and to update information regarding fulfillment of those obligations. For example, a lender may enter into a business arrangement with a secondary mortgage market participant in which the lender agrees to sell a certain dollar value of loans of a certain type to the secondary mortgage market participant. Further, information regarding multiple commitments made to multiple different investors may be maintained and tracked. When the lender is in the process of determining the final disposition of one or more loans, the lender may be provided with data relating to the arrangement or contract to assist the lender in fulfilling any obligations it may have with the secondary mortgage market participant. A comparison of outstanding commitments may also be provided. For example, information may be provided to the user regarding the extent to which certain commitments have yet to be fulfilled (e.g., including the dollar value of loans which still must be delivered under the commitment, and the expiration date of the commitment). The tool may then be used to monitor a lender's open commitments. Further, the tool may be used to sort the available loans and select loans meeting a particular commitment obligation for sale to the associated investor. Data relating to the lender's commitments may then be updated to reflect the loans designated for sale to the investor.

VI. Platform Administrator Interface

Figure 60:
Figure 61:
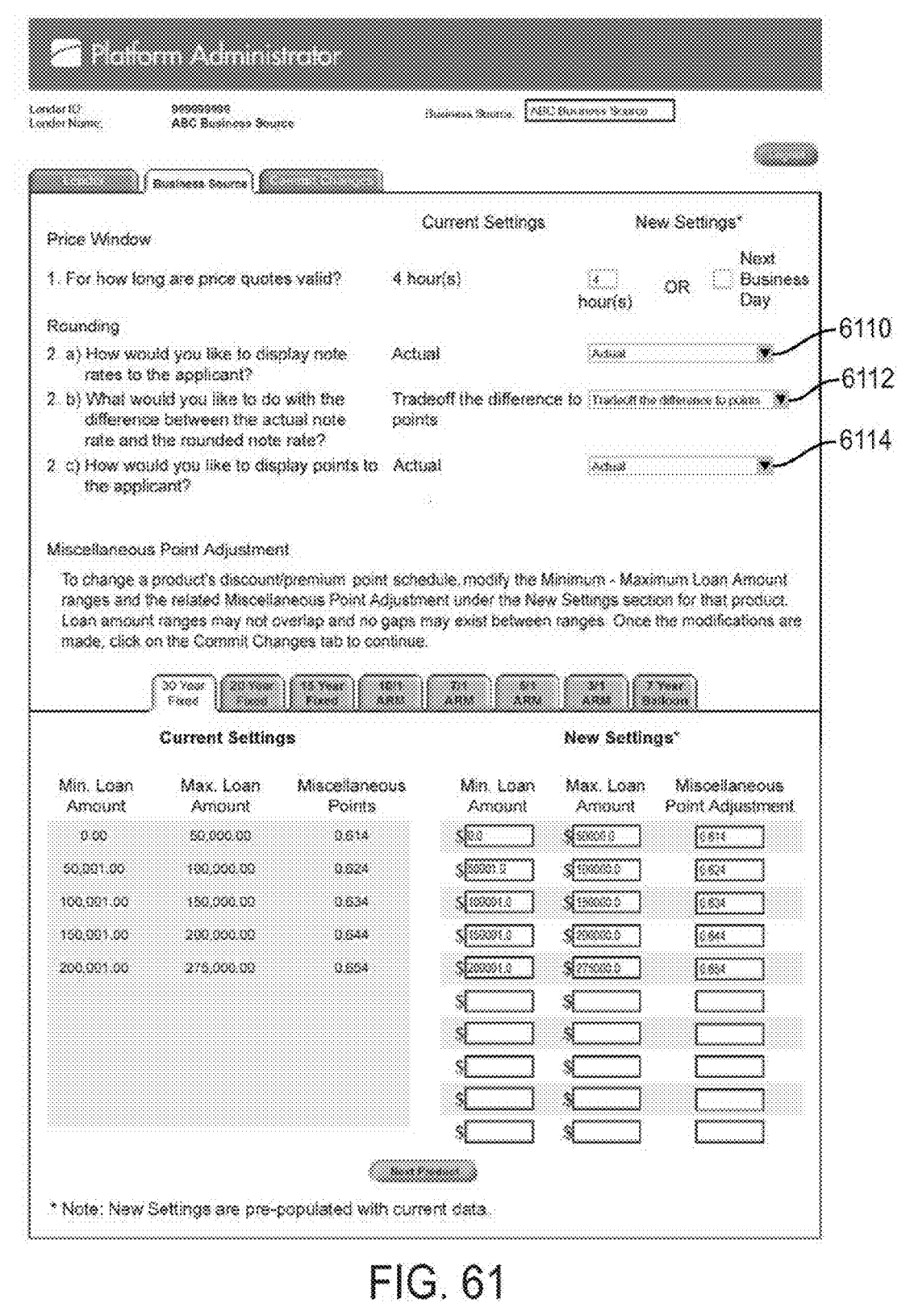
Figure 62:
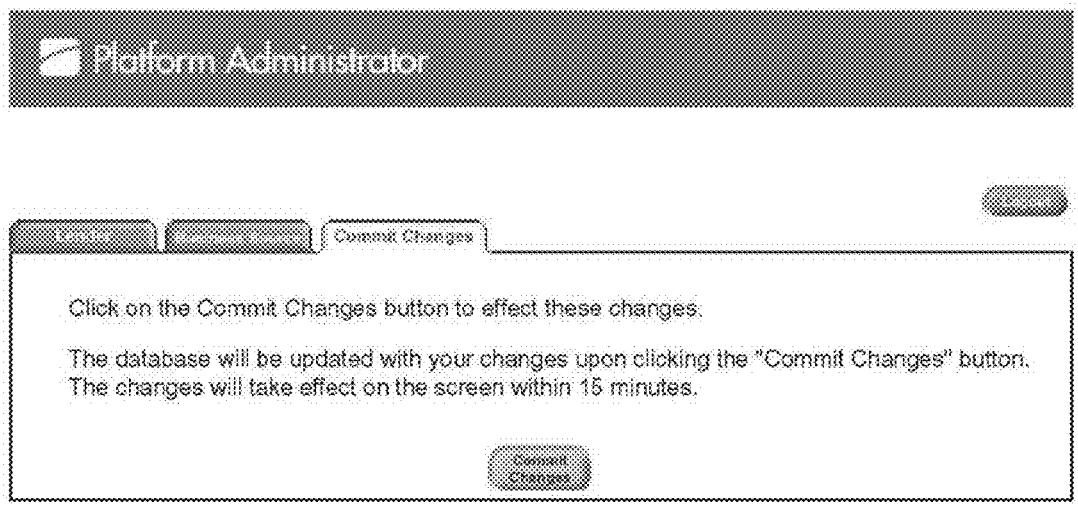

Shown in FIGS. 60-62 is platform administrator interface 149 which allows a lender to create and/or change lender-configurable parameters, such as lender pricing. According to a particularly preferred embodiment, platform administrator interface 149 allows a lender or loan provider to access and update information (such as terms, pricing, etc.) regarding loans or loan products offered by the lender or in the lender's pipeline. As shown in FIG. 60, a lender may provide hedge costs in fields 6010 for different products (which are selected via tabs 6012) as well as for different time periods. As shown in FIG. 61, a lender may provide rounding option selections in fields 6110, 6112 and 6114. As shown in FIG. 62, the lender may save the pricing profile by committing the changes to be stored on system 10.

Platform administrator interface 149 allows the various user interfaces to be branded for a specific lender. The user interfaces (e.g., the consumer user interface 140) may be branded by providing regions in the web pages that are configurable by the lender. The regions may include trademarks, logos of the lender, content provided by the lender, graphics relating to the lender, pricing data configured by the lender, closing costs configured by the lender, operational data of the lender (such as holidays, credit agency relationships, etc.), and business policies of the lender (such as RESPA checklist work steps, handling of refinances, handling of consumer's non-consent to receive electronic disclosures, etc.). The fonts, colors, and other aspects of the consumer interface 140 may be customized, for example, to make them consistent with the corporate identity of the lender.

VII. Access Administrator Interface

According to a particularly preferred embodiment, access administrator interface 148 is for use by a lender's systems administrator. Access administrator interface 148 is generally configured to provide access for a computer administrator to enter, change and update information regarding users of system 10 for a particular lender.

Figures 63, 64:
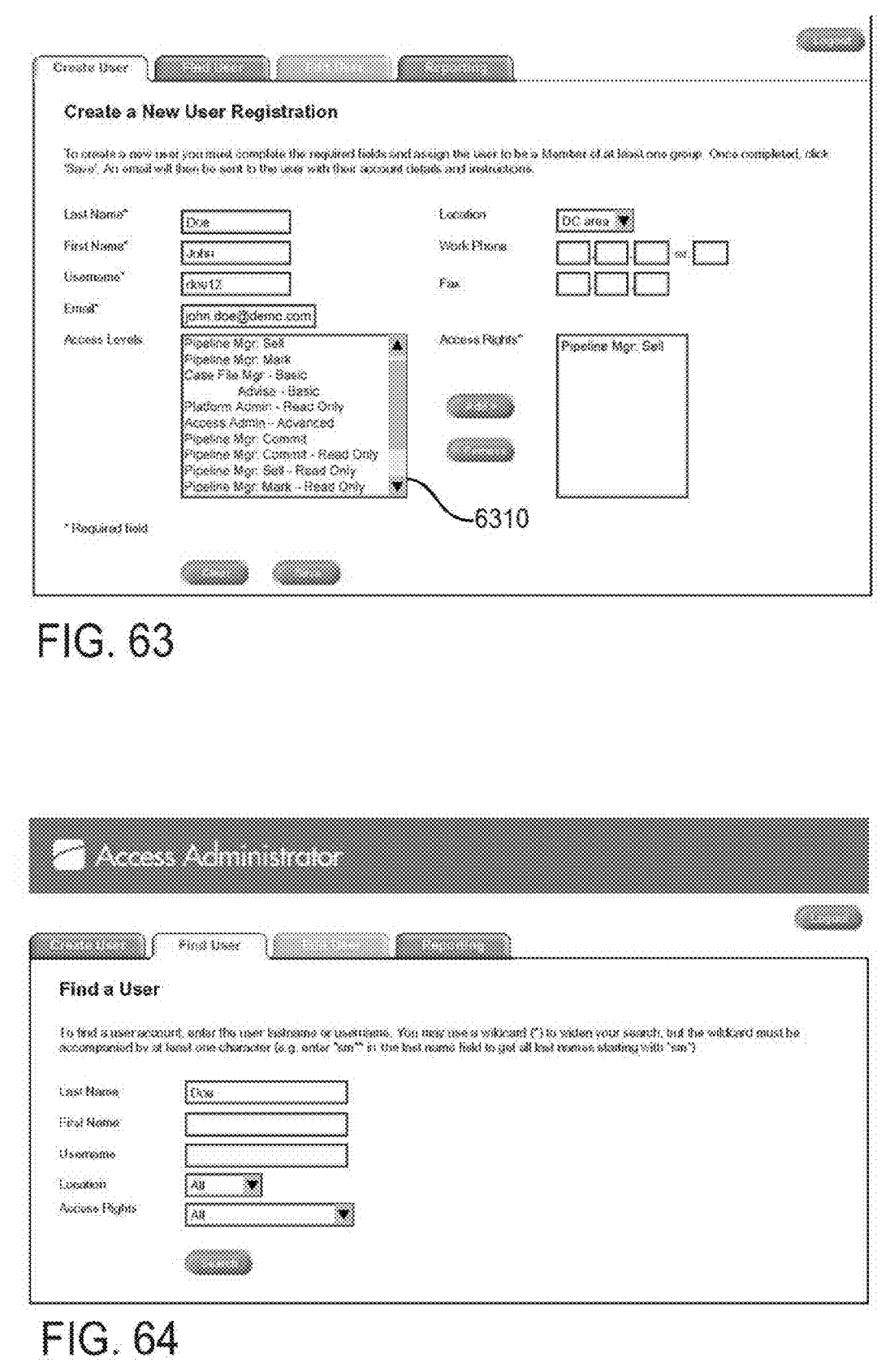

Shown in FIGS. 63-66 is access administrator interface 148 which provides access to administrative engine 126. Administrative engine 126 allows a system administrator, supervisor, etc. to create and edit access rights for users to system 10. According to a particularly preferred embodiment, administrative engine 126 is configured to create and edit access rights to user interfaces 140-161. For example, for the user interfaces 144-149, access rights 6310 may be designated by different levels of access (e.g., Case File Manager—Basic, Access Admin—Advanced, Advise—Basic, etc) as shown in FIG. 63. The different levels of access will allow a user to perform different tasks or to access and update different types of data. For example, a first level of access may allow the user to perform data entry tasks and view existing records in order to assist a consumer with the status of the loan application (such as a call center user). A second level of access may allow the user to create new users for the system, edit existing users access rights, etc. A third level of access may allow the user to change or negotiate interest rates for the loan and to update files which have been rate locked. A fourth level of access will allow a user to update or edit lender pricing profiles and closing cost profiles. A fifth level of access will allow a user to price and/or sell loans to secondary mortgage market participants. A sixth level of access will allow a user to commit loans to secondary mortgage market participants. Within each level of access, different types of access may be permitted, including "read-only" rights (i.e., a user may view but not update data) or full access rights (i.e., a user may view and edit data).

VIII. Other User Interfaces

In addition to consumer user interface 140, advisor user interface 142, call center user interface 144, pipeline manager user interface 146, access administrator user interface 148, and platform administrator user interface 149, all described above, other user interfaces may also be provided. For example, a closing agent user interface 150, an attorney user interface 152, a realtor user interface 154, a property seller user interface 156, and an appraisal service user interface 158, a hazard insurance user interface 159, a servicing agent user interface 160, and an investor user interface 161 may also be provided. As previously mentioned, different participants are preferably provided with different types of access to loan data and for different time periods.

Closing agent user interface 150 may be used by a closing agent to schedule services and to view the workflow pipeline. Using interface 150 may also be used by the closing agent to obtain access to the lender's data to generate loan documents, to obtain access to loan documents generated by the lender, and to return documents after closing (i.e., as in the case of an eMortgage). Attorney user interface 152 may be used by an attorney for the same functions provided by the user interface 150 provides to a closing agent.

Realtor user interface 154 may be used by a realtor representing a property seller to monitor progress of a potential buyer's loan application. In this manner, a realtor can know the potential of selling to a particular buyer, or whether the realtor should keeping shopping the home around to other buyers. The property seller user interface 156 may be used by a property seller for the same functions provided by the user interface 154 to a realtor.

The appraisal service user interface 158 may be used by an appraisal service to schedule services and to view the workflow pipeline. The appraisal service user interface 158 may also be used to post the results of an appraisal to make the results available to other participants. The hazard insurance user interface 159 may be used by a hazard insurance company to set up hazard insurance for the home purchased by the consumer.

The servicing agent user interface 160 may be used by a servicing agent to set up servicing for one or more loans sold by the lender. For example, loan data may be transmitted electronically from the LOS directly into the servicer's data bases.

The investor user interface 161 may be used by an investor to set up accounting functions associated with loans purchased from the lender or servicing for one or more loans sold by the lender. For example, loan data may be transmitted electronically from the LOS directly into the investor's data bases. The investor user interface 161 may also be used to monitor the loan pipeline. The investor user interface 161 also provides the investor with the ability to view loan details (such as FICO scores, note rates, location, etc.) and any results of regulatory review. The lender may also designate or provide certain parties with access to view the loan details. The investor user interface 161 may be used as due diligence tool. For example, the lender designates access to loans or sets of loans for pre-purchase review by the investor. Alternatively, investor user interface 161 may be used after purchase of the loans to confirm purchase, that the loans which were to be bought were the loans actually bought, etc.

IX. Other Interfacing with Third Party Service Providers

A number of other interfaces that may be provided in connection with third parties. The following interfaces may be generally implemented as data feeds into the system 10, however, more complete user interfaces with the following third party service providers may also be implemented if desired.

System 10 may electronically access flood certification services 172, title services 174, tax services 176, fraud protection services 178, real estate service 180, etc. in order to assess, validate or confirm information, or to pre-populate data on the loan application and other documents. Flood certification service 172 may be accessed to determine whether a particular home is in a flood zone. Title services 174 may be accessed to perform a title search on a property. Tax services 176 may be accessed to confirm that taxes have been paid on a particular property. Fraud protection services 178 may be accessed to perform identity and address confirmation of the consumer and the property. Real estate service 180 (e.g., MLS) may be accessed to obtain property information.

For example, a tax service 176 may provide information regarding the tax status of the property (such as if annual taxes have been paid, amounts of tax assessments, etc.). Service ordering engine 130 allows a user (such as a lender) to select and configure which service providers will be used for the various services (such as with a menu or drop-down select box). For example, the lender may enter a single service provider in a given category, or may enter multiple service providers along with business rules for selecting which service provider should be used in a particular situation. Additionally, service ordering engine 130 may be configured to automatically request a service upon the occurrence of an event in the loan application or loan closing process. For example, service ordering engine 130 may be configured to automatically order a flood certification and a tax report when a certain point is reached in the loan application process, such as at the same time a credit report for the consumer is ordered. Alternatively, service ordering engine 130 may prompt a user to select and/or order these services, as well as the service provider to provide such services. According to alternative embodiments, the system may access a local database (e.g., data base 116) containing the information.

The service ordering engine 130 may be configured in different ways by different lenders. Further, if a lender has multiple business channels, the service ordering engine 130 may be configured different ways within the different business channels of a particular lender. For example, if a lender provides access to the system 10 to different brokers, the different brokers may be permitted to configure the service ordering engine 130 to select different service providers according to broker preferences.

As another example, system 10 may also be connected to a real estate service 180 such as the Multiple Listing Service (MLS). Property data may then be downloaded to the system (and used to pre-populate the loan application) without the need for the consumer to manually enter data. According to a particularly preferred embodiment, the consumer may enter an MLS number for a property in lieu of complete property data. System 10, using the MLS number, may then access the MLS database and retrieve any and all property data. Alternatively, system 10 may be used by a property seller to upload information to the MLS system from system 10. According to an alternative embodiment, system 10 may be configured to not receive an application until a property assessment (such as an appraisal) has been received in order to ensure that the asking price is supported by an appraisal.

According to another preferred embodiment, a service 178 (e.g., postal service, SSN database) may be accessed in order to provide verification and/or fraud protection service with respect to the loan application. For example, the address information provided in the loan application may be compared to a postal database in order to confirm that the address is valid. The consumer name or social security number may be compared with other databases to confirm validity. Alternatively, a local database stored on system 10 may be accessed to provide verification and/or fraud protection service instead of a third party service.

X. Other Engines

In addition to engines 118-130, described above, other engines may also be employed. Additional engines include a customer satisfaction services engine 132, a lending practices analysis engine 134, a mortgage insurance routing engine 135, a servicing rights routing engine 136, and an investor sales routing engine 138.

Customer satisfaction services engine 132 analyzes loan origination data stored on database 116 and then provide enhanced services (such as reports, reminders, messages, marketing materials, loan opportunities, etc.) to consumers. For example, a consumer may obtain a "sub-prime" mortgage via system 10. System 10 may monitor the mortgage to determine when the consumer may be eligible for a conventional mortgage (such as based on financial details, equity, etc.) and provide a message to the consumer informing them of their eligibility. Alternatively, using the loan data, system 10 may identify candidates for refinancing (e.g., based on current interest rates being more than predetermined amount below a consumer's interest rate on the consumer's current loan) and provide the candidates with information regarding rates, pre-approvals, amounts of re-finance, etc. Using the consumer data and property data stored in the system, a lender may provide appropriate marketing messages to the consumer informing them of opportunities (such as refinancing) via e-mail, mail, etc.

Lending practices analysis engine 134 includes a loan cost tool (such as a high cost loan calculator) to assist compliance and analysis in connection with federal, state, local, investor, and other standards that relate to predatory and unfair lending. Analysis engine 134 helps lenders identify and avoid predatory (charging too much) and unfair (discriminatory) lending practices. Analysis engine 134 may also be configured for use by any of the other participants in the mortgage process, such as an investor that wants to conduct due diligence research before purchasing a portfolio of loans. Analysis engine 134 may also be used to provide analysis and reporting of lending practices to government agencies, investors, third parties, etc.

With regard to identifying predatory practices, various predetermined standards (e.g., laws, rules, regulations and/or guidelines associated with federal, state, local, investor and/ or other entities) exist which typically set limits for loan fees and interest that may be charged to a borrower. The analysis engine 134 preferably stores equations and other data which are tailored to reflect such standards. The analysis engine 134 then accesses loan data stored in the common, integrated database 116 (which is the database accessed by all users and tools) and determines, for example, the amount of fees charged for a particular loan. For example, the fees may be expressed as a percentage of the total loan amount (i.e., the amount less any fees that are being financed). The analysis engine 134 may then, for example, compare the fees (and/or interest costs) for the loan with thresholds set by one or more of the various standards. For example, if fees exceed a certain percentage of an established interest rate (which may be published, stored, archived or otherwise retrieved) or exceed a certain dollar amount, the analysis engine 134 may trigger a flag that pricing or other parameters of the loan may need to be reviewed and/or adjusted for compliance. The analysis engine 134 can also calculate how much the fees and/or interest costs need to be reduced to comply with the applicable rules. In connection with state or local standards, address information (such as property location or consumer address) may be used by the analysis engine 134 to determine which, if any, state or local assessment needs to be conducted.

In another embodiment, the analysis engine 134 flags a loan not only if it exceeds the trigger, but also if it falls below the trigger by a less than tolerance amount (e.g., in a range of 0.5%-5%, such as 2%). Raising a flag even though a particular value falls below a trigger allows the user to take a closer look at border line cases. Such a tolerance may be desirable in the event of uncertainty regarding which fees should be included. The amount of tolerance may be adjusted based on the amount of uncertainty, risk tolerance levels, and other factors.

With regard to identifying unfair lending practices, lenders typically have the capability to adjust a consumer price or loan-level price of one or more mortgage products. Analysis engine 134 is used to review the adjustments to price made by a loan officer in order to identify any potential discriminatory practices or violations of fair lending regulations. The analysis engine 134 may access loan data stored in the database 116. The analysis engine 134 may be used to identify any potential discriminatory practices or violations of fair lending regulations at the time that price adjustments are being made by a lending officer. Alternatively, the analysis engine 134 may be used to review the historical lending and pricing practices of an individual loan officer, office, etc. According to a particularly preferred embodiment, analysis engine 134 performs a statistical analysis of the loan data stored on database 116 in order to identify a correlation between any two or more specified factors. For example, a lender may specify gender and points adjustment as two factors. The analysis engine 134 then reviews the historical data to identify any correlation or trends between the two factors (such as if pricing appears to be higher or lower based on gender). If a correlation or trend is identified, such correlation may be provided to the lending institution for corrective action. Alternatively, such a correlation may be provided to an individual lending officer and instruct the lending officer to correct the price adjustment accordingly. It should be appreciated that any of a variety of factors may be used by the lending analysis tool, including gender, race, geographic location, pricing, points adjustment, servicing fees, closing fees, etc.

The analysis engine 134 may be utilized, implemented or used by the lender as part of the workflow prior to the lender selling loans to the secondary mortgage market participant, and even prior to closing the loan. In the event a loan fails, information regarding how much the fees and/or interest costs need to be reduced to comply with the applicable rules may then be provided to the lender. Messaging may also be provided to explain in greater detail why the loan application failed. Other information may also be provided. For example, a lender may be provided with links to investor guidelines or other standards to obtain additional explanations regarding pertinent guidelines, such as information about what types of fees are included in certain calculations, information about how certain terms are defined, and so on. Thus, if it appears that a loan may violate predatory or unfair lending laws, the values used in preparing the loan may be revisited and corrected.

The analysis engine 134 may be accessed and used by other participants, such as a secondary mortgage market participant buying loans, and/or a lender selling the loans. The secondary mortgage market participant and/or lender may access analysis engine 134 to assess various loans by case number, property address, loan amount and type, etc. Fees that are applicable for that loan (such as points, monthly mortgage insurance, appraisal fees or other fees) may be selected for calculation. The analysis engine 134 then calculates the fees for the loan and return a message if the loan exceeds (or comes within a predetermined threshold) of the applicable lending rules.

For example, as previously noted, investors may be provided access to the analysis engine 134 by way of the investor interface 161 to perform due diligence before purchasing one or more loans. The due diligence may be performed on individual loans or pools of loans purchased from lenders or other secondary market participants. For example, in a situation where an investor is purchasing loans from a lender, the lender may designate access to the loans or set of loans for pre-purchase review by the investor. This may be done, for example, after the lender sorts available loans and identifies a group of loans for probable sale to the investor. The investor may then use the analysis engine 134 to run various tests on the loan data for the loans identified by the lender. In one embodiment, the analysis engine 134 may be provided with a rules engine and one or more sets of investor-specific rule sets which allow the guidelines of different investors to be reflected in the analysis engine 134. This may be achieved in generally the same manner as discussed above in connection with the underwriting engine 118. Assuming the analysis engine 134 includes investor-specific rule sets, the investor interface 161 may further be used to allow the investor to modify the investor-specific rule sets.

In another embodiment, a unique code may be generated when the lender runs the analysis engine 134 on the loan data for a particular loan. For example, when a lender submits a loan application to underwriting engine 118, both the underwriting recommendation and the unique code generated by the analysis engine 134 may be returned at the same time. Subsequently, at delivery, when, the lender transfers loan documents (in paper or electronic form) to the investor, the code may be provided to the investor as confirmation that the lender ran the predatory and unfair lending analysis on the loan using the analysis engine 134, e.g., in generally the same manner that a lender may also provide a case file number associated with the underwriting engine 118. The code may be used to validate that the loan was submitted for predatory lending evaluation and that predatory lending evaluation results for the loan were within the various federal, state, local, investor and/or other lending laws, rules, regulations and/or guidelines. Alternatively, a single code associated with both the underwriting engine 118 and the analysis engine 134 may be used. Alternatively, or in addition to the above embodiments, the analysis may performed when the time loan data is transferred to the investor as part of delivery. For example, it may be desirable to perform the analysis again in the event that any loan data has changed or is different than what was originally submitted to the underwriting engine 118. If a particular loan fails analysis, the system 10 preferably generates a message that provides the investor with the opportunity to refuse to purchase the particular loan. For example, a message may be sent to the lender during the delivery that the investor is refusing to purchase and/or accept delivery of a particular loan because it has failed the predatory and unfair lending analysis.

An investor may also use the analysis engine 134 in post-purchase situations. For example, an investor may wish to perform quality control analysis in connection with a group of loans that was originated by a lender that did not have access to or did not use the analysis engine 134. In such a situation, loan data for the loans may be provided to the analysis engine 134 to conduct post-purchase predatory lending due diligence. In some cases, for example, a lender may have one or more of its own tools for conducting predatory and/or unfair lending analysis. The investor interface 161 may be provided with the ability to connect to such lender tools and retrieve/display the results of prior evaluations performed by the lender. This allows any systemic approaches between the different tools to be compared, e.g., so that differences in interpretations of a particular standard may be identified.

With regard to providing reporting and analysis of lending practices to other third parties, analysis engine 134 preferably accesses the loan data stored on database 116 to provide reporting to one or more government agencies (such as the Federal Financial Institutions Examination Council (FFIEC), the Board of Governors of the Federal Reserve System (FRB), the Federal Deposit Insurance Corporation (FDIC), the National Credit Union Administration (NCUA), the Office of the Comptroller of the Currency (OCC), and the Office of Thrift Supervision (OTS)). Analysis engine 134 is used to populate electronic forms and provide reporting of loan data to such agencies. Analysis engine 134 may further electronically file the report with the appropriate agency. The reported data is used by government agencies to analyze whether financial institutions are serving the housing credit needs of their communities, to identify neighborhoods for public and private investments, to identify possible discriminatory lending patterns, and to assist regulatory agencies in enforcing compliance with anti-discrimination statutes.

The report provided by analysis engine 134 may take the form of a register of loan applications and their disposition during a calendar year. According to a preferred embodiment, analysis engine 134 is configured to report in accordance with the Home Mortgage Disclosure Act (HMDA) Loan Application Register (LAR) for annual reporting. Analysis engine 134 accesses loan data stored on database 116 and, using the loan data, populates the LAR for filing. According to a particularly preferred embodiment, analysis engine 134 may further electronically file the LAR with the appropriate entity. According to a preferred embodiment, the LAR may be in a spreadsheet format, database format, etc. The LAR includes information relating to the loan application number, application date, loan type, loan purpose, owner occupancy status, loan amount, actions taken, property location data, applicant information including race, gender and income, and type of loan purchaser. According to an alternative embodiment, the loan data may be provided to a third party service provider, who in turn, generates the LAR and/or submits the LAR for reporting.

The analysis engine 134 allows a single common interpretation of predatory lending and unfair lending standards to be maintained and made available to multiple participants. The analysis engine 134 also ensures that predatory and unfair lending standards are consistently applied across all loans, regardless of the entry point in the system 10.

Mortgage insurance routing engine 135 is configured to provide for the integrated routing or procurement of mortgage insurance from a service provider. For example, for loan products which require mortgage insurance, mortgage insurance routing engine 135 is configured to provide the necessary loan information to a mortgage insurance provider via a communications link. The mortgage insurance provider may then provide a cost of the mortgage insurance to the user, which may then be accepted or rejected. According to an alternative embodiment, mortgage insurance routing engine 135 may be configured according to various rules to handle the allocation or routing of loans to mortgage insurance providers, such as in accordance with contracts entered into between a lender and mortgage insurance provider, in accordance with a quota (i.e., a certain percentage of originated loans are sent to a certain mortgage insurance provider) or in accordance with a product type (i.e., adjustable rate mortgages (ARMs) are sent to a first mortgage insurance provider, and fixed rate mortgages are sent to a second mortgage insurance provider).

Servicing rights routing engine 136 is used to assist servicers servicing the one or more loans originated and closed on system 10. Servicing rights routing engine 136 generates billing statements and also prepares escrow accounts for the one or more loans. Advantageously, the servicing rights routing engine 136 accesses the common, integrated database on system 10 for preparing the billing statements and setting up escrow accounts. The servicing rights routing engine 136 allows the lender to select or specify one or more servicers using the pipeline manager interface 146. For example, the servicing rights routing engine 136 may be configured by the lender to specify that certain loans (or types of loans) are to be automatically routed to and serviced by a specified servicer. For example, the servicing rights routing engine 136 may be configured by a lender business rule that all ARMs are to be serviced by a first servicer, and that all fixed rate mortgages are to be serviced by a second servicer. Alternatively, the lender may select individual loans on system 10 and specify those loans are to be serviced by a specified servicer.

Investor sales routing engine 138 allows a lender to selectively route and/or sell selected loans to one or more secondary mortgage market participants. Routing engine 138 allows a lender to maintain multiple investor relationships. The lender may establish business rules on system 10 to control the routing and sale of loans to various secondary mortgage market participants. For example, a lender may provide that a first type of loan (e.g., conventional loans) be sold to one secondary mortgage market participant, and that a second type of loan (e.g., jumbo loans) be sold to another secondary mortgage market participant via the pipeline manager interface 146, described above. As another example, routing engine 138 may be configured to allow a lender to sell loans originated in different geographic areas to different secondary mortgage market participants. Routing engine 138 allows a lender to search loans available for sale to secondary mortgage market participants and to selectively route those loans to different investors.

Many other changes and modifications may be made to the present invention without departing from the spirit thereof. The system can be used in association with a variety of loans (e.g., conventional loans, jumbo loans, short term ARMS which a lender may not sell to a secondary mortgage market participant) including loans for different purposes (e.g., home equity loans, refinancing loans, second home loans, etc. The system may also collect lender specific underwriting and pricing rules and apply the rules to loan applications processed by the system. The system can be configured to use web services or other remote or network connections) for connectivity, data and functionality for the interfaces, services and engines described above. The scope of these and other changes will become apparent from the appended claims.

What is claimed is:

1. A computerized mortgage loan data processing system, comprising:
    an advisor interface, the advisor interface being configured to receive mortgage loan application data from a user, the mortgage loan application data pertaining to a potential borrower and to a mortgage loan application for a mortgage loan for the potential borrower;
    a data storage system, the data storage system having mortgage loan data stored therein for a plurality of mortgage loans, including the mortgage loan application data received by the advisor interface for the mortgage loan;
    a loan cost analysis engine, the loan cost analysis engine being configured to compare data pertaining to the loan pricing for the mortgage loan with loan pricing standards after closing of the mortgage loan and prior to sale of the loan to a secondary mortgage market investor to evaluate whether the loan pricing is in compliance with the loan pricing standards; and an investor user interface, the investor user interface being configured for use by the secondary mortgage market investor, the investor user interface being configured to provide an indication to the secondary mortgage market investor regarding whether the loan pricing for the mortgage loan is in compliance with the loan pricing standards, the indication being provided after closing of the mortgage loan and prior to sale of the mortgage loan to the secondary mortgage market investor;

wherein the loan cost analysis engine is configured to perform a statistical analysis based on at least two factors, the at least two factors comprising different loan parameters associated with the mortgage loan, the loan cost analysis engine configured to determine a correlation between the at least two factors and identify loans that are not in compliance with the loan pricing standards based on the statistical analysis;

wherein the loan cost analysis engine is further configured to (i) trigger an alert if one of a loan fee and interest rate exceeds a threshold value; and (ii) trigger the alert if one of the loan fee and the interest rate does not exceed the threshold value but is within a tolerance amount of the threshold value, the tolerance amount being adjustable based on a risk tolerance level for the mortgage loan.

2. A system according to claim 1, wherein the loan cost analysis engine includes a rules engine configured with rule sets associated with different secondary mortgage market investors, the rule sets permitting loan pricing comparisons performed by the loan cost analysis engine in connection with the different secondary mortgage market investors to reflect lending guidelines of the different secondary mortgage market investors.

3. A system according to claim 1, wherein the loan pricing standards are configured to prevent discriminatory lending practices.

4. A system according to claim 1, wherein the loan pricing standards are configured to prevent predatory lending practices.

5. A system according to claim 1, wherein the investor user interface is configured to provide a view into the data storage system to access the mortgage loan application data for selected ones of the plurality of mortgage loans.

6. A system according to claim 5, wherein the selected ones of the mortgage loans are selected by a lender for pre-purchase review by the secondary mortgage market investor.

7. A system according to claim 1, wherein the loan cost analysis engine is configured to populate an electronic form to generate a report for a government agency and to electronically file the report with the government agency.

8. A system according to claim 1, wherein the system is configured to generate a message to a lender associated with the mortgage loan that the secondary mortgage market investor refuses to purchase and accept delivery of the mortgage loan because the mortgage loan is not in compliance with the loan pricing standards.

9. A system according to claim 1, wherein the advisor interface and the loan cost analysis engine are accessible to a plurality of different lenders by way of a network.

10. A system according to claim 9, wherein the investor user interface and the loan cost analysis engine are accessible to a plurality of different secondary mortgage market investors by way of the network.

11. A system according to claim 1, wherein the loan cost analysis engine is a first loan cost analysis engine, and wherein the investor user interface is configured to retrieve and display the results of prior evaluations performed by the first loan cost analysis engine and to compare the prior evaluations with corresponding evaluations performed by a second loan cost analysis engine, thereby permitting differences in interpretations of the loan pricing standards by the first and second loan cost engines to be identified.

12. A computer system configured for use by different lenders to facilitate the flow of capital through the housing finance industry, the computer system being configured to receive and process mortgage loan application data pertaining to mortgage loan applications, and the system being accessible to each of the different lenders by way of a network, the system comprising:

a consumer-direct interface, the consumer-direct interface being configured to receive mortgage loan application data from consumers, the consumer-direct interface comprising a series of linked web pages, wherein at least some of the series of linked web pages include lender-configurable regions which are configurable by a lender to include a logo associated with the lender, textual information provided by the lender, and loan pricing information provided by the lender;

an advisor interface, the advisor interface being configured to receive mortgage loan application data from advisors;

a call center interface, the call center interface being configured to receive mortgage loan application data from users at a call center;

a platform administrator interface, the platform administrator interface being configured to be useable by different lenders to configure the lender-configurable regions of the consumer-direct interface according to lender preferences, the platform administrator interface configured to permit the different lenders to configure hedge costs associated with different mortgage products according to lender preferences, and the platform administrator interface being configured to permit the different lenders to configure pricing information provided by way of the consumer-direct interface, the call center interface and the advisor interface according to lender preferences;

an underwriting engine, the underwriting engine being configured to generate underwriting determinations based on the mortgage loan application data;

a data storage system, the data storage system being configured to store the mortgage loan application data received by the consumer-direct interface, the advisor interface, and the call center interface;

a loan cost analysis engine, the loan cost analysis engine being configured to receive the mortgage loan application data, wherein, for each mortgage loan application, the loan cost analysis engine is configured to compare data pertaining to loan pricing for a corresponding mortgage loan with loan pricing standards to evaluate whether the loan pricing is in compliance with the loan pricing standards, and the loan cost analysis engine being configured to generate a validation code associated with the mortgage loan, the code being useable to validate that the mortgage loan was submitted for analysis by the loan cost analysis engine and to provide an indication of results of the analysis by the loan cost analysis engine; and an investor user interface, the investor user interface being configured to provide secondary mortgage market investors with access to the mortgage loan application data stored in the data storage system, and the investor user interface being configured to provide the secondary mortgage market investors with information pertaining to results of the evaluations by the loan cost analysis engine; and wherein the mortgage loan application data stored in the data storage system is commonly accessible to the consumer-direct interface, the advisor interface, the call center interface, and the investor user interface;

wherein the loan cost analysis engine is configured to perform a statistical analysis to identify a correlation between a plurality of parameters in mortgage loan application data associated with a plurality of borrowers and identify loans that are not in compliance with the loan pricing standards based on the correlation between the plurality of parameters; and wherein the loan cost analysis engine is further configured to (i) trigger an alert if one of a loan fee and interest rate exceeds a threshold value; and (ii) trigger the alert if one of the loan fee and the interest rate does not exceed the threshold value but is within a tolerance amount of the threshold value, the tolerance amount being adjustable based on a risk tolerance level for the mortgage loan.

13. A system according to claim 12, wherein the indication comprises an alert to an advisor indicating that the loan pricing is not in compliance with the loan pricing standards.

14. A system according to claim 12, wherein the loan pricing standards are configured to prevent discriminatory lending practices.

15. A system according to claim 12, wherein the loan pricing standards are configured to prevent predatory lending practices.

16. A system according to claim 12, wherein the advisor interface is further configured to provide an advisor with additional information regarding the loan pricing standards responsive to the loan pricing not being in compliance with the loan pricing standards, the additional information pertaining to a portion of the loan pricing standards with which the mortgage loan is non-compliant.

17. A system according to claim 16, wherein the additional information comprises information about what types of fees are included in calculations used by the loan cost analysis engine.

18. A system according to claim 12, wherein the advisor interface is further configured to provide an advisor with messaging explaining in greater detail why the mortgage loan pricing is not in compliance with the loan pricing standards responsive to the loan pricing not being in compliance with the loan pricing standards.

19. A system according to claim 12, wherein the advisor interface is further configured to provide an advisor with links to additional information regarding the loan pricing standards.

20. A system according to claim 12, wherein the validation code indicates that the mortgage loan is in compliance with the loan pricing standards.

21. A system according to claim 12, wherein the loan cost analysis engine includes a rules engine configured with rule sets associated with the different lenders, the rule sets permitting comparisons of the loan pricing data with the loan pricing standards performed by the loan cost analysis engine in connection with the different lenders to reflect lending guidelines of the different lenders.

22. A system according to claim 12, wherein the loan cost analysis engine is configured to perform a statistical analysis of lending practices of an individual loan officer of one of the different lenders.

23. A system according to claim 12, wherein the advisor interface and the loan cost analysis engine are accessible to the different lenders by way of a network.

24. A system according to claim 23, wherein the advisor interface is configured to receive additional mortgage loan application data associated with additional mortgage loan applications for the different lenders, and wherein the advisor interface is configured to provide indications regarding whether loan pricing for the additional mortgage loan applications is in compliance with the loan pricing standards prior to respective closings of additional mortgage loans associated with the additional mortgage loan applications for the different lenders.

25. The system of claim 1, wherein the loan cost analysis engine is configured to generate a validation code associated with the mortgage loan, the code being useable to validate that the mortgage loan was submitted for analysis by the loan cost analysis engine and to provide an indication of results of the analysis by the loan cost analysis engine.

26. The system of claim 25, wherein the loan cost analysis engine is configured to evaluate whether the loan pricing is in compliance with predatory lending guidelines.

\* \* \* \* \*